United States Patent [19]

Barker et al.

[11] Patent Number: 4,939,661

[45] Date of Patent: Jul. 3, 1990

[54] APPARATUS FOR A VIDEO MARINE NAVIGATION PLOTTER WITH ELECTRONIC CHARTING AND METHODS FOR USE THEREIN

[75] Inventors: Christopher Barker; Christian Kunz, both of New York; John A. Combs, Babylon; John C. S. Park, New York, all of N.Y.

[73] Assignee: World Research Institute for Science and Technology, Long Island, N.Y.

[21] Appl. No.: 243,317

[22] Filed: Sep. 9, 1988

[51] Int. Cl.$^5$ ............................................. G06F 15/50
[52] U.S. Cl. .. ................................. 364/443; 364/449; 364/521; 342/452; 73/178 R
[58] Field of Search .............. 364/443, 444, 449, 452, 364/521; 73/178 R; 342/452; 340/990, 995; 358/103

[56] References Cited

U.S. PATENT DOCUMENTS

| | | | |
|---|---|---|---|
| 4,086,632 | 4/1978 | Lions | 364/444 |
| 4,192,002 | 3/1980 | Draper | 364/449 |
| 4,300,139 | 11/1981 | Wurst et al. | 364/452 |
| 4,360,876 | 11/1982 | Girault et al. | 364/449 |
| 4,428,052 | 1/1984 | Robinson et al. | 364/444 |
| 4,428,057 | 1/1984 | Setliff et al. | 364/521 |
| 4,590,569 | 5/1986 | Rogoff et al. | 364/452 |
| 4,660,037 | 4/1987 | Nakamura | 340/990 |
| 4,677,563 | 6/1987 | Ito et al. | 364/449 |
| 4,737,927 | 4/1988 | Hanabusa et al. | 364/521 |

Primary Examiner—Gary Chin
Attorney, Agent, or Firm—Peter L. Michaelson

[57] ABSTRACT

Apparatus for a video navigation plotter with electronic charting, specifically such a plotter designed for marine use, and various methods for processing navigational data therein and displaying resulting navigational data thereon are disclosed herein. Specifically, this plotter stores coastline data only for those cells which contain coastline data within a given geographic region of a pre-defined chart. The data for each of these cells is stored in a unique data structure that stores data for a plurality of line segments that, when drawn, collectively depicts the geographic data stored within that cell. Each segment is stored in terms of coordinate locations for a starting point followed by coordinate offset values for each successive point in that cell. Only those cells and their constituent segments are drawn for coastline data that exists within a specific region to be displayed. Once a coastline chart is displayed, the inventive plotter permits navigational data to be overlaid thereon and through this capability provides several useful features as set forth herein.

30 Claims, 43 Drawing Sheets

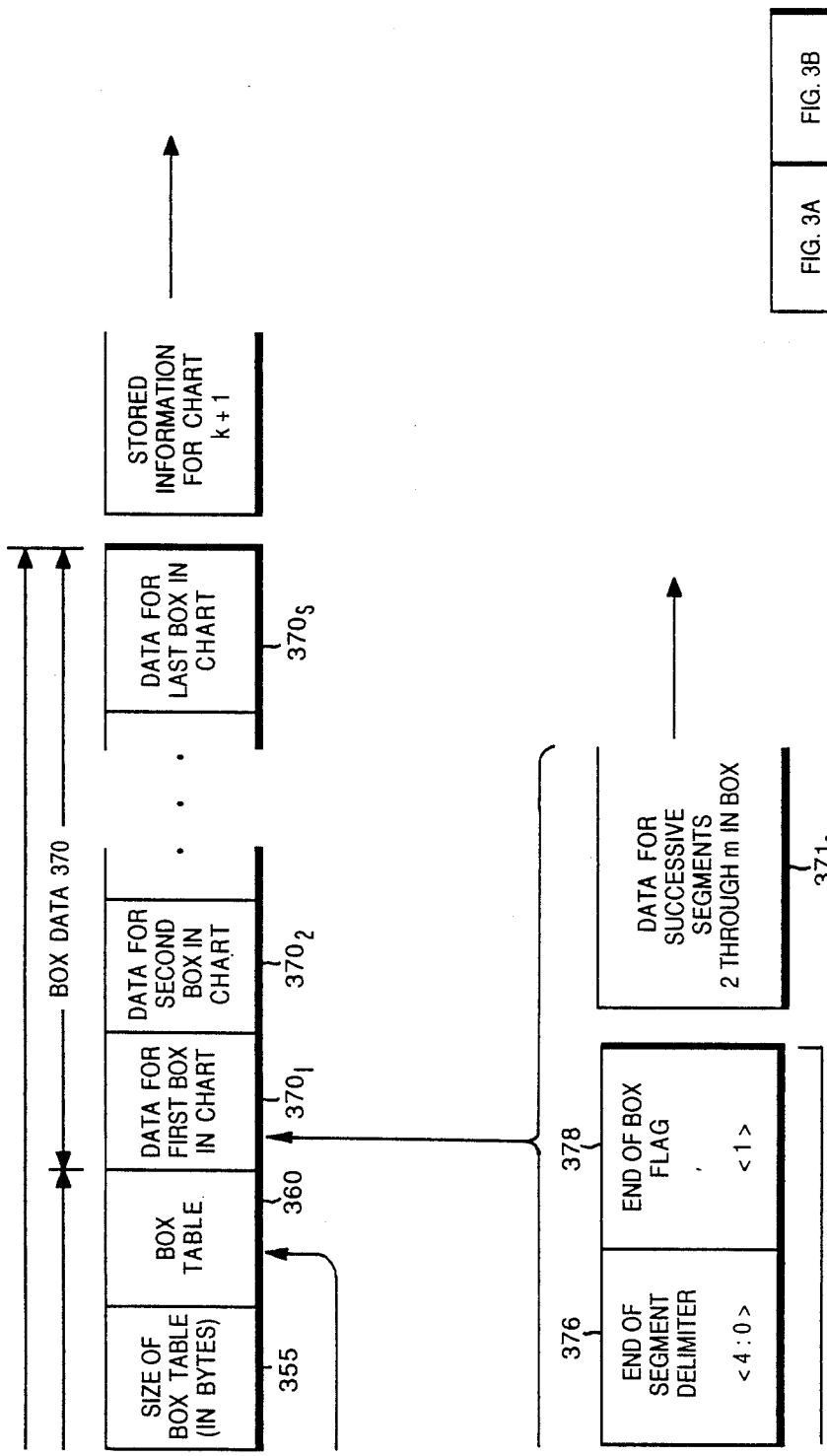

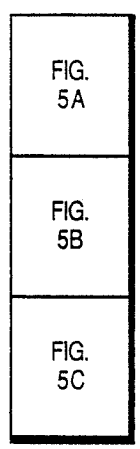
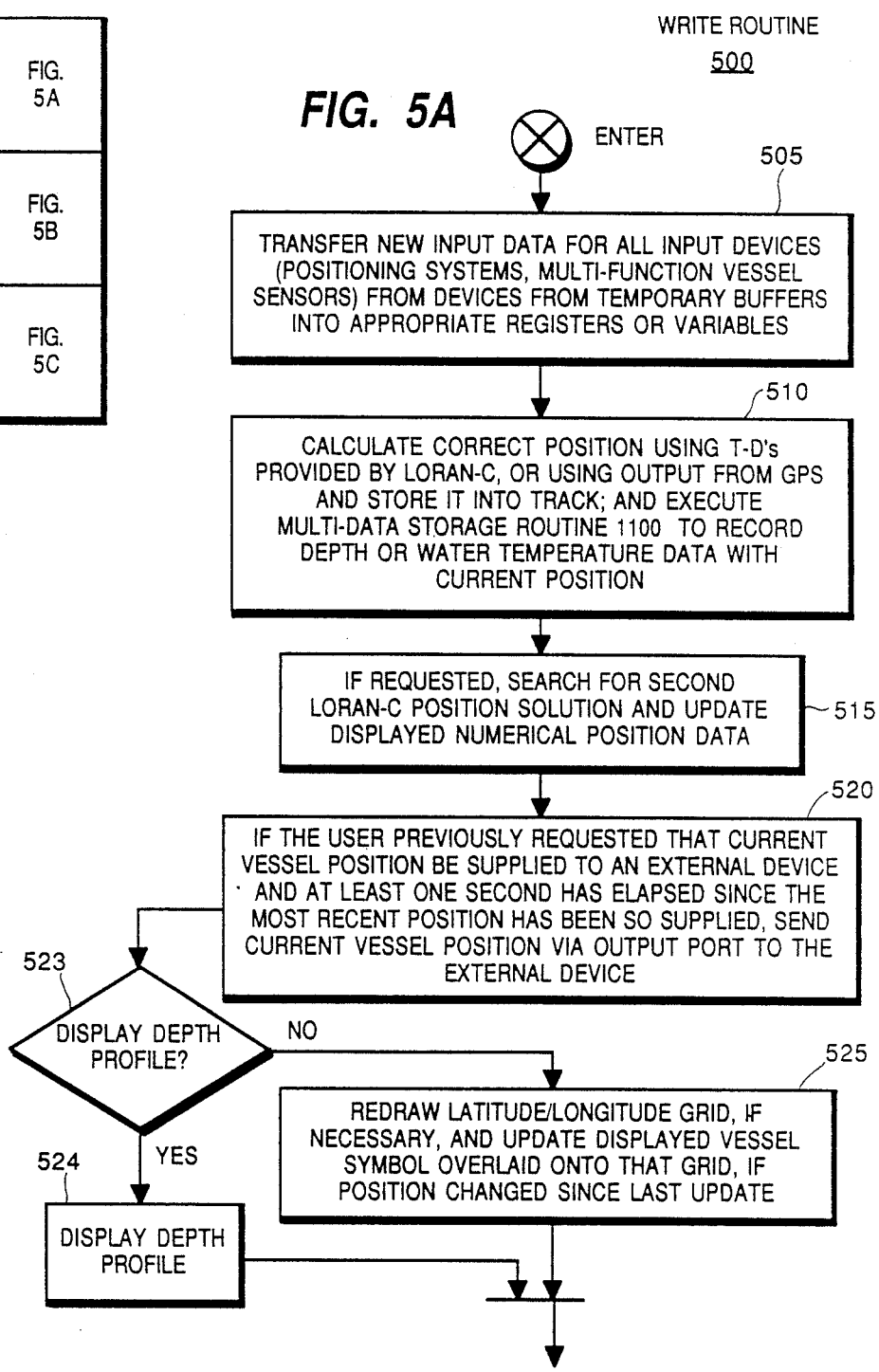
FIG. 5

| FIG. 6A | FIG. 6B |
|---|---|
| FIG. 6C | FIG. 6D |
| FIG. 6E | FIG. 6F |

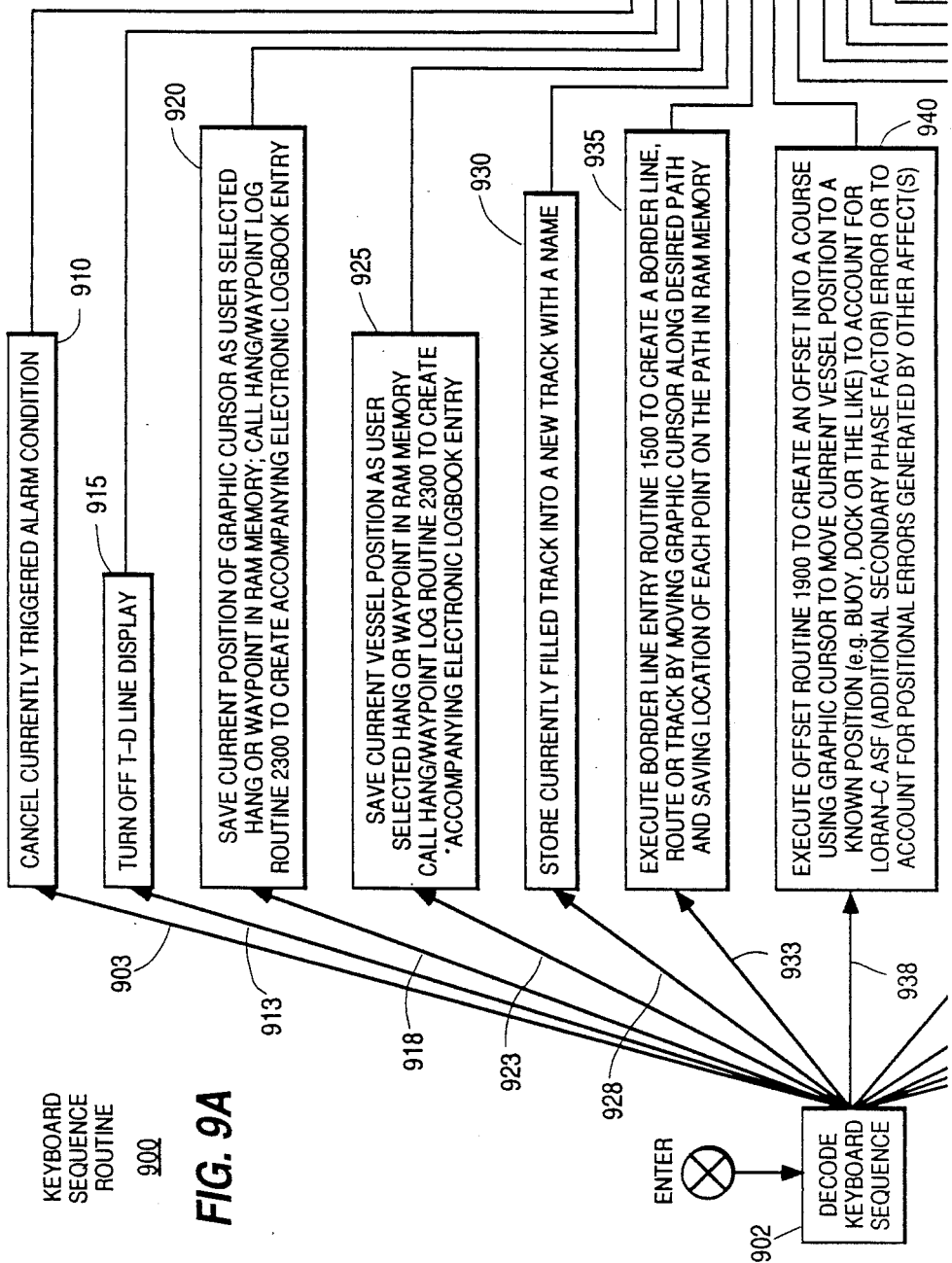

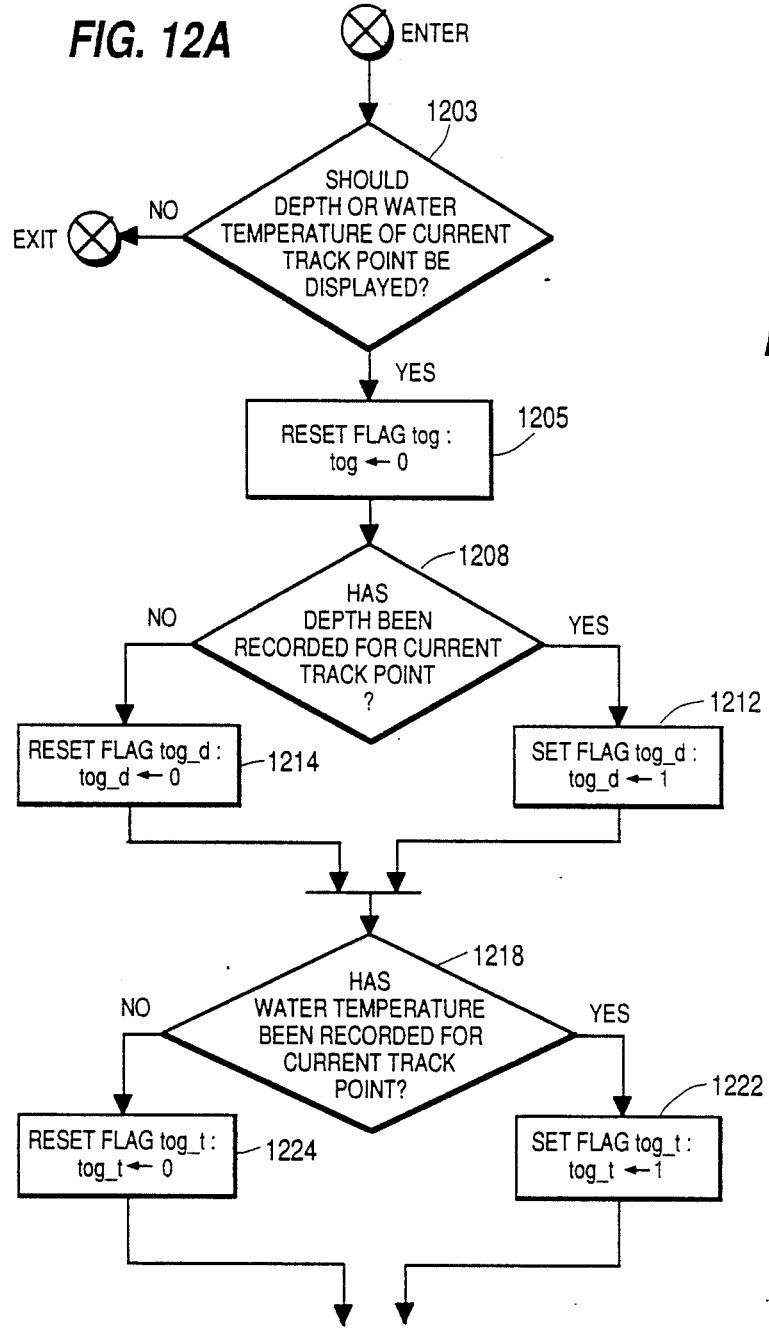

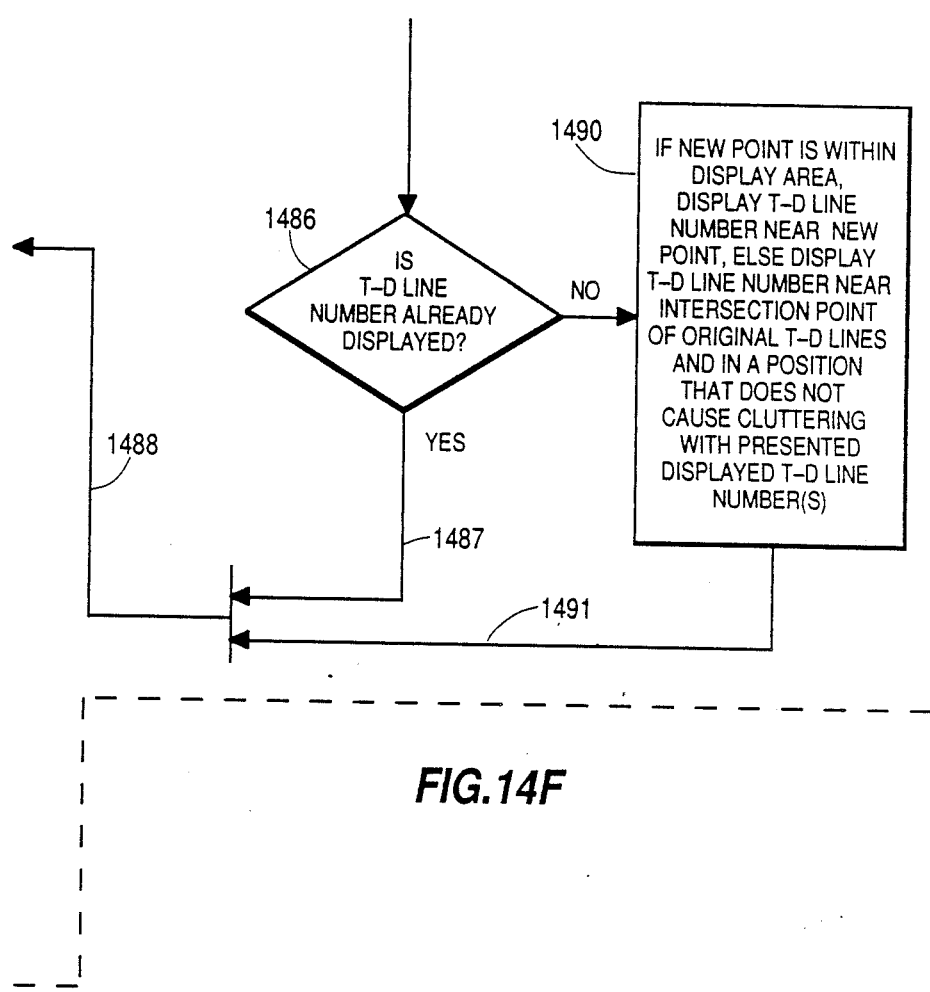

KEYBOARD

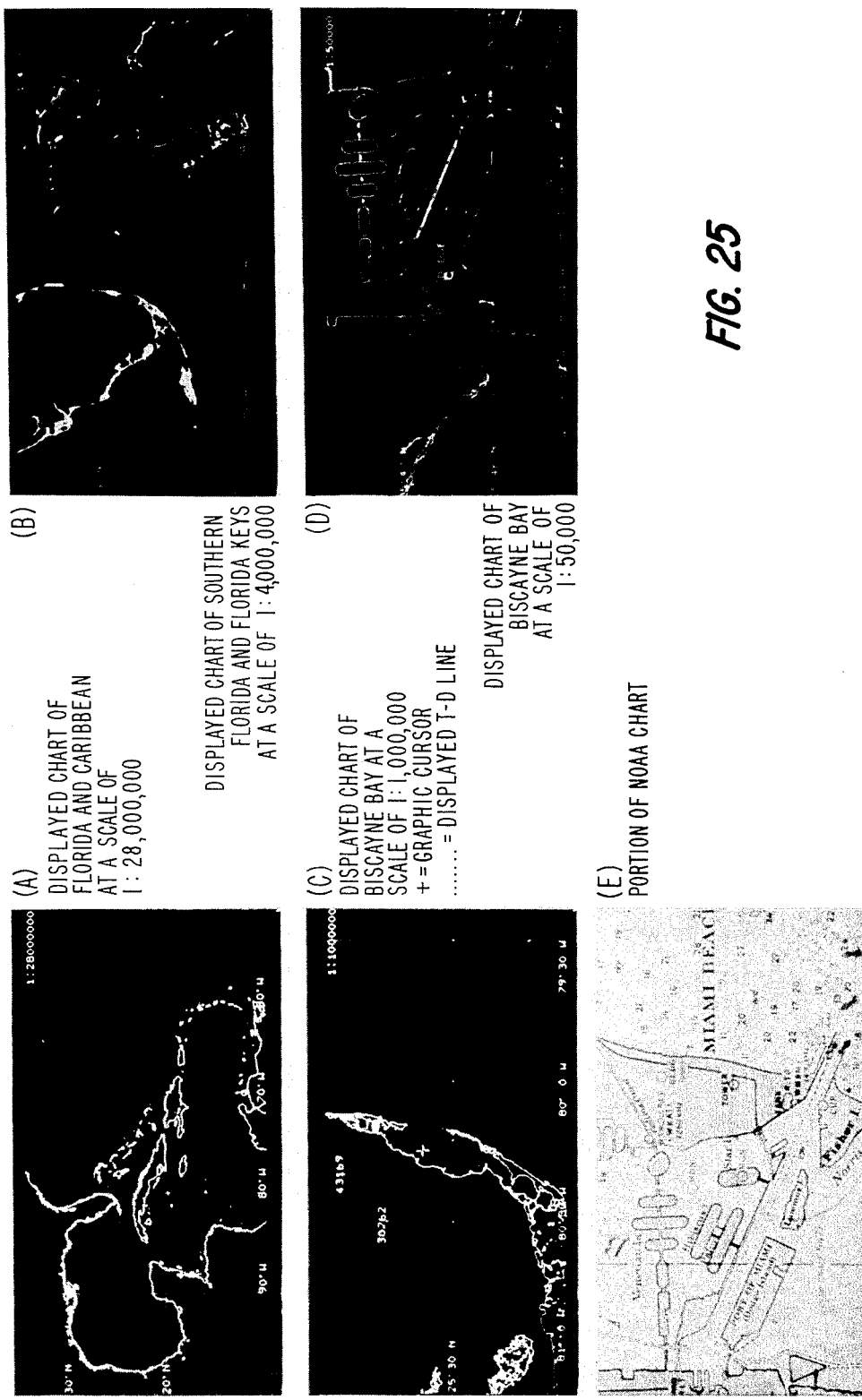

APPARATUS FOR A VIDEO MARINE NAVIGATION PLOTTER WITH ELECTRONIC CHARTING AND METHODS FOR USE THEREIN

BACKGROUND OF THE INVENTION

1. Field of the Invention

The invention relates to apparatus for a video navigation plotter, specifically one designed for marine use, and to various methods for processing navigational data therein and displaying resulting navigational data thereon.

2. Description of the Prior Art

A pilot (mariner) of a marine vessel often requires navigational information. In the past and continuing to the present, the pilot would frequently mark suitable linked courses, that resembled linked line segments, on a marine navigational chart and proceed from an origination point and continue from one course to the next, until he reached his destination. Navigating in this manner necessitated that the pilot remain aware of his current position at all times so that he could determine when he reached the end of a course, i.e. a waypoint, and consequently needed to change his heading to match that required by a new course. Many pilots, particularly those in the past and to a far lesser extent now, obtained rudimentary positional information by a sextant sighting or from marine navigational charts by relying on making a comparison between a present nautical position and an indicated point on a coastline or a navigational buoy shown on a chart or by extrapolating a current position from a last known position that was marked on the chart using information specifying a heading, speed and elapsed time of the vessel from that point. While these methods of navigation are often quite simple, they relied on the mariner to accurately determine his current position, either using a sextant or through calculations, and as such were quite prone to human error and hence frequently yielded erroneous or at least imprecise results, and often required time to undertake.

In an effort to increase the accuracy of marine navigation for all mariners, the art turned to the use of radio navigational aids in an effort to automate the determination of current position information thereby decreasing human error. One such navigational aid, particularly suited for over-water use, relies on a system of geographically dispersed Loran C transmitters. This system includes a separate chain of one master and two or more secondary (slave) Loran C transmitters, located in each of number of different sections of the world, that transmit pulsed signals on 100 kHz, with a pre-defined group repetition rate, as an identifier, and with a pre-determined highly accurate temporal spacing occurring between each pulse transmitted from a master and a pulse transmitted from one of its secondary transmitters. A different predetermined spacing exists between the pulses respectively transmitted by the master and each of its secondary transmitters. Loran C relies on the basic assumption that radio waves propagate at a constant velocity through air. Hence, by measuring the slight difference between the times of arrival of a pulse emanating from the master station and one emanating from a selected slave station, the position of the Loran C receiver can be narrowed to any position along a line of constant time difference (a T−D line). As such, a Loran C receiver measures the time differences occurring between a specified master and a selected secondary transmitter. Now, a position fix can be accurately determined by measuring the time differences between two pairs of Loran C transmitters, i.e. between a master and each of two of its secondary transmitters and finding the point of intersection of two corresponding T−D lines. A relatively unsophisticated Loran C receiver merely indicates a measured time difference. Use of Loran C eliminates the need to rely on potentially erroneous sextant sightings or course calculations given speed, bearing and elapsed time. As such, the use of Loran C significantly increases the accuracy inherent in marine navigation. Unfortunately, use of such Loran C receivers still involves a human element: a navigator has to set the receiver to receive a desired secondary Loran C transmitter, has to transfer the displayed time difference information onto a suitable nautical navigation chart that has printed T−D lines oftentimes interpolating between two adjacent printed T−D lines, and then has to determine the point of intersection of two T−D lines. To eliminate some of the tedium associated with Loran C navigation, sophisticated Loran C receivers exist that translate the time differences occurring between two pairs of Loran C transmitters into suitable latitude and longitude coordinates. In any event, once a position fix is determined, it still needs to be combined with drawn course lines so that the mariner could chart his progress and determine when he arrived at a waypoint so as to appropriately change his course heading. With either type of Loran C receiver, the presence of this human element still remains as a source of significant error. Moreover, this entire process of obtaining a position fix has to be frequently repeated at regular intervals so that the mariner is always aware of his current position. The tedious and repetitive nature of this endeavor consumes time; while the sheer repetition of the process proves to be another source of errors.

Therefore, while the art recognized that Loran C navigation could provide sufficiently accurate positional information when used correctly, the art also realized that accurate marine navigation can only result if human error inherent in a marine navigational process could be reduced as much as possible. As such, the art turned to various techniques aimed at automating as much of the entire navigational process as practical.

One such technique that is finding increasing use in the art is a video plotter. Early forms of these plotters provide visual display in terms of latitude and longitude lines of a limited geographic area of interest and indicate the current position of the mariner's vessel in that area. That position is frequently supplied either, in relatively simple systems, through direct manual entry of Loran C position information or automatically, as in sophisticated systems, through a direct digital connection to a suitable Loran C receiver. These systems also provide the capability of displaying courses and waypoints and changing the courses and waypoints at will. As such, these systems advantageously eliminate the need for manual transfer and interpolation of time difference information and course plotting and hence substantially reduce the sources of human error that could occur in marine navigation. Recently, video plotters are becoming available that also possess the ability to store a nautical coastline chart and other relevant navigational information, e.g. obstruction(s) electronic form and draw a cartographic display of coastline data of an area of interest which, in turn, is then overlaid with courses, waypoints and the current position of the vessel. This specific type of plotter will be referred to as video plotters with electronic charting.

While a video plotter, particularly with electronic charting, represents a significant step forward in reducing errors associated with marine navigation and simplifying the overall navigational process, such video plotters known in the art suffer various drawbacks that limit their utility.

First, those video plotters known in the art that rely on direct entry of navigational information, from for example a navigational receiver, are frequently cumbersome to use. Moreover, human error can occur in transposing bearing information from a Loran receiver into the video plotter and thereby corrupt the displayed information. Although direct entry video plotters tend to be less expensive than automatic entry video plotters, direct entry video plotters are often disfavored in most marine navigation applications unless cost is a primary consideration.

Second, video plotters known in the art tend to be rather inflexible. Specifically, video plotters with electronic charting rely on storing pre-defined numeric data that defines a two dimensional location of each separate point in a series of points, which when displayed, collectively forms all coastlines and relevant marine obstruction(s) that occur within a pre-defined geographic area. This data is obtained from a digitized nautical chart. Oftentimes, the digitized chart that is stored within such a video plotter and subsequently displayed covers too large an area, such as the coastline that includes the New York-Boston metropolitan area when in fact only a small area such as the New York harbor area is needed. To handle this situation, currently available video plotters with electronic charting frequently provide a user with the capability to "zoom" into a chart, i.e. change the scale factor of a selected portion of that chart, and thereby fill the entire display screen with a scaled up portion of the stored chart.

Unfortunately, the stored location data, depending upon the method in which it is stored within the plotter, may not be in a form that is amenable to easy scaling. As such, a significant amount of processing time, far more than would be tolerable to a user of the plotter, may need to be expending in changing the displayed scale of a portion of a chart so as to provide a "zoomed" display.

A video plotter with electronic charting that possesses this drawback is described in U.S. Pat. No. 4,428,057 (issued to J. Setliff et al on Jan. 24, 1984). This patent stores coastline information in a run length encoded form which encodes the number of adjacent locations in the stored chart as being adjacent locations of either land or water. While storage of data in this form does minimize memory size, an excessive amount of processing time is often required to manipulate and change the scaling of this encoded data.

To circumvent this processing time limitation, various video plotters with electronic charting provide fixed scaling. Specifically, these plotters would often store several pre-defined portions of a digitized chart in memory, wherein each stored portion has a different pre-set scale factor. As such, an operator would select the particular chart portion and the desired scale factor, if it is available for that chart portion. The plotter would merely access that scaled portion from memory and display it in cartographic form. Generally, to display one chart of coastline data with an adequately high resolution, a substantial number of stored locations is often necessary. Now, if fixed scaling is allowed, then to limit the size of the memory, only a very small number of chart portions each with a correspondingly small number of different scale factors is separately stored in the memory. While this technique markedly reduces processing time needed to generate the desired display, use of a small number of stored charts and chart portions disadvantageously constrains the mariner to be in certain geographic locations on a stored chart before he can zoom into any particular chart portion. Of course, if a mariner frequently travels through a certain area and needs a different chart portion or a portion with a different scale factor than is presently stored in the plotter, one solution would be for the mariner to obtain memory circuits that store the desired portion at the desired scaling. While this solution is likely to be adequate for those mariners who confine their travels to a small area, the need to change memory circuits renders this solution too cumbersome for any mariner that travels over a fairly broad area.

Use of fixed scaling and its inherent inflexibility are evident in the navigation system disclosed in U.S. Pat. No. 4,590,569 (issued to M. Rogoff on May 20, 1986). This system relies on partitioning a large chart into segments of a given pre-defined area, such as one square mile. If a larger area is desired for display, then all the segments that fill this area are accessed and displayed. Unless the chart is also broken into smaller segments, no segments smaller than the pre-defined area can be displayed. Unfortunately, video plotters with electronic charting, such as that described in the '569 Rogoff patent, that rely on use of a fixed scale factors, are often too inflexible and thus disfavored for use in many marine applications.

In addition, automatic entry video plotters known in the art are generally bulky and expensive.

Therefore, a need exists in the art for a compact and relatively inexpensive flexible automatic entry video plotter with electronic charting and specifically such a plotter that provides variable scaling. Furthermore, a need exists in the art for methods of storing and manipulating digitized cartographic data, for example coastlines and nautical obstructions, for use within in such a video plotter that easily permits that data to be displayed at a variable scale factor without requiring excessive processing time. Such a method should also advantageously compress the stored data such that several different charts, at various resolutions, can be stored within the plotter.

SUMMARY OF THE INVENTION

Accordingly, an object of the present invention is to provide a flexible automatic entry video marine navigation plotter with electronic charting that displays a stored nautical chart with overlaid courses, waypoints and bearing lines.

Another object is to provide such a plotter that can display substantially any desired portion of the stored nautical chart at a variable scale factor.

Another object is to provide a method that efficiently compresses the cartographic location data for coastlines and marine obstructions for storage in the video plotter such that several different charts, at various resolutions, can be stored within the plotter.

Another object is to provide a method for use in such a plotter for changing the scale factor of a portion of the stored chart and for displaying a resultant newly scaled chart portion without consuming an excessive amount of processing time.

Another object is to provide such a plotter that is compact and relatively inexpensive.

These and other objects are achieved in accordance with the teachings of the present invention by the inventive video marine navigation plotter which stores geographic data by representing linear geographic data occurring in a geographic region as a sequence of "boxes" (cells), wherein each cell corresponds to a different pre-defined area in the region and contains a different pre-defined portion of the linear geographic data; and using a data structure to store this geographic data in which each of the cells is stored in a memory as a plurality of corresponding sequences of memory fields in which each sequence defines a corresponding line segment that occurs within the cell, such that each such cell carries a different box (cell) number, a first field in the sequence of fields for any one of the cells stores coordinates of a starting point of geographic data located in the one cell and each successive field in that cell stores position offset values measured from a previously defined point in the geographic data in that cell to a next successively defined point of the geographic data existing in the same cell. In addition, this structure includes a table of ranked individual cell numbers that define an order in which the cells should be accessed in order to generate corresponding linear geographic data within the region or in substantially any portion thereof. To display any portion of the geographic data, the plotter first defines the maximum and minimum box (cell) numbers of a range of the cells that collectively contain geographic data which forms the selected portion of the linear geographic data that is to be displayed, then successively accesses each of the cells that lies within the range of cells; and finally incrementally draws a pattern in corresponding cells located within a given area on a display screen, wherein the pattern corresponds to the stored data existing within each of the accessed cells and each corresponding cell is situated on the display screen in a location that corresponds to the location of the accessed cell in the region. Inasmuch this method only stores data for cells existing within a region that contain geographic, e.g. coastline, data, the amount of memory required to store a substantial amount of geographic data, particularly at a high resolution, is advantageously reduced over that required in techniques known in the art. Furthermore, use of stored positional offset value advantageously permits the plotter to quickly and easily change the scale of substantially any desired area.

In accordance with various features of the present invention, the inventive video plotter is able to plot the current track of a vessel and, if desired, generate appropriate signals to an autopilot to navigate along a chosen course or stored track, with or without waypoints. Additional information, such as water temperature and depth encountered by the vessel for points along the track, can be stored and displayed on the current track or at any subsequent time. Furthermore, the plotter, upon user request, can plot Loran C lines of constant time difference (T-D lines) that intersect at a given point. In lieu of plotting a navigational chart, the plotter can also display a profile of depth soundings in terms of current and prior vessel positions. An alarm, i.e. a border alarm, can be set to inform the user whenever the vessel moves within a pre-defined distance of any one of several user defined borders. Positional offsets of the vessel can be entered using a graphic cursor. In addition, the display screen can be centered, by user selection, not only on the current vessel position or the position of the graphic cursor but also on any stored hang, waypoint or start point of a route, track or borderline. Furthermore, additional user defined textual and time and date information for any given waypoint or hang can be stored in an electronic logbook for subsequent recall and display.

DESCRIPTION OF THE DRAWINGS

The teachings of the present invention may be readily understood by considering the following detailed description in conjunction with the accompanying drawings, in which:

FIG. 3 shows the correct alignment of the drawing sheets for FIGS. 3A and 3B;

FIGS. 3A and 3B collectively show the inventive manner in which coastline data for a given nautical chart is stored within plotter 10;

FIG. 5 shows the correct alignment of the drawing sheets for FIGS. 5A–5C;

FIGS. 5A–5C collectively depict a flowchart of Write Routine 500 that is executed, among other places, as part of Main Loop 400;

FIG. 9 shows the correct alignment of the drawing sheets for FIGS. 9A and 9B;

FIGS. 9A and 9B collectively depict a simplified flowchart of Keyboard Sequence Routine 900 that is executed as part of Keyboard Entry Routine 800 shown in FIG. 8;

FIG. 12 shows the correct alignment of the drawing sheets for FIGS. 12A–12D;

FIGS. 12A–12D collectively depict a flowchart of Multi-Data Display Routine 1200 that is executed as part of Write Routine 500 shown in FIGS. 5A–5C;

FIG. 14 shows the correct alignment of the drawing sheets for FIGS. 14A–14F;

FIGS. 14A–14F collectively depict a flowchart of T-D Line Selection and Drawing Routine 1400 that is executed as part of Write Routine 500;

FIG. 25 shows various displays (A)–(D) that actually appeared on the display panel of inventive plotter 10 and which depict illustrative nautical charts at decreasing scale factors; and also shows chart (E) which is a representative portion of a NOAA nautical chart that corresponds to display (D) in this figure.

To facilitate understanding, identical reference numerals have been used where possible to denote identical elements that are common to various figures.

DETAILED DESCRIPTION

After reading the following description, those skilled in the art will readily recognize that the teachings of the present invention can be utilized in a navigational plotter with electronic charting designed for use with nearly any motor vehicle, whether it be a marine vessel, airplane or other vehicle, to process and display linear geographic navigational data, such as pre-defined terrain, here coastline, markings along with radio navigational data and course and track information. However, for purposes of simplifying the following discussion, the invention will be described in the context of such a navigational plotter designed for marine use.

In essence, and as discussed in detail below, the inventive plotter using incoming data from an external positioning system plots a stored coastline chart at a relatively high speed overlaid with various items of user defined navigational information, such as courses, routes, hangs, alarm conditions, waypoints, borderlines and the like. The user has the ability to change any of the user defined information at any time, at which point the plotter will re-calculate and display any affected navigational information. In addition, upon command by the user and as a result of using the inventive data compression technique described herein, the plotter can very rapidly change the scale of the chart in order to enable the user to "zoom" into and magnify a selected area on the chart at any desired scale factor. Building upon these basic capabilities, the inventive system provides several inventive features as discussed in detail below.

With this in mind, the following discussion will proceed to address the hardware that forms the inventive navigational plotter, then address the inventive manner in which coastline data is compressed for storage within the plotter and finally address the software executed within the inventive plotter.

I. Hardware Components of the Inventive Plotter

Figure 1:
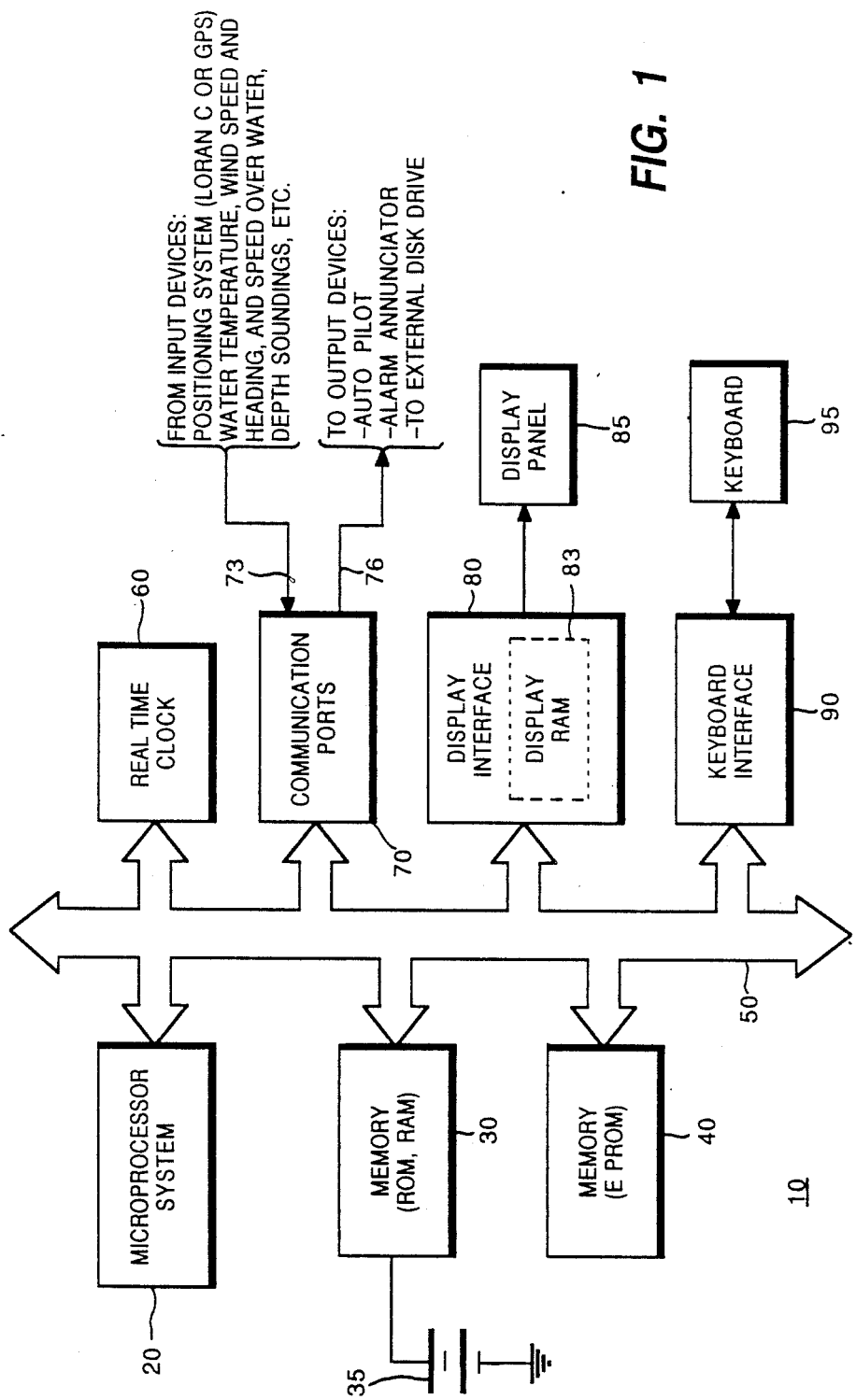
FIG. 1 is an overall block diagram of video marine navigation plotter 10 that utilizes the present invention.

An overall block diagram of the hardware components that form marine navigational plotter 10, which incorporates the teachings of the present invention, is shown in FIG. 1. As shown, plotter 10 is a microcomputer based system formed of microprocessor system 20, memory 30 (which contains read only, i.e. ROM, memory and random access, i.e. RAM, memory), memory 40 (which contains electrically programmable read only, i.e. EPROM, memory), real time clock 60, communication ports 70, display interface 80 and keyboard interface 90, all of which are interconnected through busses 50 that contain appropriate data and address busses.

System 10 obtains incoming positioning data, in either NMEA 0183 format or Furuno (FURUNO is a registered trademark of Furuno Electrid Co., Ltd. of Japan) CIF format, regarding the measured latitude and longitudinal position of a vessel obtained from a global positioning system (GPS) or the like or more typically time difference measurements and associated data obtained from a Loran C receiver. For purposes of simplifying the remaining discussion, the plotter will be discussed in the context of obtaining incoming positioning data from a Loran C receiver. The incoming positioning information is supplied, via leads 73, to a corresponding input port on communication ports 70. Additional input ports are connected to, via leads 73, to digital outputs of various vessel mounted multi-function sensors to obtain data regarding water temperature, wind speed and direction, depth soundings and vessel heading and vessel speed over water. As will be seen below, the data from these vessel sensors due to their limited accuracy is not used by the plotter in determining accurate navigational data but rather can be selected, by a user, for purposes of display and comparison.

Additional input information from a user is provided through keyboard 95 which is connected to keyboard interface 90. This interface continually scans the keyboard and generates appropriate signals to the microprocessor system whenever a key depression is detected. Information regarding the depressed key is obtained under interrupt processing, as will be discussed below, to which an appropriate response will be subsequently furnished.

The plotter provides output information in two forms: displayed overlaid coastline charts, as discussed below, and output data provided to an external device, such as an autopilot. As to the internal display, plotter 10 contains internal display panel 85, which is preferably a 8 inch by 4 inch (approximately 20 centimeters by 10 centimeters) electroluminescent amber on black (or inverse) display panel with a resolution of at least 512 pixels by 256 pixels. This display is driven by display interface 80 which contains display RAM 83. Output data to be displayed is loaded, under program control, by microprocessor system 20, via busses 50 and display interface 80, into appropriate locations within display RAM 83. Display interface 80 continuously scans through the display RAM and generates appropriate signals to write the desired output information onto, and/or otherwise change the state of (such as generating a reverse video display) of display panel 85. To generate output signals to an external device, microprocessor system 20 applies an appropriate data value, under program control, via busses 50 to appropriate output ports within communication ports 70. These output ports are connected, via leads 76, to an autopilot system and conveys information such as cross track error, bearing, steering indicator, arrival flag setting and the like. Different output formats are respectively available for interfacing to an autopilot in NMEA 0180 or 0183 form [for NMEA 0183 form, see: *NMEA 0183 Standard for Interfacinq Marine Electronic Naviqational Devices, Version* 1.5. National Marine Electronic Association, December 1987]. In addition, a separate output port is provided for connection to an external disk drive so as to provide local mass storage of and access of user defined navigational information. In addition, appropriate annunciators, e.g. horns or the like, can be connected to various output ports to enable the plotter to generate an aural indication whenever an alarm condition is triggered.

Real time clock 60 maintains date and time information and various pre-defined timing signals over busses 50 for use in the manner described below.

Memory 30, as noted above, is formed of both ROM and RAM memory. The ROM memory stores the program executed by the microprocessor system. The RAM memory stores various temporary (program) registers and user defined data, such as: borderlines; waypoints; tracks; courses; alarm conditions and alarm on/off status settings including alarm distances (where applicable as discussed below) for the hang alarms, the waypoint alarms, the destination alarm, the cross track error alarm, the border alarms, the anchor alarm, the bottom alarm, the timer and clock and the like. To prevent loss of data in the event of a power outage, the RAM memory located within memory 30 is also powered ("backed up") by battery 35. EPROM memory 40 stores compressed data that forms up to 32 separate pre-defined nautical coastline charts.

II. Data Compression Technique used in the Inventive Plotter

Plotter 10 stores coastline data for up to 32 different nautical charts in EPROM memory. The data for each chart preferably originates with digitized coastline data provided from a desired Digitized National Ocean Service Coastline Chart available in either of two resolutions from the National Oceanic and Atmospheric Administration (hereinafter referred to as a NOAA nautical chart). Alternatively, low resolution world coastline charts, commonly referred to as World Data Bank charts, available from the National Technical Information Service of the United States Department of Commerce can also be used. This data generally, recorded on magnetic tape, takes the form of a series of latitude and longitude coordinates for quantized points that collectively form a coastline.

Inasmuch as storing coastline charts as a string of latitude and longitude coordinates does not allow for relatively fast graphic processing, such as reducing the scale to any desired value in order to "zoom" into a desired region of a chart, and fast displaying, this data is first compressed into a specific inventive form that is suitable for these tasks. Through this technique, a nautical chart is broken into "boxes" (cells) of pre-defined size and only the data for those boxes that contain a portion of a coastline is actually stored. Moreover, if the user selects to display only a portion of a chart, then only those boxes that are contained in that portion will be determined and subsequently displayed. As a result, display and processing speed are both substantially reduced over that heretofore possible in plotters known in the art.

Figure 2:
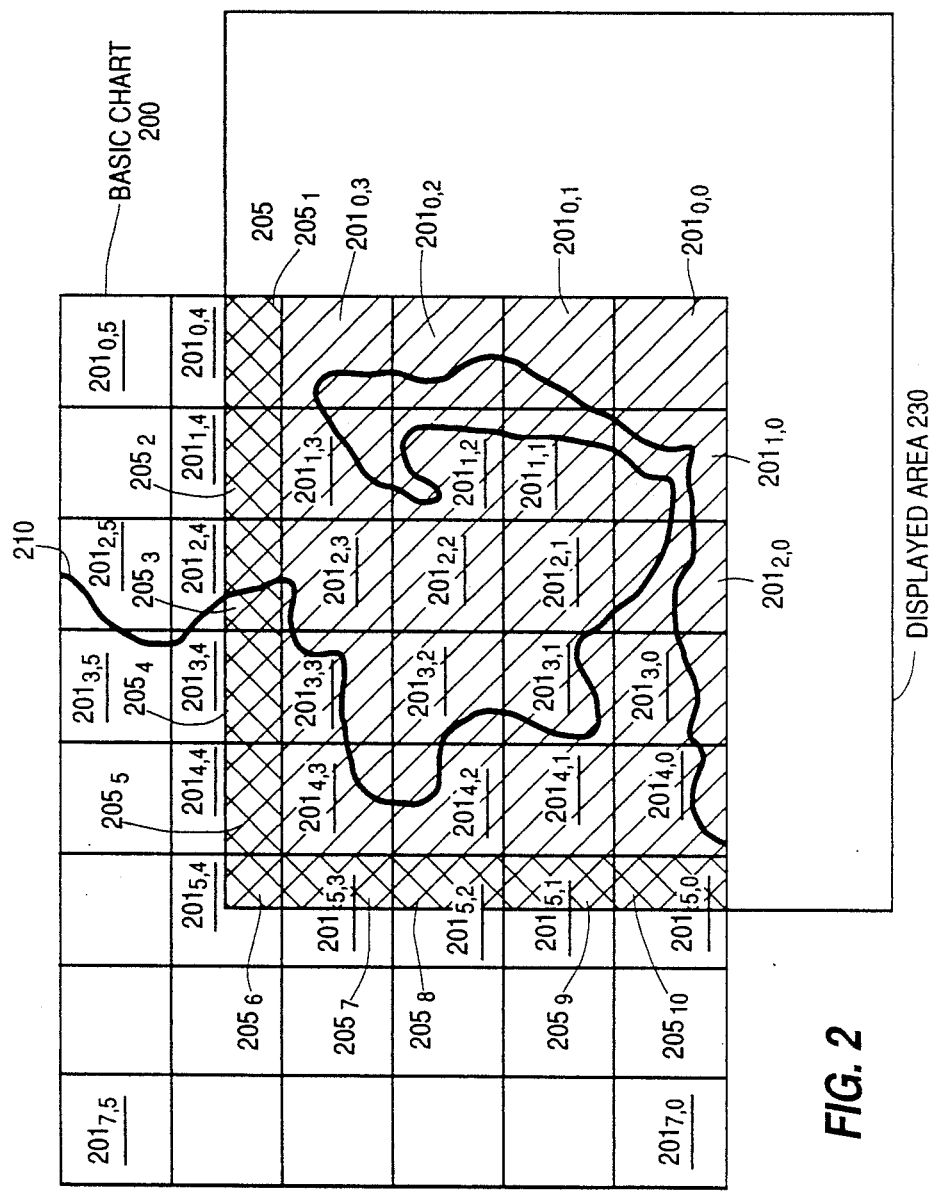
FIG. 2 shows the spatial relationship between coastline data, as stored in plotter 10, and a selected area of this coastline that has been selected for display and the boxes (cells) of stored chart data displayed thereby.

To fully understand the inventive data compression technique, the reader should first refer to FIG. 2 which shows the spatial relationship between coastline data, as stored in plotter 10, and a selected area of this coastline that has been selected for display and the boxes (cells) of stored chart data displayed thereby. FIG. 2 shows a basic nautical coastline chart 200, with the coastline shown as being continuous for purposes of simplified illustration, of the Cape Cod area of Massachusetts. This chart is first completely divided into boxes 201 that consist of equally sized individual square boxes $201_{0,0}$, $201_{0,1}, \ldots, 201_{0,5}, \ldots 201_{1,0}, \ldots, 201_{7,0}, \ldots, 201_{7,5}$. As can be seen coastline 210 does not traverse all of boxes 201 but rather boxes $201_{2,5}$, $201_{3,5}$, $201_{3,4}$, $201_{2,4}$, $201_{2,3}$, $201_{3,3}$, $201_{4,3}$, $201_{4,2}$, $201_{3,2}$, $201_{3,1}$ $201_{2,1}$, $201_{2,0}$, $201_{1,0}$, $201_{1,1}$, $201_{1,2}$, $201_{1,3}$, $201_{0,3}$, $201_{0,2}$, $201_{0,1}$, $201_{0,0}$, $201_{3,0}$ and $201_{4,0}$. As such, data for only these specific boxes is stored within EPROM. As will be discussed in detail in conjunction with FIGS. 3A and 3B below, the data for each box takes the form of a series of connected line segments that collectively defines the location of the coastline data situated within that box relative to the display screen, with each segment being composed of a starting location, defined through nine bit integer orthogonal coordinate values, followed by the location, expressed as five bit integer orthogonal increments (offsets measured as a five bit integer number of identical pre-defined steps) from an immediately prior position, of each successive point situated along that segment. With this overall process in mind, the latitude and longitude data provided by NOAA can be readily transformed into the "box" data using appropriate software executing in any well known computer. In the event points are missing from the NOAA charts which would otherwise cause any incremental value to exceed five bits, then one or more intermediate points are appropriately inserted into the transformed values and subsequently stored with the EPROM in order to maintain the incremental values within five bit boundaries. Now, in many instances, as described below, the plotter will only display a certain area of the stored chart. In this case, in order to reduce the time required to display the portion of the chart, only those boxes that contain coastline data and are situated within the area to be displayed will be accessed. Specifically, if area 230 is to be displayed, then only those boxes contained within chart 200 that fall within this area will be displayed. Hence the displayed boxes, indicated by single crosshatching, include boxes $201_{2,3}$, $201_{3,3}$, $201_{4,3}$, $201_{4,2}$, $201_{3,2}$, $201_{3,1}$ $201_{2,1}$, $201_{2,0}$ $201_{1,0}$, $201_{1,1}$, $201_{1,2}$, $201_{1,3}$, $201_{0,3}$, $201_{0,2}$, $201_{0,1}$, $201_{3,0}$ and $201_{4,0}$. Data for boxes $201_{2,2}$ and $201_{0,0}$ would not be stored and hence not displayed since no coastline data falls within these boxes. Furthermore, since an edge of displayed area 230 intersects the coastline data stored within box $201_{2,4}$, and particularly within doubly cross-hatched area 205 and specifically within region $205_3$ contained therein, well known clipping techniques, preferably the Cohen-Sutherland clipping algorithm (described in J. D. Foley and A. Van Dam *Fundamentals of Interactive Comouter Graphics*, Addison Wesley ©1982, p. 146ff) are used for the coastline data contained in box $201_{2,4}$ to locate, through interpolation, a location of an appropriate point on the edge of the display screen that corresponds to the last point in the coastline data stored in this area that can be displayed. Clipping would also be applied for the coastline data in the remaining boxes that are intersected by an edge of the displayed area, i.e. if coastline data existed within regions $205_1$, $205_2$, $205_4$, ..., $205_{10}$. Since no such intersection exists here other than in region $205_3$, clipping would only be utilized in conjunction with box $201_{2,4}$. Other suitable clipping algorithms can also be used.

Figure 3A:
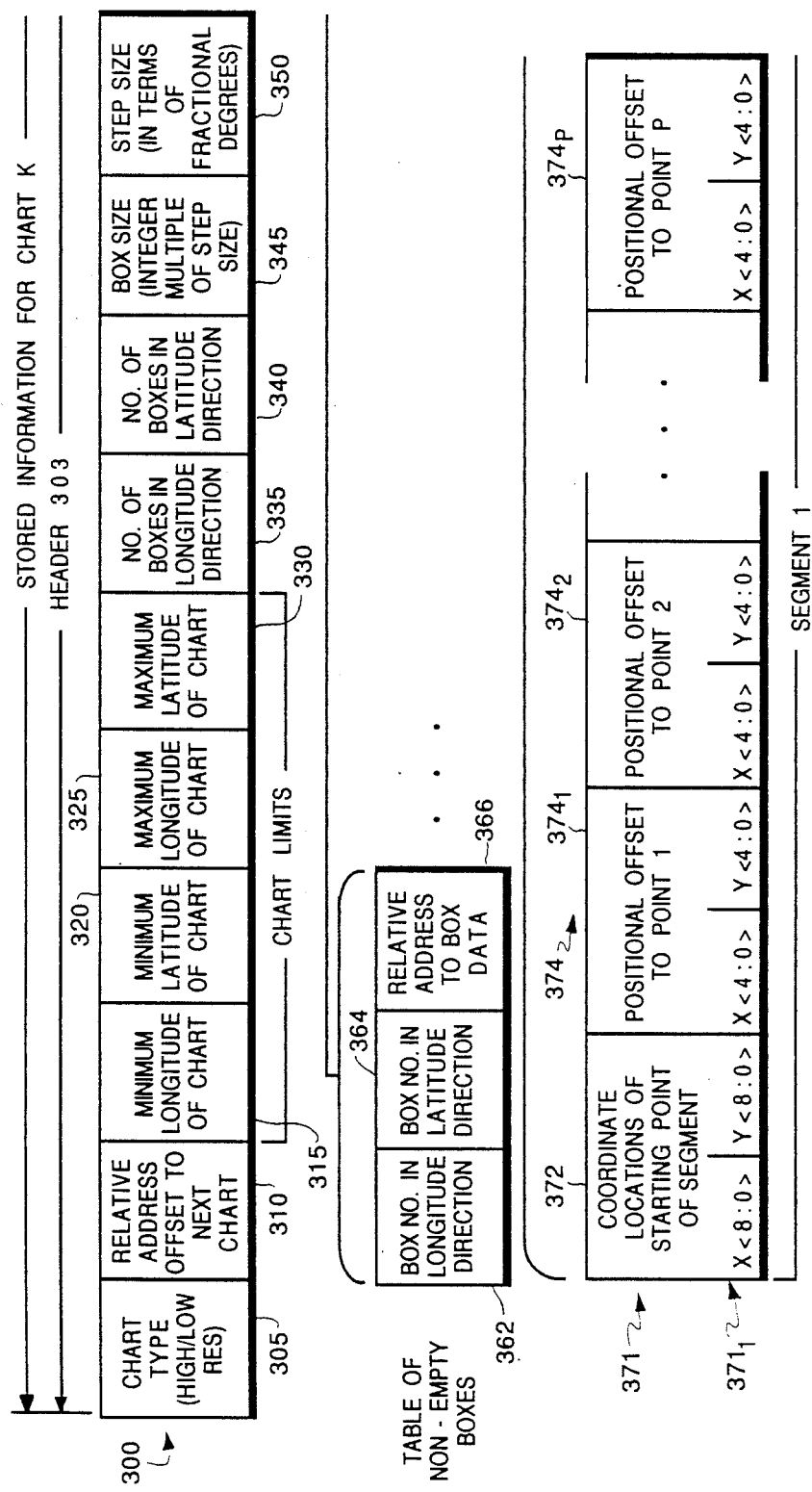

Now, with this understanding in mind, the inventive manner in which coastline data that forms a given nautical chart, illustratively chart k, is stored within plotter 10 is collectively depicted in FIGS. 3A and 3B, for which the correct alignment of the drawing sheets for these figures is shown in FIG. 3. As shown, this information consists of header 303 followed by box data 370. Specifically, header 303 consists of fields 305, 310, 315, 320, 325, 330, 335, 340, 345, 350, 355 and 360. Field 305 is a flag that specifies the type of stored chart. Two kinds of charts can be stored: a high resolution chart and a low resolution chart. Two types of charts can be displayed in order of priority: a chart assigned as being a first type, i.e. a high resolution chart is displayed whenever the area corresponding to the display screen is totally contained within the stored chart and the scale factor is larger than a pre-defined value (typically 1:200,000); or a chart assigned as being a second type, i.e. a low resolution chart that is to be displayed whenever no chart of the first type is to be displayed. Field 310 provides a relative address to the starting location in EPROM memory where data for the next successive chart is stored. The limits of the area contained within the stored chart, in terms of minimum and maximum latitude and longitude values, are provided in fields 315 and 320 for the minimum longitude and latitude values and in fields 325 and 330 for the maximum longitude and latitude values, respectively. The values stored within fields 335 and 340 respectively specify the number of boxes that are contained in the longitude and latitude directions within the stored chart. The value of field 345 specifies the size of each box, in terms of an integer multiple of the step size. The value of field 350 specifies the step size in terms of fractional degrees of either latitude or longitude. The value stored in field 355 specifies the size, in bytes, of a box table, stored in field 360. The box table contains a entry for each separate non-empty box that forms the stored chart. One such entry for a specific box contains fields 362 and 364 which provide the relative coordinate location of this box measured in terms of boxes occurring in the longitude and latitude directions, respectively. Field 366 contains a relative address to the starting location within box data field 370, illustratively field $370_1$, at which data for this specific box is stored.

Following the box table stored within field 360, field 370 consists of a sequence of separate fields $370_1$, $370_2$, ..., $370_s$ that stores coastline data for separate corresponding non-empty boxes that collectively form chart k. As discussed above, within anY stored box, coastline data is represented as a series of line segments with a starting point followed by orthogonal offset distances to each successive point situated along that segment. Data structure 371 shows the structure of the data stored for one such box, illustratively, that stored within field $370_1$ and details the structure of one such segment, illustratively segment $371_1$. As shown, within segment $371_1$, field 372 contains two nine bit numbers which represent the location in orthogonal coordinates (X,Y), measured in integer multiples of the step size, of the location of the starting point within that box. Within any box, the lower right hand corner of that box represents its origin with a value of (0,0). The locations of each successive point along that segment is stored in fields 374 which consist of individual fields $374_1$, $374_2$, ..., $374_p$. Specifically, the location of the second point occurring along the segment is stored within field $374_1$ and is represented by five bit orthogonal offset distances, measured as integer multiples of the step size, that occur between the location of that point and the starting point. The location of each successive point along the segment is stored in a corresponding successive field within fields 374 and is represented by its orthogonal offsets from its immediately prior point and so on. At its end, field $371_1$ contains two special delimiters. Specifically, at the conclusion of a segment, five bit END OF SEGMENT DELIMITER field 376 is set to the binary value "10000" (decimal value "−16"). If the current segment is the last segment in a box, then a one bit END OF BOX flag stored in box 378 is set to a one. The structure depicted for field $371_1$ is then successively repeated for each successive segment in the box. The structure depicted for field $370_1$ is successively repeated for each successive box in the stored chart.

Inasmuch as the chart is stored in vector form, essentially segments with starting points and offset values, and processed in that manner, changing the scale factor of any desired area on the chart advantageously becomes a very simple task which requires relatively little processing time to accomplish.

The discussion will now address the software that is executed within the inventive plotter.

III. Software Executed in the Inventive Plotter

The software that executes within the inventive plotter basically consists of a main loop that constantly executes on an iterative basis and various routines that are directly or indirectly called by the main loop.

A. Main Loop 400

Figure 4:
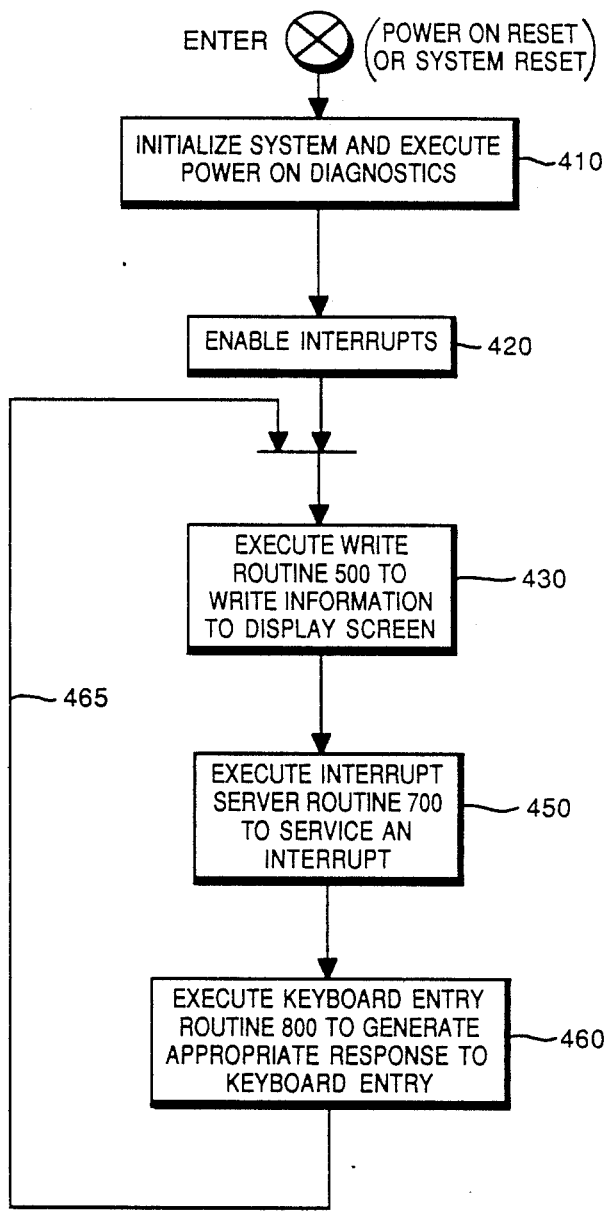
FIG. 4 depicts an overall flowchart of Main Loop 400 that is executed by microprocessor system 20 which forms part of plotter 10.

FIG. 4 depicts an overall flowchart of Main Loop 400 that is executed by microprocessor system 20 which forms part of plotter 10.

Upon entry into this routine, which occurs upon a power on reset or system reset condition, execution first proceeds to block 410. This block, when executed, initializes the entire system and executes various power on diagnostics to check the operation of the system. Once this has occurred, execution proceeds to block 420 which enables the microprocessor interrupts. Thereafter, block 430 is executed which, in turn, executes Write Routine 500 (discussed in detail below in conjunction with FIGS. 5A–5C) to update all stored navigational information with current values and then write current information onto the display screen. This information typically consists of a stored chart along with user defined navigation information. After block 430 has executed, execution passes to block 450 which executes Interrupt Server Routine 700 (which is discussed in detail below in conjunction with FIGS. 7A and 7B) to appropriately service an interrupt in the event an interrupt has just occurred or to await the occurrence of and process the next interrupt. Once the interrupt has occurred and been fully processed, execution proceeds to block 460 which executes Keyboard Entry Routine 800 which, if the interrupt was caused by a keyboard entry, generates an appropriate response to the entry. Once this has occurred, execution then loops back, via path 465, to block 430 to execute Write Routine 500 to continue writing information to the display panel.

B. Write Routine 500

As noted above, this routine, when executed, updates all stored navigational information with current values and then writes current information onto the display panel. A flowchart of Write Routine 500 is collectively depicted in FIGS. 5A–5C, for which the correct alignment of the drawing sheets for these figures is provided on FIG. 5.

Upon entry into this routine, execution proceeds to block 505 which, when executed, successively transfers a new value of input data obtained from each of the input devices (the external positioning system and multi-function vessel sensors as well as proprietary input devices such as an Admiral Marine Master Nav Series Loran C Receiver manufactured by Admiral Marine Electronics located in Long Island City, N.Y. [Master Nav is a trademark of World Research Institute for Science and Technology located in Long Island City, N.Y.] from a corresponding temporary buffer into an appropriate variable stored within the RAM memory or a register for subsequent processing. Thereafter, block 510 is executed to calculate the current position, in latitude and longitude, of the vessel using two T-D measurements provided by a Loran C receiver or accept direct latitude/longitude coordinates from a global positioning system or the like. Thereafter, block 510 invokes Multi-Data Storage Routine 1100, (which will be discussed in detail below in conjunction with FIG. 11) to record the value(s) of water temperature and/or depth occurring at the current vessel position. Generally, hyperbolic T-D lines will intersect in two different points (solutions), representing positions situated often several hundred miles apart. Occasionally, the first solution that is obtained will not be the desired one. Hence, after block 510 has executed to find one solution, execution proceeds to block 515 which, in response to a keyboard entry by a user, will search for a second Loran C position given the two T-D measurements and display the numerical latitude/longitude position information on the display screen. This second solution will then be used unless the user requests, through an appropriate keyboard entry, to re-calculate the first solution. Once block 515 has been fully executed, execution proceeds to block 520. This block, when executed, will provide the current vessel position, via an output port, to an external device (e.g. a fish finder) if the user has previously instructed the plotter to provide such information, as discussed in detail below, and at least one second has elapsed since the most recent position was so provided. Once block 520 has fully executed, execution proceeds to decision block 523 which determines whether a depth profile, as discussed below, in lieu of coastline data, should be displayed. If coastline data is to be displayed, then execution proceeds, via the NO path emanating from discussion block 523, to block 525. This latter block, when executed, re-draws the latitude and longitude grid of the stored chart, if needed, and updates the position of the vessel, displayed through a diamond shaped character, if this position has changed since the last update. Once this has occurred or in the event a depth profile is to be displayed in which case execution proceeds along the YES path emanating from decision block 523, block 524 is executed to display the depth profile on the display panel. Thereafter, execution proceeds to block 530. This block successively performs several operations. First, all the navigation information, such as vessel speed, course and the like, is updated using the current input data with the requested navigational information then displayed on the display panel. Second, if the user has selected track navigation, i.e. for the plotter to calculate the values of appropriate autopilot signals for navigation in a desired direction along a selected track, block 530 executes Track Navigation Routine 1300 (which is discussed in detail below in conjunction with FIGS. 13A and 13B) to, inter alia, calculate distance and bearing to an appropriate target point of a current track. In addition, block 530 checks, by executing appropriate routines, the current navigational information against all alarm conditions that have been enabled by the user and triggers the appropriate alarm(s), if any. The available alarm conditions include: a hang alarm(s), a waypoint alarm, a destination alarm, a cross track error alarm, border alarm(s) (in this regard Border Alarm Trigger Routine 1800 is specifically executed), an anchor alarm and a bottom alarm. Inasmuch as all the alarm trigger routines are very similar, only Border Alarm Trigger Routine 1800 will be specifically discussed. Once all the alarms have been checked, then execution proceeds to block 535. This block, when executed, provides updated signals to an autopilot if at least one second has elapsed since the last update of these signals occurred. Execution then proceeds to block 540 which, if the display screen is not writing in a full graphics mode, i.e. a split screen graphics/text mode is being used, and the plotter is currently displaying a "Main Display" (in this regard see displays (A), (B), (D) and (F) shown in FIG. 26) when the plotter is not executing a menu routine such as a Menu Routine 1000, which is discussed below, or an editing routine, such as Hang/Waypoint Log Routine 2300, also discussed below, writes associated textual information regarding user selected navigational information onto the display panel. This information can be the location of the graphic cursor if it is in use, a hang location or a waypoint location.

Figure 5B:
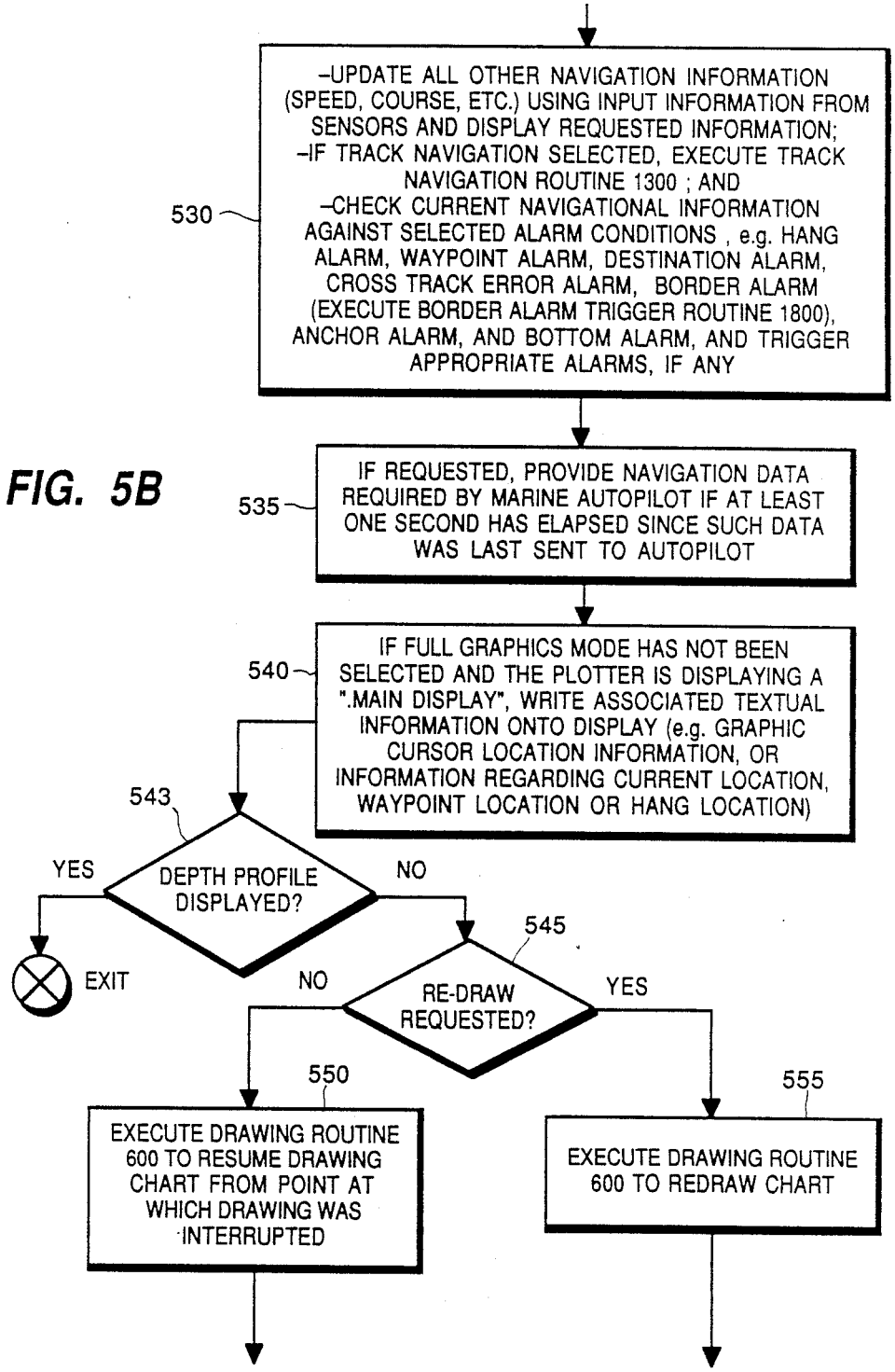
Figure 5C:
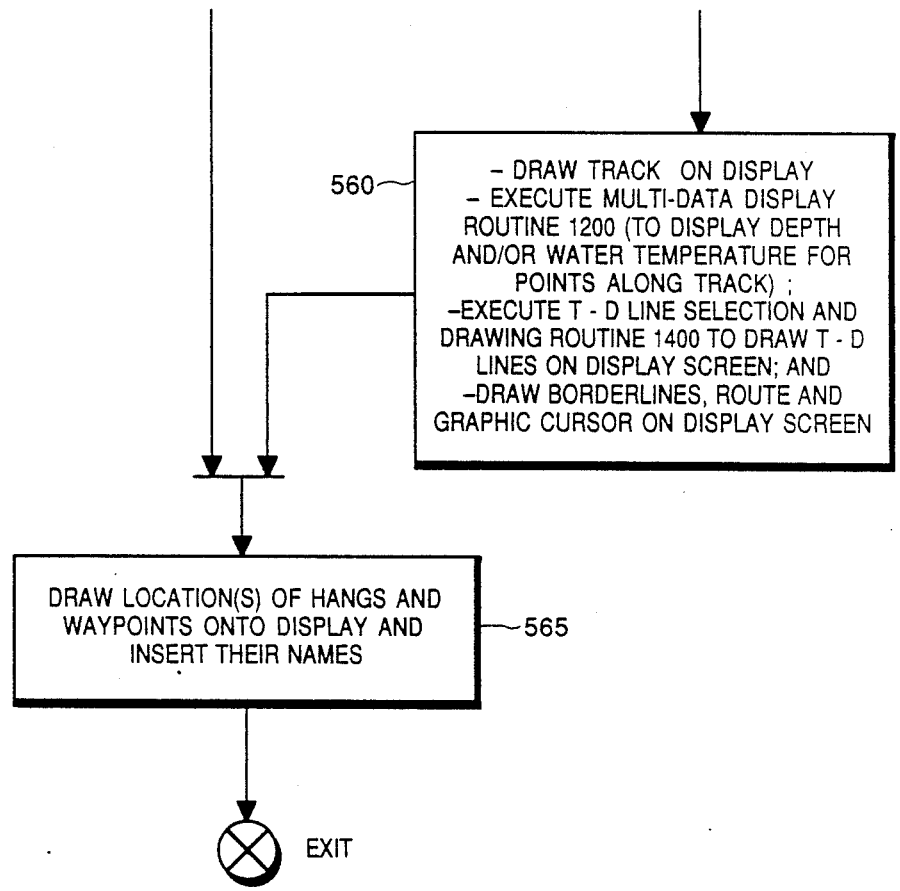

Once block 540 has executed, execution then proceeds, as shown in FIGS. 5A–5C, to decision block 543 to determine if a depth profile is to be displayed. If a depth profile is to be displayed, then execution exits from routine 500, via the YES path emanating from decision block 543. Alternatively, if such a profile is not to be displayed, then execution proceeds, via the NO path emanating from decision block 543 to block 545. This latter block, when executed, determines whether the user has requested that the stored chart that is presently being displayed should be re-drawn onto the display panel. If the user has not requested a re-draw, then execution proceeds, via the NO path emanating from this decision block, to block 550. This latter block, when executed, executes Drawing Routine 600 which continues drawing the chart at a point at which drawing was temporarily suspended, e.g. to process an interrupt. Alternatively, if the user has requested a re-draw, then execution proceeds, via the YES path emanating from this decision block, to block 555 which, when executed, invokes Drawing Routine 600 to completely re-draw the stored chart. Once the chart is fully re-drawn, execution proceeds to block 560. This block, when executed, performs several functions. First, it draws the current track on the display panel. Thereafter, it executes Multi-Data Display Routine 1200 (which is discussed in detail below in conjunction with FIGS. 12A–12D) to display recorded values of water temperature and/or depth data that have occurred for prior points along the track. Thereafter, block 560 executes T-D Line Selection Routine 1400 (which is discussed in detail below in conjunction with FIGS. 14A—14F) to determine the two T-D lines that will be drawn and then draw these T-D lines on the display panel. Thereafter, block 560 overlays user defined borderlines, routes and the graphic cursor onto the information appearing on the display panel. After either block 550 or 560 has completely executed, execution proceeds to block 565. When executed, block 565 draws the location(s) of hangs and waypoints and also inserts their accompanying names onto the info a on the display panel. Execution also reaches block 565 following the execution of block 550. Once block 565 has fully executed, the chart and all its accompanying navigational information is fully drawn. As such, execution then exits from routine 500.

C. Drawing Routine 600

Figure 6A:
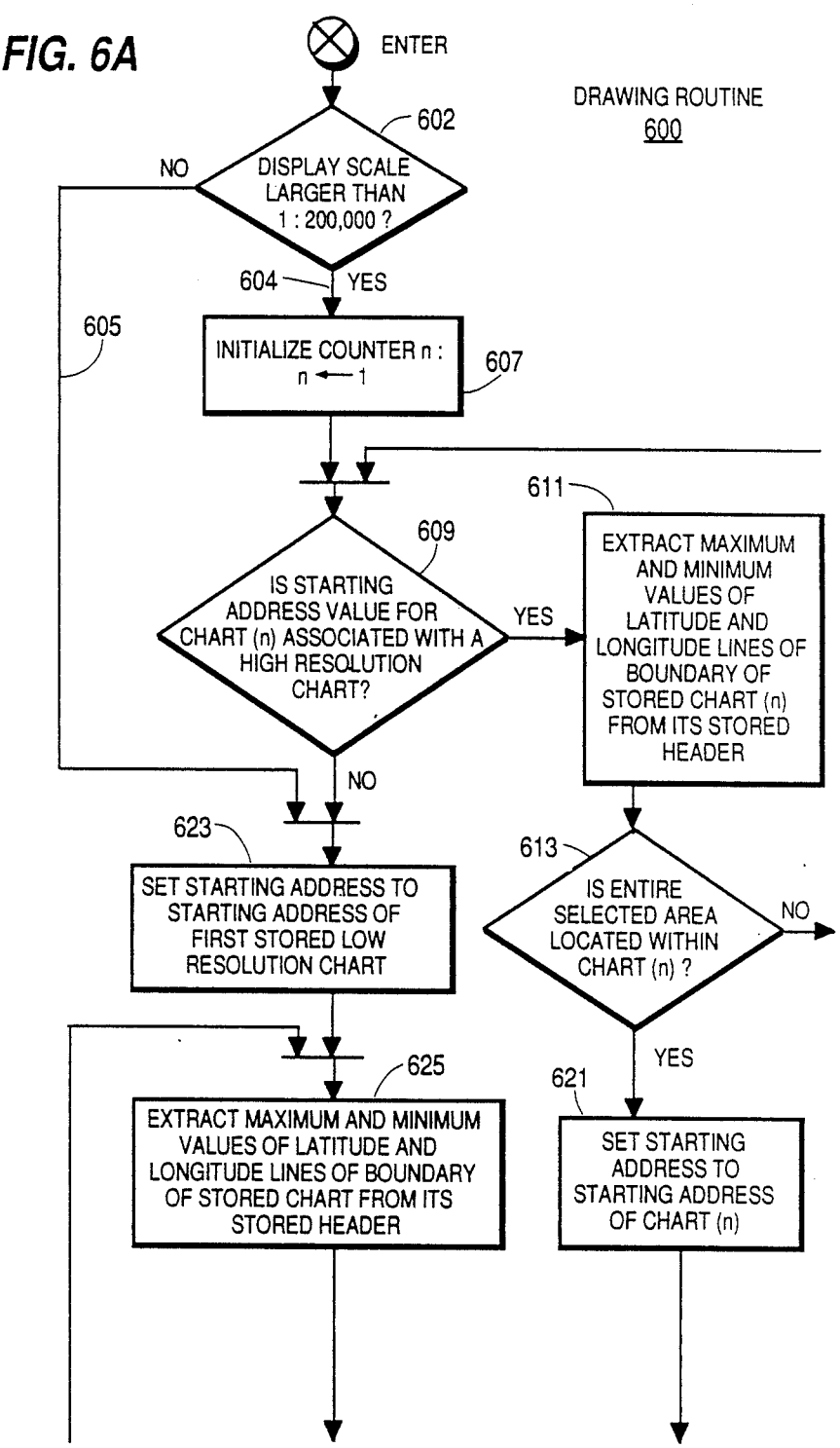
FIGS. 6A–6F collectively depict a flowchart of Drawing Routine 600 that is executed as part of Write Routine 500 shown in FIGS. 5A–5C.
Figure 6B:
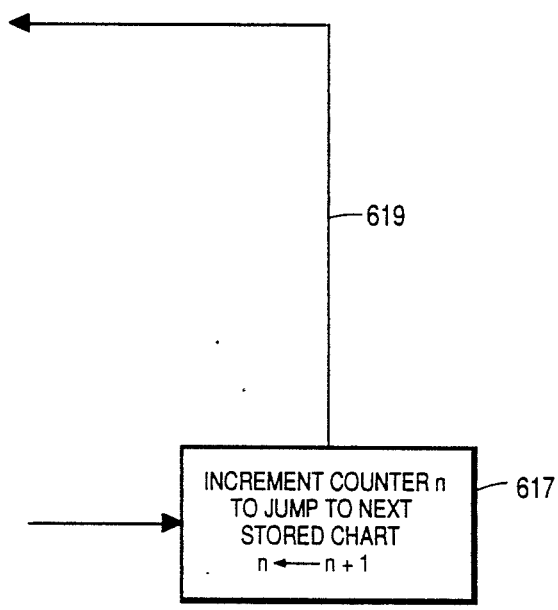
Figure 6C:
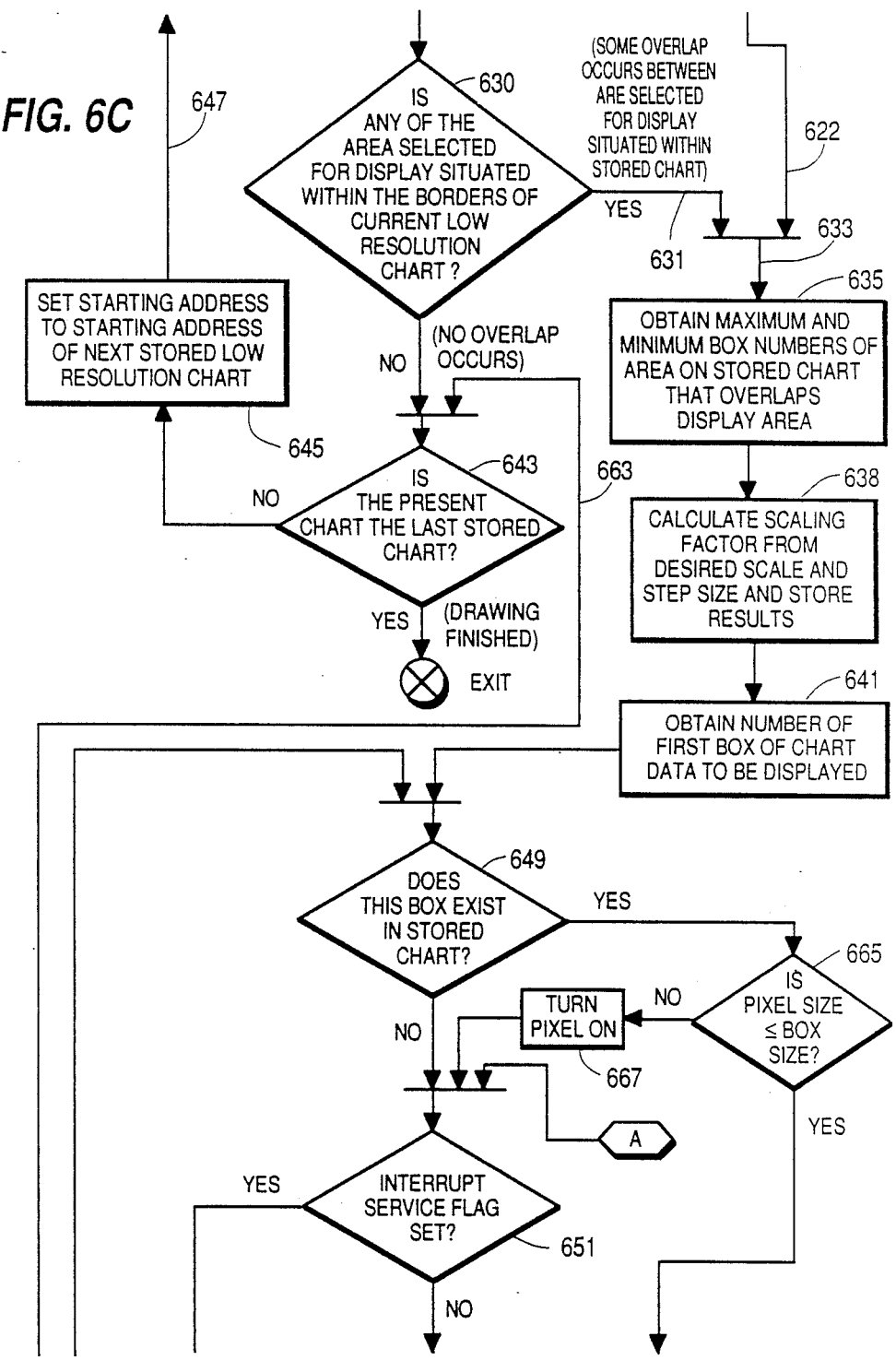
Figure 6D:
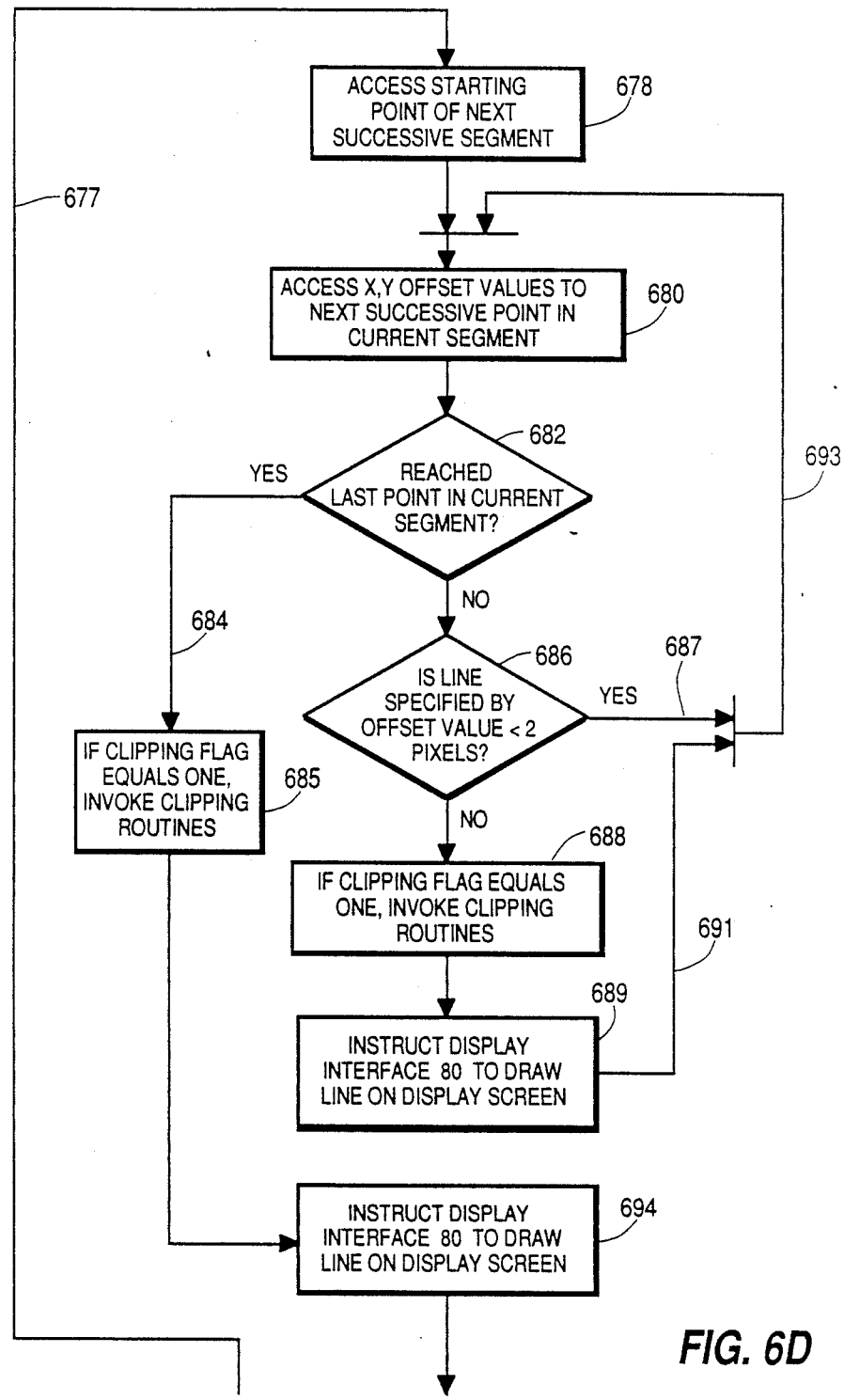
Figure 6E:
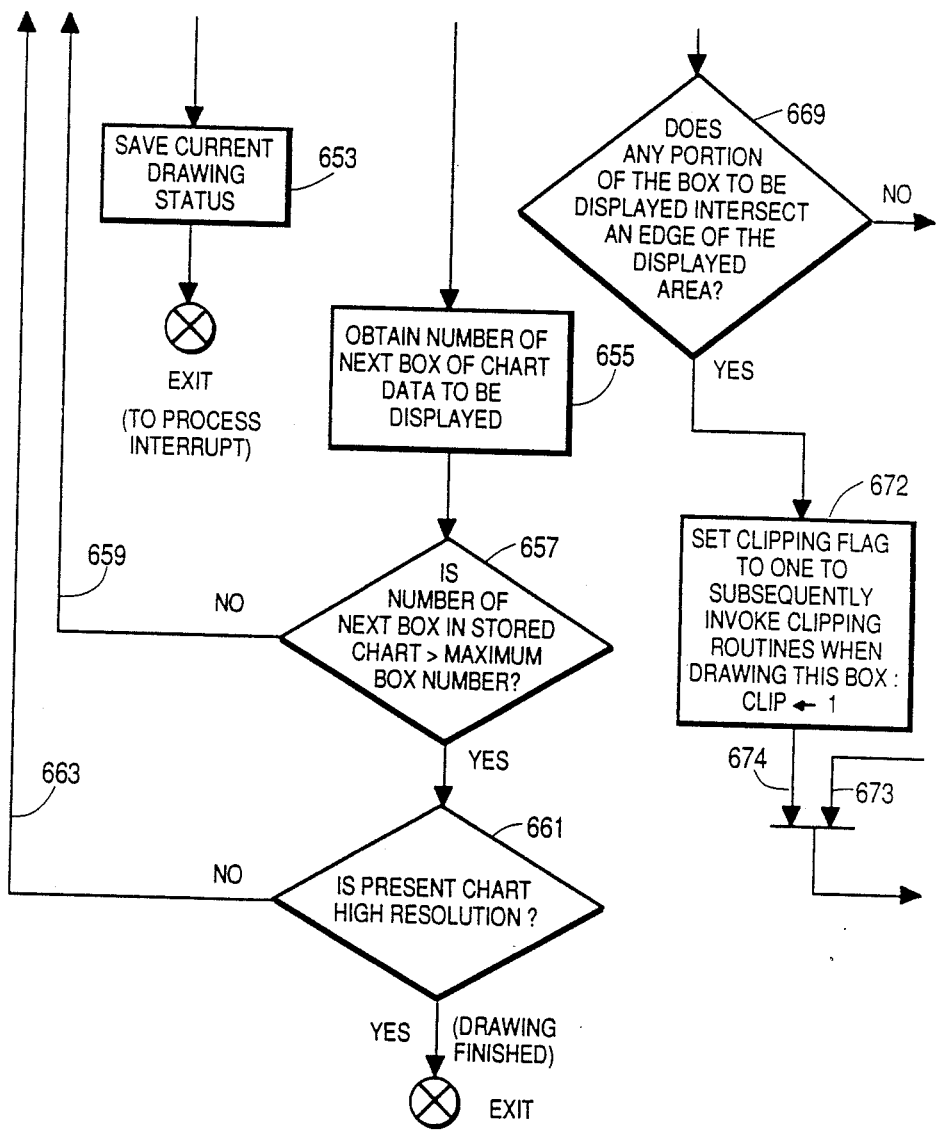
Figures 6, 6F:
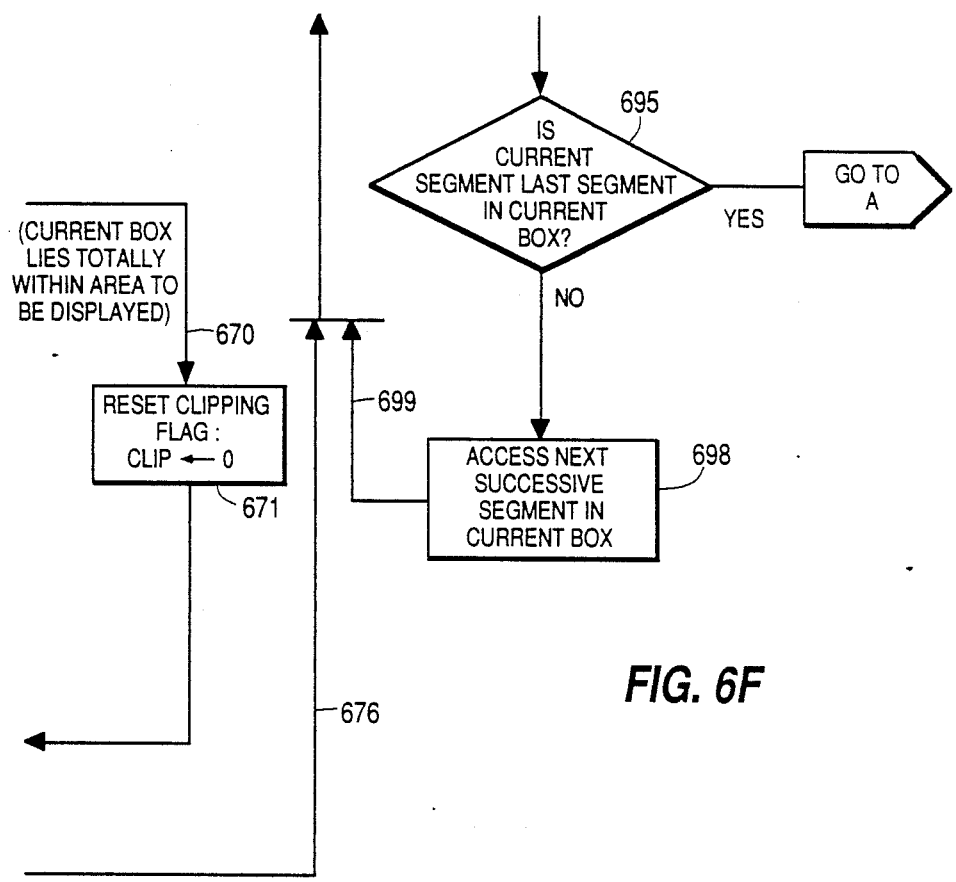
FIG. 6 shows the correct alignment of the drawing sheets for FIGS. 6A–6F.

As noted above, this routine, when executed, draws a stored nautical coastline chart on the display panel. A flowchart of Drawing Routine 600 is collectively depicted in FIGS. 6A–6F, for which the correct alignment of the drawing sheets for these figures is given in FIG. 6.

Upon entry into this routine, execution first proceeds to decision block 602. This decision block determines whether the display scale chosen by the user is greater then 1:200,000. In the event the scale is larger than 1:200,000, then execution proceeds, via YES path 604, to block 607 which, when executed, initializes the contents of counter "n" to one. This counter selects the appropriate chart to initially display. Thereafter, execution proceeds to decision block 609 which determines whether the starting address of chart "n" is associated with a high or low resolution chart. All high resolution charts are sequentially stored in memory 40 (see FIG. 1). Hence, in the event chart "n" is a high resolution chart, then execution proceeds, as shown in FIGS. 6A–6F, via the YES path emanating from decision block 609, to block 611. This latter block, when executed, extracts the maximum and minimum values for the latitude and longitude lines of the boundary of this chart from its stored header. Once this occurs, then execution proceeds to decision block 613 which determines whether, based upon these latitude and longitude values, the selected area is located entirely within the stored high resolution chart. If a total overlap does not occur, then this chart will not be displayed. In this case, execution proceeds, via the NO path emanating from decision block 613, to execution block 617 to increment the value of counter "n" by one and thereby jump to the next chart. However, if a complete overlap does occur, then this high resolution chart will be displayed. In this case, execution proceeds, via the YES path emanating from decision block 613, to block 621. This latter block, when executed, sets the starting address used in the Write Routine to that associated with the starting address of chart "n". Execution then proceeds, via paths 622 and 633, to block 635 to begin drawing the overlapped portion of this chart.

Alternatively, if the display scale chosen by the user is less than 1:200,000, in which case execution has been routed either to NO path 605 emanating from decision block 602 or to the NO path emanating from decision block 609, then execution proceeds to execution block 623. This execution block sets the starting address used in the Write Routine to that associated with the starting address of the first stored low resolution chart. Once this occurs execution proceeds to block 625 which, when executed, extracts the maximum and minimum latitude and longitude values of the boundary of this chart from its stored header. Thereafter, execution proceeds to decision block 630. This decision block determines whether any overlap, partial or complete, occurs between the current low resolution chart and the area thereof that has been selected to appear on the display panel. If any overlap exists, then decision block 630 routes execution, via YES path 631 and path 633, to execution block 635 to begin drawing the overlapped portion of this chart. Alternatively, if no overlap at all occurs between the area on the stored chart and the chosen area to be displayed, then decision block 630 routes execution via its NO path to decision block 643. This latter decision block determines whether the current chart is the last chart that has been stored in the plotter. If the current chart is the last chart, then a chart can not be drawn and hence execution exits from routine 600, via the YES path, emanating from decision block 643. If, however, other stored low resolution charts exist within the plotter, then decision block 643 routes execution, via its NO path, to block 645 which sets the starting address used by the Write Routine to that associated with the next successive stored low resolution chart. Once this occurs, execution proceeds, via path 647, back to block 625 to extract the maximum and minimum values of latitude and longitude of the boundary of the next chart from its stored header and so on.

Once execution reaches block 635, this block obtains the maximum and minimum box numbers for the boxes located within the current chart that are to be displayed on the display panel. Thereafter, execution proceeds to block 638 which, when executed, calculates a scaling factor given the scale desired by the user and the step size associated with this chart. Next, execution proceeds to block 641 to access the number of the first box that is located in the area that is to be displayed of the stored chart.

Execution then proceeds to decision block 649 to determine whether the first box in the display area exists within the stored chart. In the event, this box does not exist within the stored chart, i.e. this box in the chart is empty, then decision block 649 routes execution, via its NO path, to decision block 651. This latter decision block tests the interrupt service flag to determine whether an interrupt has occurred and hence requires servicing. If such an interrupt has occurred, then decision block 651 routes execution, via its YES path, to block 653 which, when executed, saves the current drawing status, e.g. box number, of the current chart being drawn inasmuch as drawing of this chart will resume as soon as the interrupt has been fully serviced. Once this status is saved, execution exits from Drawing Routine 600 and enters Interrupt Server Routine 700 (which shortly will be discussed below in conjunction with FIGS. 7A and 7B) to process the interrupt. Alternatively, if an interrupt has not occurred, then decision block 651 routes execution, via its NO path, to block 655. This latter block, when executed, obtains the number of the next box of chart area, that is to be displayed, i.e. if this box exists in the stored chart be the next successive box of data to be displayed within the overlapped area. Once this occurs, execution proceeds to decision block 657 which determines, whether the present box has a box number which is greater than the maximum box number in the stored chart determined through execution of block 635. If the prior box does not have a box number in excess of the maximum box number, then decision block 657 routes execution, via NO path 659, back to decision block 649 to determine whether the present box in the displayed area actually exists in the stored chart and so on. If, however, the prior box corresponded to the box having the maximum box number in the stored chart, then decision block 657 routes execution, via its YES path, to decision block 661. This latter decision block determines whether the current chart is a high resolution chart. If it is such a chart, then no further charts can be drawn and hence execution exits from routine 600 via the YES path emanating from decision block 661. Alternatively, if the present chart is a low resolution chart, then perhaps the next successive low resolution chart, i.e. an adjoining chart, exists and can be displayed. In this case, decision block 661 routes execution, via NO path 663, back to decision block 643.

Alternatively, if decision block 649 determines that the current box in the display area exists within the stored chart, then this decision block routes execution, via its YES path, to decision block 665. This block, when executed, determines whether the size of the displayed box is less than or equal to the pixel size on the display panel. If the box size is equal to or smaller than the pixel size, then to save processing time, the corresponding pixel is merely turned on in the display. To accomplish this, decision block 665 merely routes execution to block 667 which energizes this particular pixel. Thereafter, execution proceeds to decision block 651 and so on to perform interrupt processing and subsequently determine the next box of chart data. Alternatively, if the size of the box to be displayed is greater than that of a single pixel, then decision block 665 routes execution, via its YES path, to decision block 649. This latter decision block determines whether any portion of the box to be displayed intersects with a edge of the display screen. If such an intersection is detected, then decision block 669 routes execution, via its YES path, to block 672 which sets the value of a clipping flag, i.e. flag "clip", to one to subsequently invoke the clipping routines (not shown but discussed above) when this box in the stored chart is being drawn on the display panel. Execution then proceeds to path 674. If, however, no such intersection is detected, then decision block 669 routes execution via NO path 670 to block 671 which, when executed, resets the value of the clipping flag to zero. Execution then proceeds via path 673.

Execution then proceeds, either via path 670 or 674 and via path 676 and 677, to enter a loop consisting of block 678-698 to draw each line segment contained within the current box onto the display panel. Specifically, block 678, when executed, accesses the starting point of the next successive line segment in the current box, if this loop was just entered then the first segment will be accessed. Once this occurs, then execution proceeds to block 680 which, when executed, accesses the X and Y offset values to the next successive point in this segment. Thereafter, decision block 682 is executed to determine, whether this point is the last point in the current segment, i.e. is the next item stored in the data for this segment the END OF SEGMENT DELIMITER. In the event that this point is not the last point in the segment, then decision block 682 routes execution to decision block 686. This latter decision block determines, from the X and Y offset values, whether the length of a connecting line is less than the distance occupied by adjacent two pixels on the display panel. If this distance is shorter, than the connecting line is assumed to be too short to draw and hence to decrease the display time, this line is not drawn. In this case decision block 686 routes execution, via YES path 687 and path 693, back to block 680 to access and display the next set of offset values for the current segment. Alternatively, if the length of this segment is equal to or greater than two pixels, then decision block 686 routes execution, via its NO path, to block 688 to invoke the clipping routines, if the value of the clipping flag is set to a one, in order to determine an appropriate endpoint for the current segment. Execution then proceeds to block 689. This latter block instructs display interface 80 (see FIG. 1) to draw a line beginning at the starting position (or prior position within this segment) and extending in the direction and having a length specified by the offset values. Thereafter, as shown in FIGS. 6A-6F, execution proceeds via paths 691 and 693 back to block 680 to access the next set of offset values to extend the current segment to the next successive point therein and so on. Now, when the last point in the current segment has been reached, then decision block 682 routes execution, via YES path 684, to block 685 to invoke the clipping routines, if the value of the clipping flag is set to a one in order to determine an appropriate endpoint for the current segment and hence modify the offset values to yield this endpoint. Once this occurs, execution proceeds to block 694. This block, when executed, instructs the display interface to draw a line connecting the prior point in the current segment to the final point in the segment and extending in the direction and having a length specified by the last pair of X and Y offset values for this segment. Once this occurs, execution proceeds to decision block 695 which determines whether this segment is the last segment in the current box, i.e. whether the END OF BOX flag for this segment is set to one. In the event this segment is not the last segment in the current box., then decision block 695 routes execution, via its NO path, to block 698 which accesses the data for the next successive segment in the current box within the stored chart. Thereafter, execution proceeds, via paths 699 and 677 back to block 678 to access the starting point of the next successive line segment in the current box and so on. Alternatively, if the current segment is the last segment in the current box, then decision block 695 routes execution, via YES path 696, back to decision block 651 in order to test for the occurrence of any interrupts and subsequently access the next box of chart data to be written onto the display panel.

D. Interrupt Server Routine 700

As noted above, this routine, when executed, services an interrupt. A flowchart of Interrupt Server Routine 700 is collectively depicted in FIGS. 7A and 7B, for which the correct alignment of the drawing sheets for these figures is given in FIG. 7.

Figures 7, 7A:
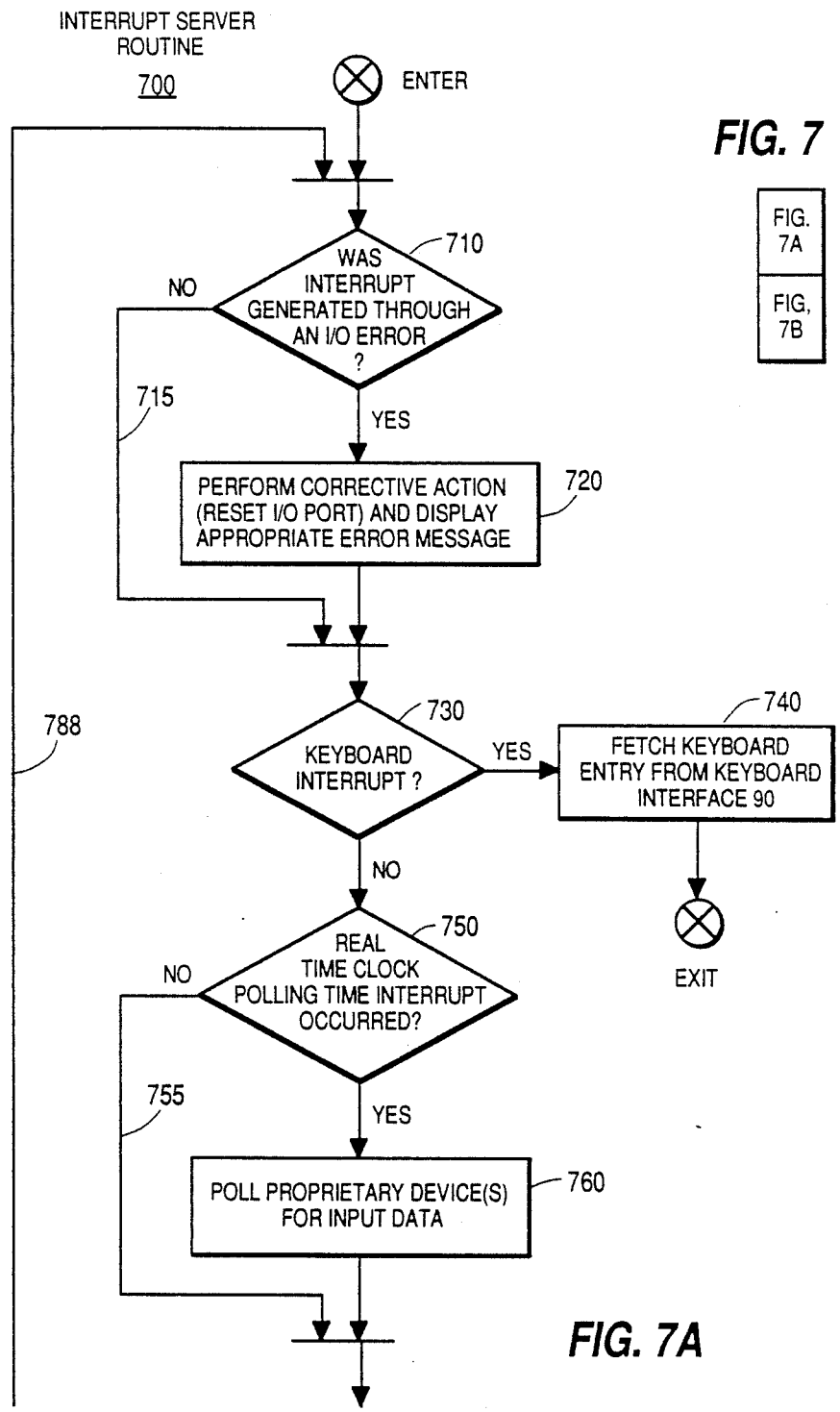
FIG. 7 shows the correct alignment of the drawing sheets for FIGS. 7A and 7B.
FIGS. 7A and 7B collectively depict a flowchart of Interrupt Server Routine 700 that is executed, among other places, as part of Main Loop 400 shown in FIG. 4.
Figure 7B:
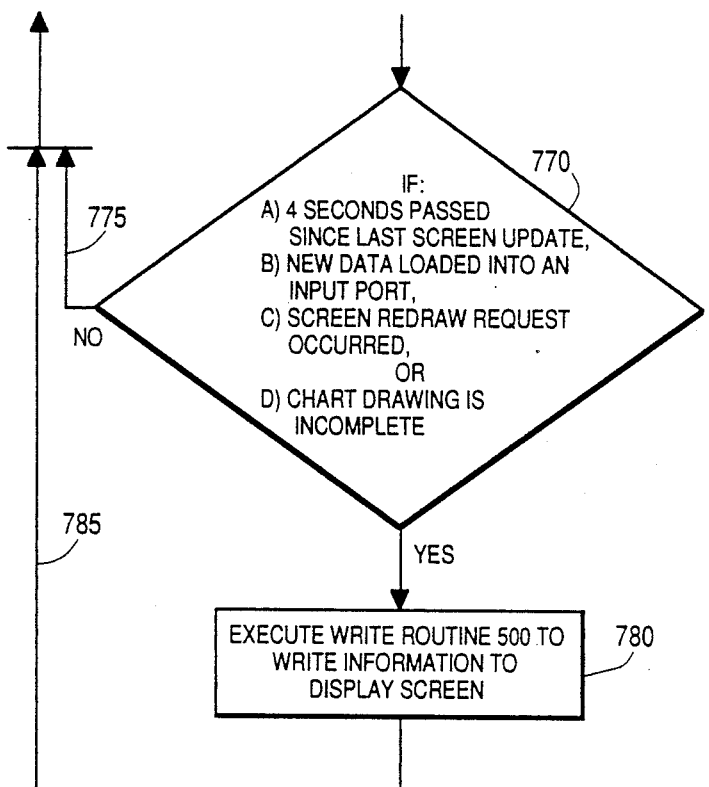

Upon entry into this routine, execution first proceeds to decision block 710 which determines whether the interrupt was generated through an input/output error, such as a parity error or the like, that has been detected by the communication port. In the event the interrupt was caused by such an error, then decision block 710 routes execution, via its YES path, to block 720. This latter block, when executed, performs appropriate corrective action, such as resetting the status of the input/output port, and displaying an appropriate error message to the user. Thereafter or in the event that an interrupt did not occur, in which case decision block 710 routes execution to NO path 715, execution proceeds to decision block 730. This decision block determines whether a keyboard interrupt also occurred, i.e. whether the user has just made a keyboard entry. In the event, a keyboard interrupt occurred, then decision block 730 routes execution, via its YES path, to block 740. This latter block, when executed, fetches the entered value from keyboard interface 40 (see FIG. 1) and places this value into a temporary buffer. Thereafter, as shown in FIGS. 7A and 7B, execution exits from this routine and appropriately returns to the calling routine.

However, if the interrupt was not a keyboard interrupt, then execution proceeds to decision block 750 which determines whether the interrupt was generated by a pre-defined timing signal generated by real time clock 60 (see FIG. 1). In the event such a timing signal occurred, this indicates that all the external proprietary navigational devices need to be separately polled in order to obtain new values for their input data. In this case, as shown in FIGS. 7A and 7B, decision block 750 routes execution to block 760 which, when executed, undertakes this polling. After block 760 has fully executed or in the event a real time clock interrupt did not occur, in which case decision block 750 routes execution to NO path 755 execution proceeds to decision block 770. This latter decision block determines whether any of four conditions has occurred, specifically: whether (a) four seconds have elapsed since the last time the display interface has been updated with new information for display purposes, (b) new data has been loaded into any input port from an external device, (c) a re-draw of the information appearing on the display panel (screen) has been requested, or (d) the current chart has not yet been completely drawn. If any of these four conditions occur, then decision block 770 routes execution, via its YES path, to block 780 to invoke Write Routine 500 to update the information appearing on the display panel or continue drawing the current chart. Thereafter, execution proceeds to path 785. Alternatively, if none of these four conditions occurs, then decision block 770 routes execution to NO path 775. Execution then proceeds, either via path 775 or 785 back to decision block 710 to await the next interrupt or the occurrence of any of these four conditions.

E. Keyboard Entry Routine 800

Figure 8:
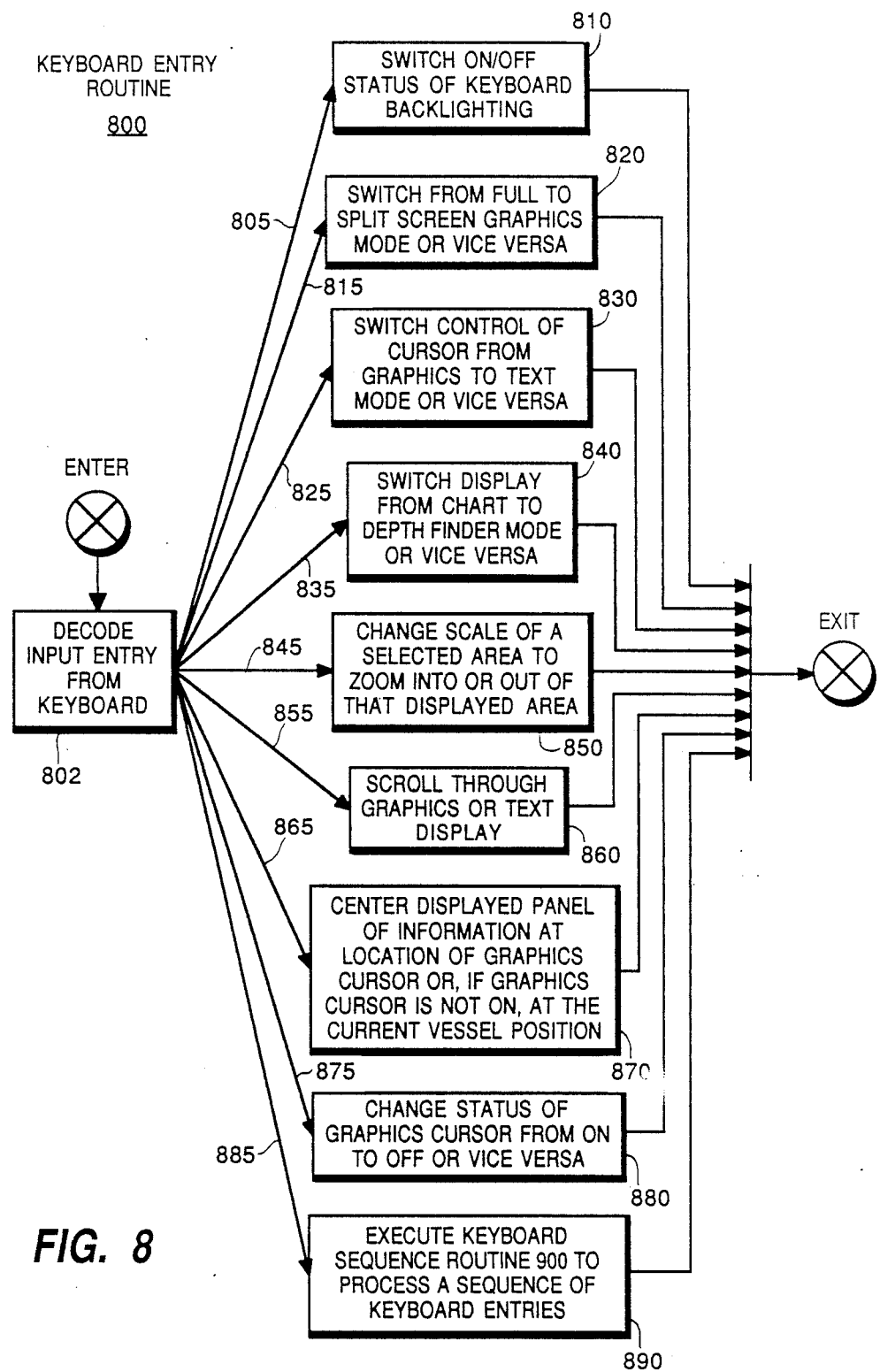
FIG. 8 depicts a simplified flowchart of Keyboard Entry Routine 800 that is executed as part of Main Loop 400 shown in FIG. 4.
Figure 24:
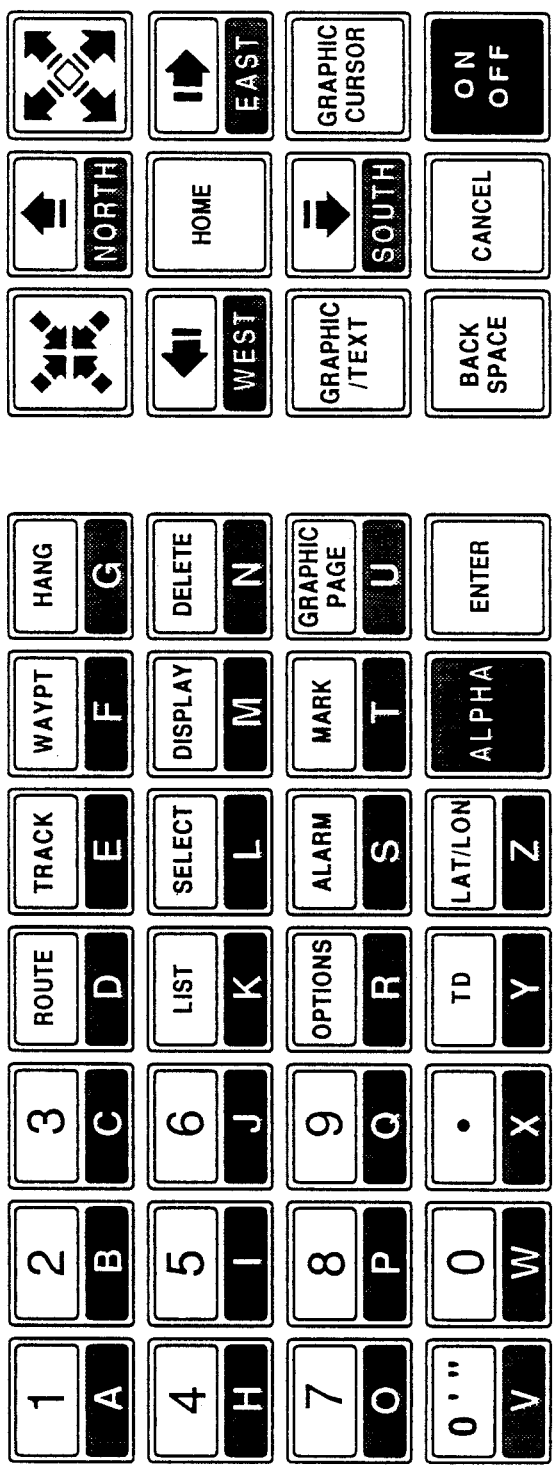
FIG. 24 shows the user accessible keys that form part of keyboard 95 of inventive plotter 10 shown in FIG. 1.

This routine, as noted, generates an appropriate response to a keyboard entry. A simplified flowchart of Keyboard Entry Routine 800 is depicted in FIG. 8. A diagram of the user accessible keys that form part of keyboard 95 that forms part of the preferred embodiment of the inventive plotter is shown in FIG. 24.

Upon entry into this routine, as shown in FIG. 8, 6execution proceeds to block 802 which decodes the entry and then routes execution based upon the specific key that has just been depressed, via one of paths 805, 815, 825, 835, 845, 855, 865, 875 or 885, to execution blocks 810, 820, 830, 840, 850, 860, 870, 880 or 890, respectively. When executed, block 810 changes the status from on to off (or vice versa) of the keyboard backlighting. Alternatively, if execution reaches block 820, then the display interface switches the display mode from a full graphics screen, as illustrated in FIGS. 26C and 26E, to a split screen in which both graphics and textual information are displayed in separate areas, as illustrated in FIGS. 26A, 26B, 26D and 26F. Alternatively, if execution reaches block 830 as shown in FIG. 8, then this block switches (toggles) the control of a cursor written onto the display panel from a graphics mode to a text mode or vice versa depending on its present mode. The mode of the cursor indicates which region of the screen can be manipulated by the user at any given time. Alternatively, if execution reaches block 840, then the display switches from showing a chart and accompanying navigation data to a depth finder mode in which a profile of prior depth soundings is shown. Alternatively, if execution reaches block 850, this block, when executed, causes the scale of a displayed area to incrementally increase or decrease so as to "zoom" into or out of a currently displayed area. Alternatively, if execution reaches block 860, this block, when executed, allows the user to scroll through either the graphic or text portions of the display. Alternatively, if execution reaches block 870, then this block, when executed, recenters the displayed area on the current location of the graphic cursor, if it is on, or, the current vessel position if the graphics cursor is not on. Alternatively, if execution reaches block 880, then this block, when executed, toggles the status of the graphics cursor from off to on or vice versa depending upon its current status. Lastly, if execution should alternatively reach block 890, this block, when executed, invokes Keyboard Sequence Routine 900 to accept a sequence of successive key depressions (entries) and provide an appropriate response. Once block 810, 820, 830, 840, 850, 860, 870, 880 or 890 has fully executed, then execution exits from routine 800.

F. Keyboard Sequence Routine 900

This routine provides an appropriate response to a pre-determined sequence of keyboard depressions. A simplified flowchart of Keyboard Sequence Routine 900 is collectively depicted in FIGS. 9A and 9B, for which the correct alignment of the drawing sheets for these figures is shown in FIG. 9.

Figure 9B:
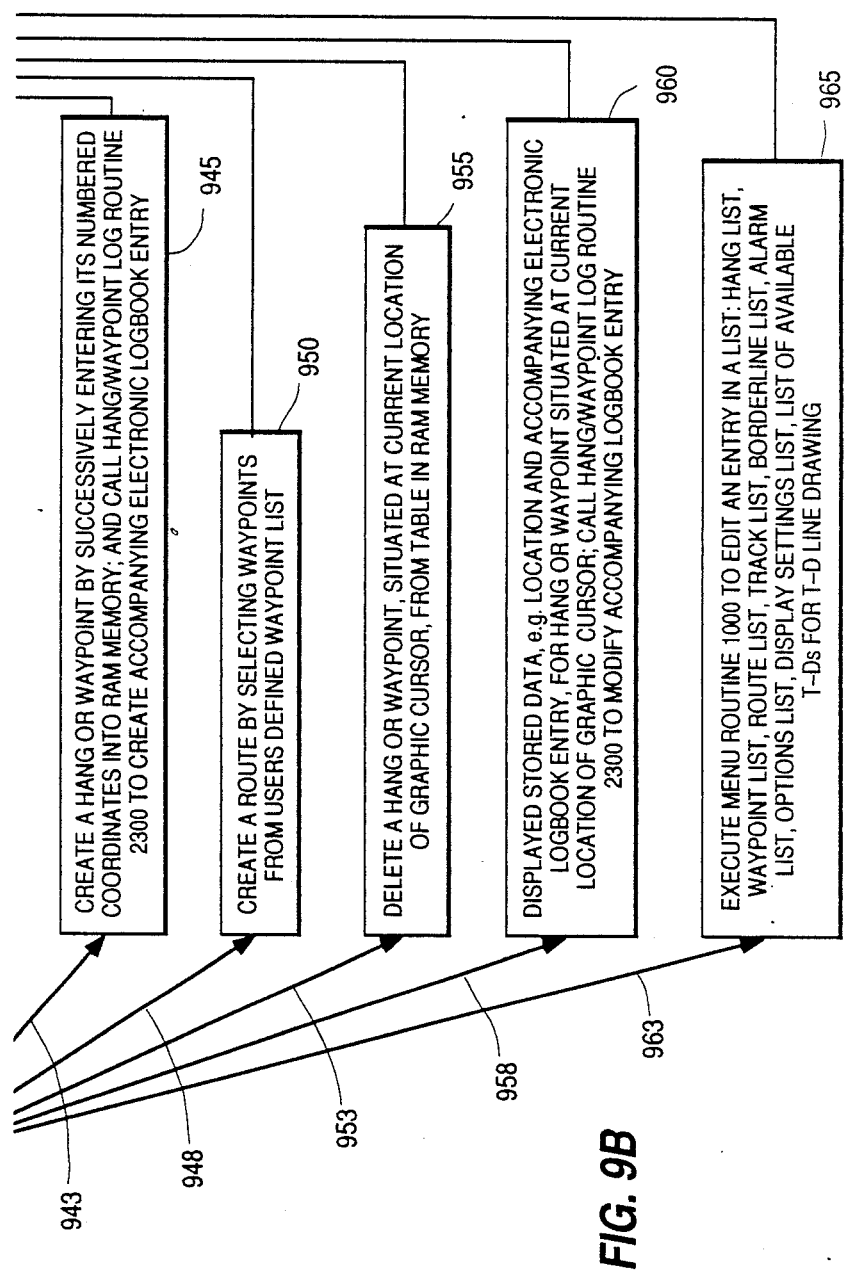

Upon entry into this routine, as shown in FIGS. 9A and 9B, execution proceeds to block 902 which decodes the sequence of keyboard entries and then routes execution based upon the particular sequence that has been entered, via one of paths 903, 913, 918, 923, 928, 933, 938, 943, 948, 953, 958, or 963, to execution blocks 910, 915, 920, 925, 930, 935, 940, 945, 950, 955, 960 or 965, respectively. When executed, block 910 cancels the alarm that has just been triggered. Alternatively, if execution reaches block 915, then this block, when executed, eliminates the display of any drawn T-D lines.

Alternatively, if execution reaches block 920, this block, when executed, saves the current position of the graphic cursor in a table in RAM memory as a user selected hang or waypoint. Thereafter, this block then invokes Hang/Waypoint Log Routine 2300 (which is discussed in detail below in conjunction with FIG. 23) to allow the user to create an accompanying electronic logbook entry for this newly created hang or waypoint. Alternatively, if, as shown in FIGS. 9A and 9B, execution reaches block 925, this block, when executed, saves the current position of the vessel in a table in RAM memory as a user selected hang or waypoint. Thereafter, this block also invokes Hang/Waypoint Log Routine 2300 to allow the user to create an accompanying electronic logbook entry for this newly created hang or waypoint. If, however, execution reaches block 930, then this block, when executed, stores a currently filled track as a new track with a user defined name. Alternatively, if execution reaches block 935, then this block, when executed, invokes Borderline Entry Routine 1500 (which will be discussed in detail below in conjunction with FIG. 15) to allow the user to create a borderline, route or track by moving the graphic cursor along a desired path. As the graphic cursor is moved in this fashion, block 935 saves the location in RAM memory of each user selected point that occurs along the specific path taken by the cursor. In the event execution reaches block 940 as shown in FIGS. 9A and 9B, this block, when executed, invokes Offset Routine 1900 (which is discussed in detail below in conjunction with FIG. 19) to create an offset into a course. Such an offset can be generated whenever the user desires to impart an offset to the vessel position, as indicated on the display screen, in order to bring the displayed position into conformity with the actual position of the vessel, e.g. at a known buoy, dock or other location. A discrepancy between these positions can arise from known error conditions, such as an additional secondary phase factor, that are associated with Loran C navigation or from other affects. Alternatively, if execution reaches block 945 as shown in FIGS. 9A and 9B, this block, when executed, allows a user to create a hang or waypoint by successively entering the numeric coordinates that define the location of the hang or waypoint. Once this occurs, block 945 also invokes Hang/Waypoint Log Routine 2300 to allow the user to create an accompanying electronic logbook entry for this newly created hang or waypoint. Alternatively, if execution reaches block 950, this block, when executed, permits the user to create a particular route by selecting waypoints from a user defined list of waypoints. In the event execution reaches block 955, this block, when executed, allows a user to delete a selected hang or waypoint, situated at the current location of the graphic cursor, from a corresponding table of hangs or waypoints which is situated in RAM memory. Alternatively, if execution reaches block 960, this block, when executed, displays the data that has been stored for a selected hang or waypoint that is situated at the current position of the graphic cursor. This data consists of the location and any accompanying electronic logbook entry for this hang or waypoint. Thereafter, block 960 invokes Hang/Waypoint Routine 2300 to permit the user to modify this electronic logbook entry if so desired. Lastly, if execution reaches block 965, then this block invokes Menu Routine 1000 (which is discussed in detail below in conjunction with FIG. 10) which allows the user to edit any entry in any one of several lists, i.e. a list of hangs, a list of waypoints, a list of routes, a list of tracks, a list of borderlines, a list of alarm settings, an options list, a display settings list or a list of available T-D lines that can be drawn on the display panel. The data for all of these lists is stored within RAM memory.

The options list contains settings for, inter alia: constants used in display of position data which specifically includes an incremental position value for a plotting interval and a smoothing parameter, an averaging interval, selection of metric or nautical units, selection of the format of the input positional data, selection of T-D lines or latitude and longitude data for reception from a positioning system, selection of a particular Loran C chain (in terms of its Group Repetition Interval—GRI), a selected mode for multi-data recording which specifically includes recording either water temperature or depth data during a current track, magnetic variation data, time and date, selection of the format of data supplied to an autopilot, and selection of a communication port that will supply output position data. The display settings list contains a list of status information, i.e. on/off settings, regarding each type of item that can be displayed on either the text and graphics portion of the display. By appropriately setting the status of various displayed items, the user can customize the displayed information to suit his current needs.

Once block 910, 915, 920, 925, 930, 935, 940, 945, 950, 955, 960 or 965 has fully executed, then execution exits from routine 900 and appropriately returns to routine 800.

G. Menu Routine 1000

This routine allows the user to edit any entry existing in any one of several lists stored in RAM memory. Separate lists are used for hangs, waypoints, routes, tracks, borderlines, alarm settings, an options, a display settings and available T-D lines that can be drawn on the display panel. A flowchart of Menu Routine 1000 is depicted in FIG. 10.

As shown, upon entry into this routine, execution first proceeds to block 1010. This block, when executed, first displays an appropriate menu of all the separate lists that can be individually selected by the user. These lists include the hang list, the waypoint list, the track list, borderline list, the alarm list, the list of available T-D lines for T-D line drawing, the options list and the display settings list. Once this menu is displayed, the user can select which specific list will be displayed and can be subsequently edited. Now, if the track list is chosen and after the track list is displayed, block 1010 invokes Track Navigation Select Routine 2000 (which will be discussed in detail below in conjunction with FIG. 20) to select an appropriate track to be used for navigational purposes. Alternatively, if the borderline list is selected, then as shown in FIG. 10, block 1010 invokes Borderline Selection Routine 1600 to select one of the borderlines that have been previously defined by the user for use as a border alarm. If, however, the alarm list is selected for display, then after this list is displayed, block 1010 invokes either Border Alarm Selection Routine 1700 if the user selects to change the alarm distance and change the status of the border alarm, or a routine similar thereto if the user elects to change the status of a different alarm condition. Alternatively, if the user selects the available T-D list, then block 1010 invokes T-D Line Selection Routine 2100 to enable the user to select the desired two T-D lines that are to be drawn on the display panel. After the specific list has been displayed and in response to the user selection of an item in that list and the depression of the "Home" key on keyboard 95 (see FIGS. 1 and 24), block 1010, as shown in FIG. 10, inVokes Home Routine 2200 to re-center, i.e. "home", the displayed area on the current location of the graphic cursor, if it is on or, if the graphic cursor is off, the location of a selected track, borderline, route or similar item stored in the corresponding list. Once block 1010 fully executes, execution proceeds, as shown in FIG. 10, to block 1020 which executes Write Routine 500 to update the information appearing on the display panel with the latest vessel position. Thereafter, block 1030 executes which, in turn, invokes Interrupt Service Routine 700 to obtain any recent keyboard entries. Once this occurs, execution proceeds to block 1040 which, when executed, provides the desired response to the entered sequence of key strokes. Once this response has been provided, execution proceeds to decision block 1045 which, when executed, determines whether the keyboard sequence is that for which execution should exit from routine 1000. There are a number of keyboard sequences such as moving the text or graphics cursor housing or zooming, for which, after they are processed, execution remains within routine 1000. Alternatively, if execution is not to exit from routine 1000, then decision block 1045 directs execution, via its NO path, to decision block 1050. This latter decision block determines in response to the key strokes that have been entered whether the menu needs to be re-drawn. If the menu is to be re-drawn, then decision block 1050 directs execution, via YES path 1057, back to block 1010 to re-draw the menu and re-initiate associated list processing and so on. If, however, the menu is not to be re-drawn, then execution proceeds, via NO path 1053 emanating from decision block 1050, back to block 1020 to invoke Write Routine 500 to again update the current displayed vessel position and so on. Alternatively, if execution is to exit from routine 1000 after a keyboard sequence has been processed, then execution exits from this routine via the YES path emanating from decision block 1045.

Figure 10:
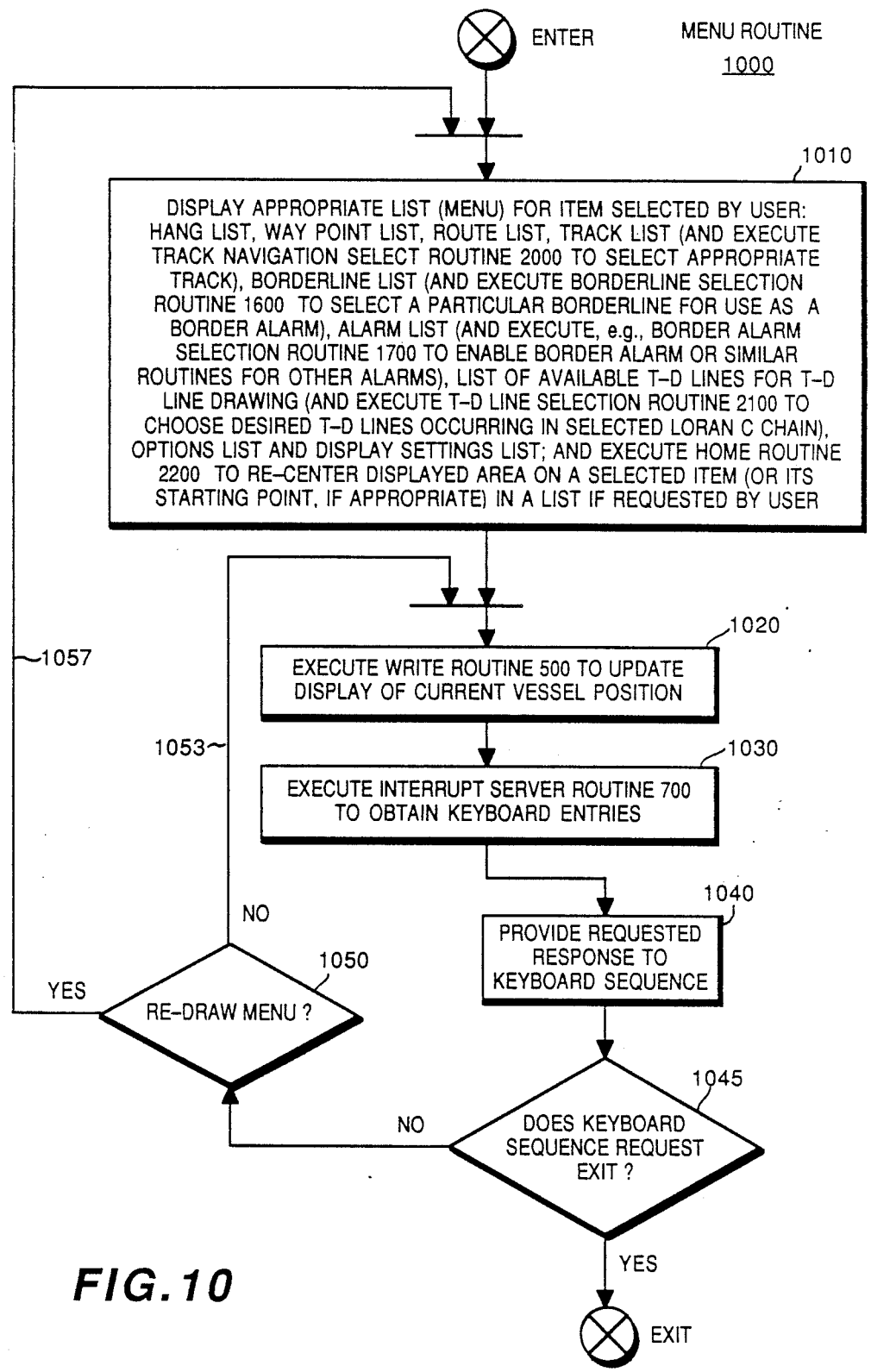
FIG. 10 depicts a flowchart of Menu Routine 1000 that is executed as part of Keyboard Sequence Routine 900 shown in FIGS. 9A and 9B.

For purposes of simplifying the discussion as well as the flowchart appearing in FIG. 10, Borderline Selection Routine 1600, Border Alarm Selection Routine 1700, Track Navigation Select Routine 2000, T-D Line Selection Routine 2100 and Home Routine 2200 are all shown and described above as being invoked by execution of block 1010. In actuality, the operations provided by these routines occur in response to the combined execution of blocks 1010–1040 located within Menu Routine 1000.

H. Multi-Data Storage Routine 1100

Figure 11:
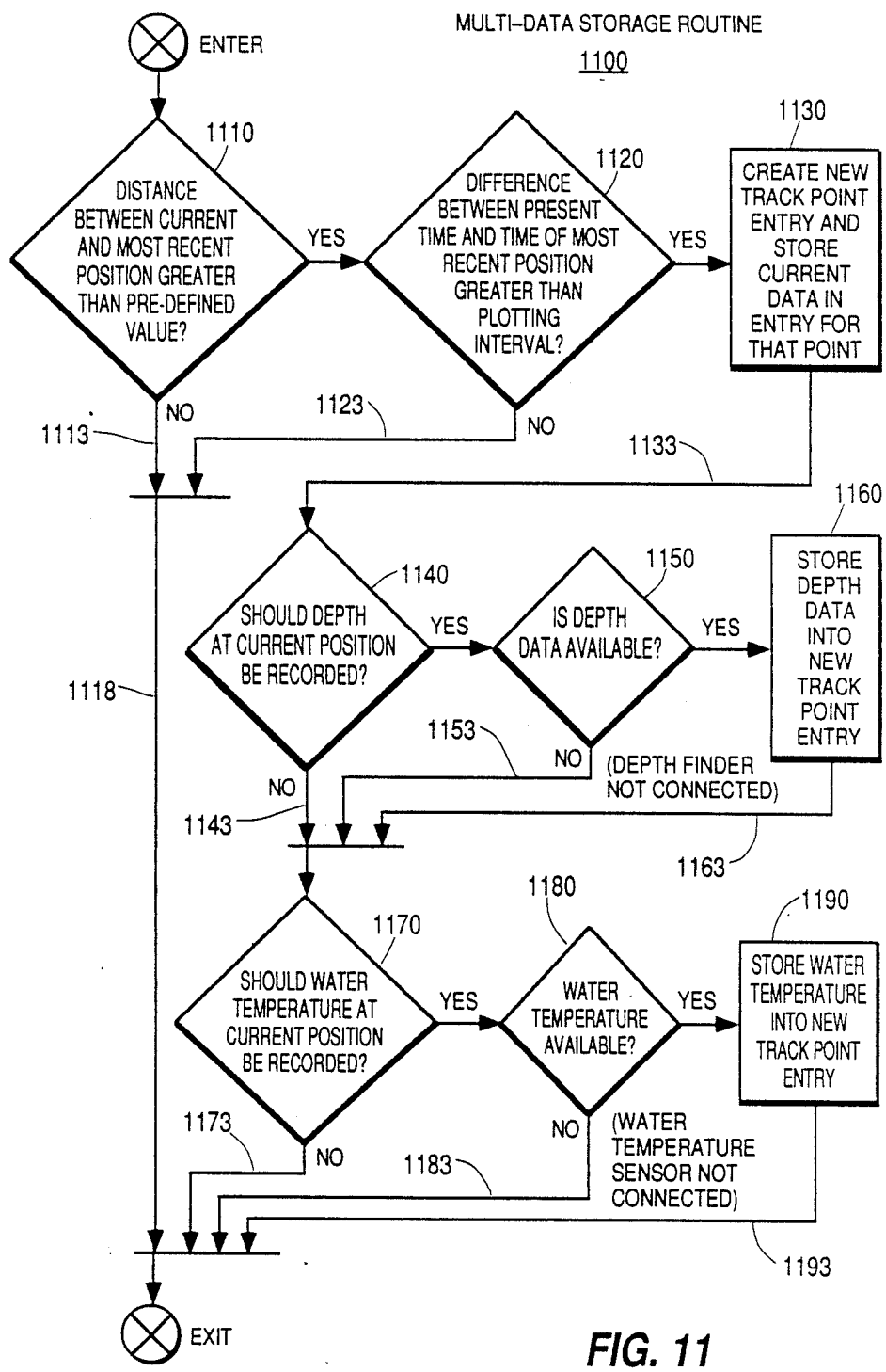
FIG. 11 depicts a flowchart of Multi-Data Storage Routine 1100 that is executed as part of Write 500 shown in FIGS. 5A–5C.

This routine records depth and/or water temperature data as a function of current vessel position along the current track and stores the resulting data in RAM memory. A flowchart of Multi-Data Storage Routine 1100 is depicted in FIG. 11.

As shown, upon entry into this routine, execution first proceeds to decision block 1110. This block, when executed, determines whether the distance between the current vessel position and its most recently determined prior position is greater than a pre-defined value. If this distance is not greater than this value, then the vessel has simply not moved a sufficient distance to record the next water temperature or depth data value. In this case, execution exits from this routine, via NO path 1113 emanating from decision block 1110 and via path 1118. Alternatively, if the distance is greater than this pre-defined value, then the next value of depth or water temperature data at the current vessel position could be recorded. In this case, execution proceeds to decision block 1120, via the YES path emanating from decision block 1110. The former decision block determines whether the difference between the present time and the time associated with the most recently determined prior position of the vessel is greater than the plotting interval. If this time difference is too small, then an insufficient amount of time has elapsed for recording the next data value. In this case, execution exits from routine 1100, via NO path 1123 emanating from decision block 1120 and via path 1118. Alternatively, if a sufficient amount of time has elapsed, then decision block 1120 routes execution, via its YES path, to block 1130. This latter block, when executed creates a new entry in the current track, which is stored in a corresponding table in RAM memory, and then stores the current vessel position in that entry. Thereafter, execution proceeds, via path 1133, to decision block 1140.

Decision block 1140 determines, by querying the appropriate status entry in the options list, whether the user desires that depth data be recorded at the current vessel position. If this data is desired, then decision block 1140 routes execution, via its YES path, to decision block 1150. This latter decision block determines whether a depth sounder has been connected to a communication port of the inventive plotter and, if so, whether current depth data is available. If this data is available, then decision block 1150 routes execution, via its YES path to block 1160. This latter block, when executed, stores the current depth data value into the newly created entry in the current track. Execution then proceeds along path 1163 to decision block 1170. This decision block is also reached if execution is directed to NO path 1143 or NO path 1153 emanating from decision blocks 1140 or 1150, respectively.

Decision block 1170 determines, by querying the appropriate status entry in the options list, whether the user desires that water temperature data be recorded at the current vessel position. If this data is desired, then decision block 1170 routes execution, via its YES path, to decision block 1180. This latter decision block determines whether a water temperature sensor has been connected to a communication port of the inventive plotter and, if so, whether current water temperature data is available. If this data is available, then decision block 1180 routes execution, via its YES path to block 1190. This latter block, when executed, stores the current water temperature data value into the newly created entry in the current track. Execution then exits this routine along path 1193 or along either NO path 1173 or NO path 1183 emanating from decision blocks 1180 or 1190, respectively.

I. Multi-Data Display Routine 1200

Figure 12B:
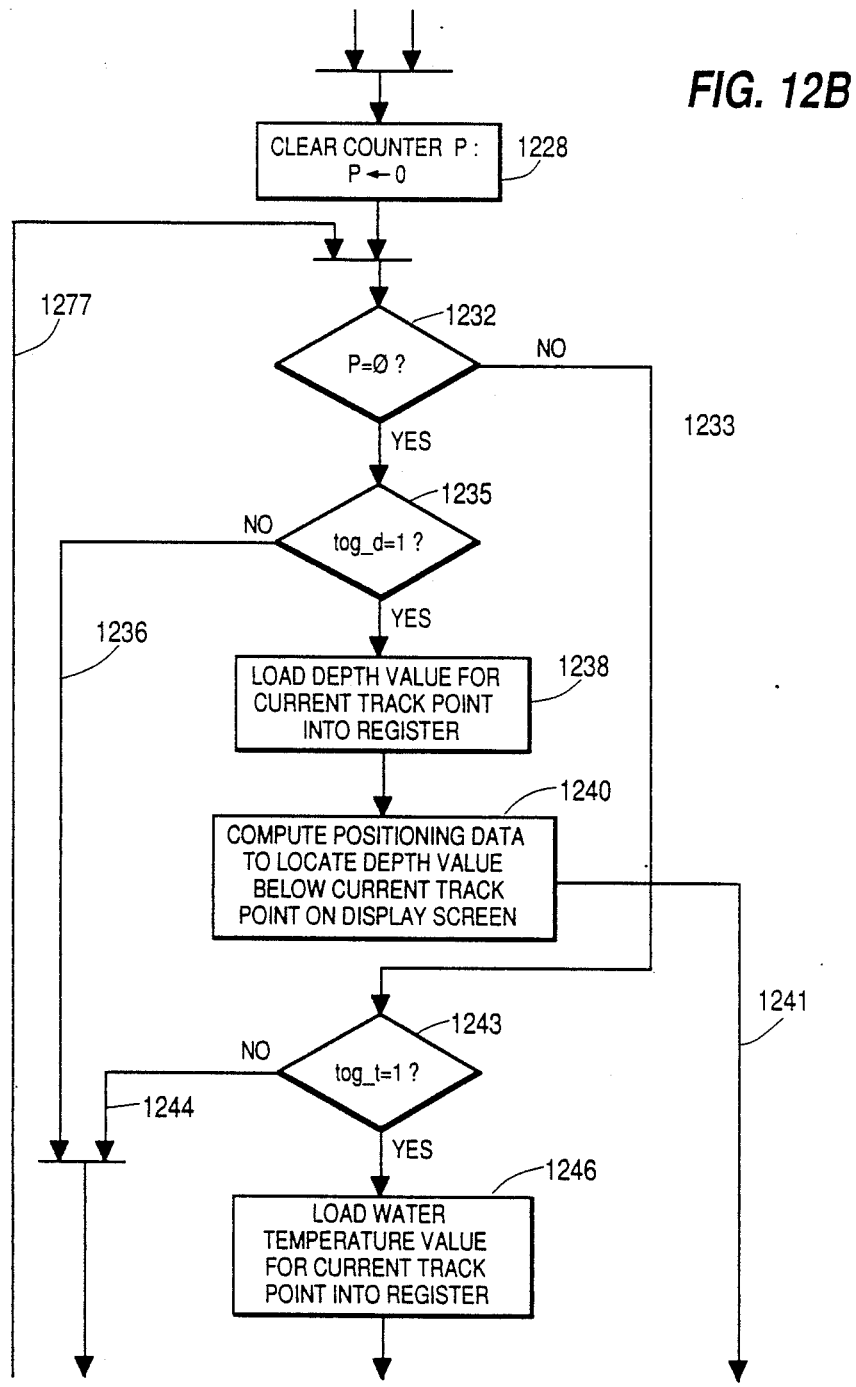
Figure 12C:
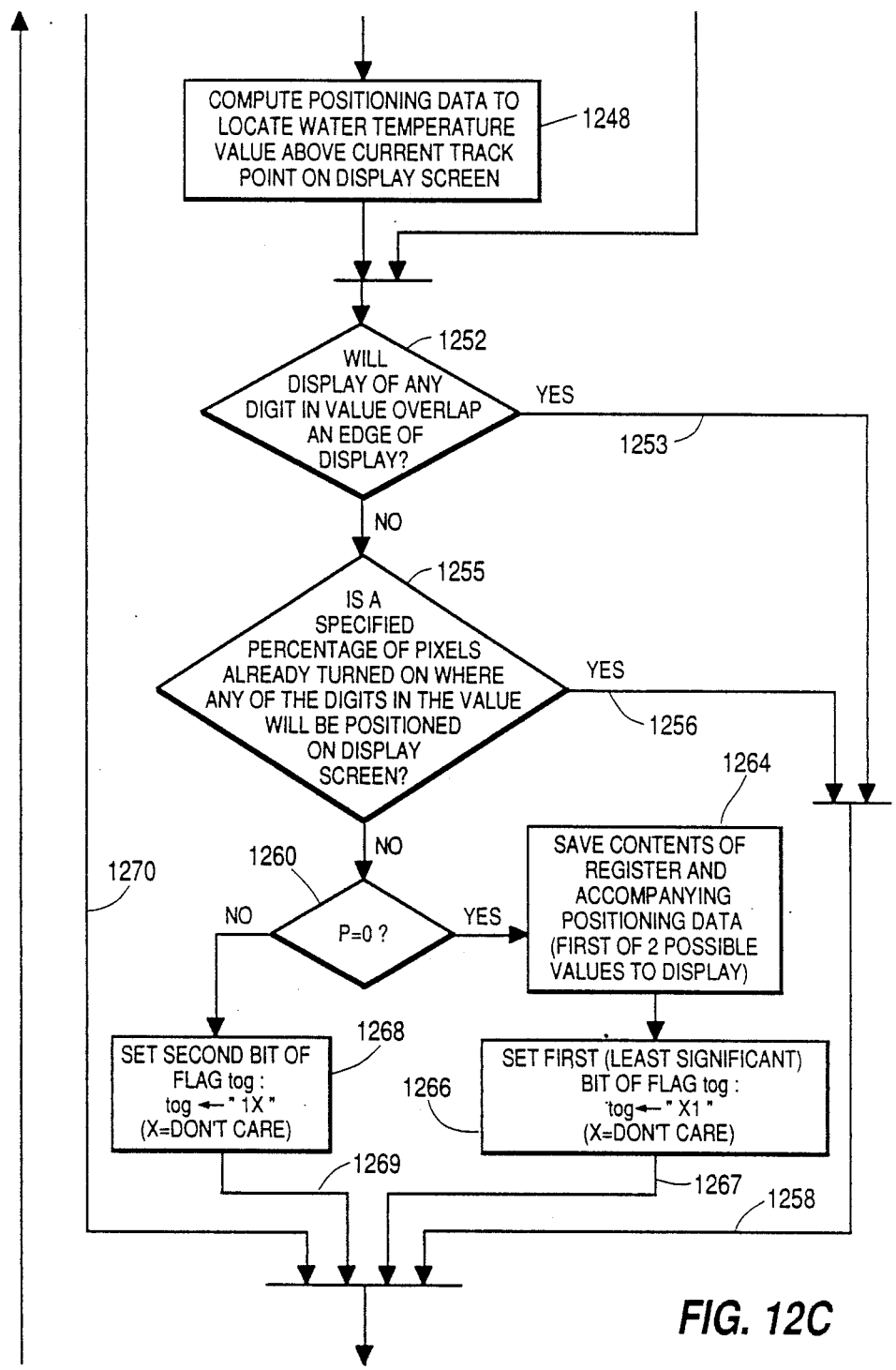
Figure 12D:
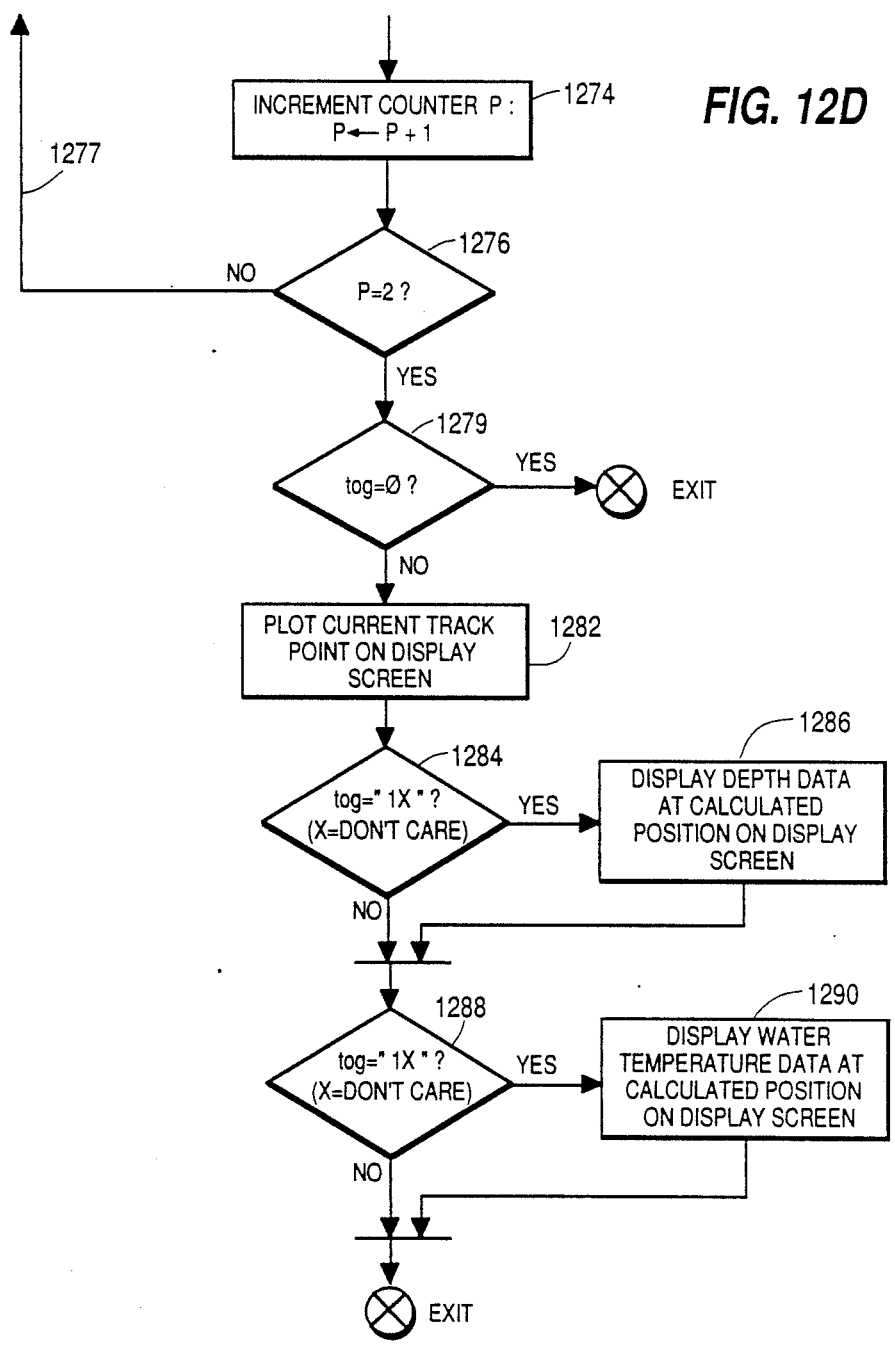

This routine, as noted above, displays recorded values of water temperature and/or depth data that have occurred for prior points along the current track. A flowchart for this routine is collectively depicted in FIGS. 12A–12D, for which the correct alignment of the drawing sheets for these figures is shown in FIG. 12.

As shown, upon entry into this routine, execution proceeds to decision block 1203. This decision block determines in response to an appropriate status entry in the display settings list whether multi-data, i.e. water temperature or depth data, is to be displayed. In the event the user has selected not to display this data, then execution exits from routine 1200 via the NO path emanating from decision block 1203. Alternatively, if this data is to be displayed, then decision block 1203 routes execution, via its YES path, to block 1205. This block, when executed, resets the value of flag "tog" to zero. Thereafter, execution proceeds to decision block 1208 which determines whether a depth data value has been recorded for the current point along the track. If depth data has been so recorded, then execution proceeds, via the YES path emanating from this decision block, to block 1212. This latter block, when executed, sets the value of flag "tog$_{13}$d" to one. However, if depth data has not been recorded, then execution proceeds, via the NO path emanating from this decision block, to block 1214. This latter block, when executed, resets the value of flag "tog_d" to zero. Once either block 1212 or 1214 has executed, execution proceeds to decision block 1218 which determines whether a water temperature data value has been recorded for the current point along the track. If water temperature data has been so recorded, then execution proceeds, via the YES path emanating from this decision block, to block 1222. This latter block, when executed, sets the value of flag "tog_t" to one. However, if water temperature data has not been recorded, then execution proceeds, via the NO path emanating from this decision block, to block 1224. This latter block, when executed, resets the value of flag "tog—t" to zero. Execution then proceeds to block 1228 which clears the contents of a counter "p" to zero. This counter keeps track of the number of different types of data that are to be displayed along with the current track point. Once block 1228 executes, execution then proceeds to decision block 1232.

Decision block 1232 determines whether the current contents of counter "p" equal zero, i.e. whether neither of the two different types of data has been checked. In the event that the current value of counter "p" equals zero, then decision block 1232 routes execution, via its YES path, to decision block 1235. This latter decision block tests whether the value of flag "tog_d" equals one, i.e. that a current depth value is to be displayed. In the event that the value of this flag equals one, then decision block 1235 routes execution, via its YES path, to block 1238. This latter block, when executed, loads the current depth value for the current track point into a temporary register. Thereafter, execution proceeds to block 1240 which, when executed, computes the positioning data, in terms of pixel numbers on the display panel, necessary to locate the numeric depth data below the current track point on the display panel. Thereafter, execution proceeds, via path 1241 to decision block 1252. This decision block determines, based upon this calculated positioning data, whether the display of any digit in this data value will overlap an edge of the display. If such an overlap would occur, then this data value would not be displayed. In this case, decision block 1252 routes execution, via YES path 1253 and path 1258, to block 1274. This latter block, when executed, merely increments the contents of counter "p" by one so as to attempt to display the next type of data. Once this block is executed, decision block 1276 executes to determine whether the current contents of counter "p" equal two, i.e. an attempt has been made to display both different types of data (depth and water temperature), for the current track point. In the event that the current contents of counter "p" do not yet equal two, then decision block 1276 routes execution, via NO path 1277, back to decision block 1232 to attempt to display the next type of data, i.e. water temperature, along or adjacent to the current track point.

Now in the event that the current contents of counter "p" do not equal zero, then decision block 1232 routes execution, via NO path 1233, to decision block 1243. This latter decision block tests whether the value of flag "tog_t" equals one, i.e. that a current water temperature value is to be displayed. In the event that the value of this flag equals one, then decision block 1243 routes execution, via its YES path, to block 1246. This latter block, when executed, loads the current water temperature value for the current track point into a temporary register. Thereafter, execution proceeds to block 1248 which, when executed, computes the positioning data, in terms of pixel numbers on the display panel, necessary to locate the numeric water temperature data above the current track point on the display panel. Thereafter, execution proceeds, via path 1241 to decision block 1252. This decision block determines, based upon this calculated positioning data, whether the display of any digit in this data value will overlap an edge of the display. If such an overlap would occur, then this data value would also not be displayed. In this case, decision block 1252 again routes execution, via YES path 1253 and path 1258, to block 1274.

Now, in the event decision block 1252 determines that no overlap will occur between any digit of a data item (water temperature or depth data) that is to be displayed and an edge of the display, then this decision block routes execution, via its NO path, to decision block 1255. This latter decision block determines whether a specified percentage of pixels are already turned on in any area where any of the digits of the data item is also to be displayed. A certain amount of display overlap between different displayed items in a common area can be visually tolerated by an observer before this area becomes too cluttered. Hence, the value of this percentage is set to assure that excessive display cluttering does not occur. Hence, if an excessive number of pixels is already on, then this data value is not displayed. In this case, decision block 1255 directs execution, via YES path 1256 and path 1258, to block 1274. Alternatively, if fewer than the minimum percentage of pixels is on, then this data item can be displayed on the display panel. In this case, decision block 1255 routes execution, via its NO path, to decision block 1260. This latter decision block tests whether the current contents of counter "p" equal zero. If these contents equal zero, thereby indicating that the first of possibly two data items is to be displayed, then decision block 1260 routes execution, via its YES path, to block 1264 which, when executed, saves the contents of the temporary register and accompanying positioning data. Thereafter, block 1266 executes to set the least significant bit of flag "tog" to one, i.e. flag "tog" is set to the binary value "X1", where X represents a do not care condition. Thereafter, execution proceeds to block 1274 to increment counter "p" in preparation for checking the next type of data. Alternatively, if the contents of counter "p" are not zero, then decision block 1260 routes execution, via its NO path, to block 1268 which, when executed, sets the second significant bit of flag "tog" to one, i.e. flag "tog" is set to the binary value "1X", where again X represents a do not care condition. Thereafter, execution proceeds to block 1274 to increment counter "p". Execution also reaches block 1274 via path 1270 and either via NO path 1236 emanating from decision block 1235 in the event the current value of flag "tog_d" equals zero or via NO path 1244 emanating from decision block 1243 in the event the current value of flag "tog—t" equals zero.

Once the contents of counter "p" equal two thereby indicating that both types of data (water temperature and depth) have been checked, the execution proceeds, via the YES path emanating from decision block 1276, to decision block 1279. This latter block tests the current values of flag "tog". In the event that this flag is zero, then no data is to be displayed. In this case, execution exits from routine 1200, via the YES path emanating from decision block 1279. Alternatively, if the contents of flag "tog" are not zero indicating that a data value is to be displayed along with the current track position, then decision block 1279 routes execution, via its NO path, to block 1282. This latter block, when executed, plots the current track point on the display screen. Thereafter, execution proceeds to decision block 1284 which, when executed, determines whether the value of the most significant bit of flag "tog" is set to one. If the flag contains the value "1X", where X is the do not care condition, then decision block 1284 routes execution, via its YES path, to block 1286. This latter block, when executed, suitably instructs display interface 80 (see FIG. 1) to write the depth data in bit mapped form into appropriate locations within display RAM 83 at the calculated positioning data such that the depth data value will be displayed below the current track point. Once this occurs, as shown in FIGS. 12A–12D, execution proceeds to decision block 1288. Execution also reaches this decision block in the event the value of the most significant bit of flag "tog" does not equal one. Decision block 1288, when executed, determines whether the value of the least significant bit of flag "tog" is set to one. If the value of flag "tog" equals "X1", where X represents the do not care condition, then decision block 1288 routes execution, via its YES path, to block 1290. This latter block, when executed, suitably instructs display interface 80 (see FIG. 1) to write the water temperature data in bit mapped form into appropriate locations within display RAM 83 starting at the calculated positioning data such that the water temperature data value will be displayed above the current track point. Execution then exits from routine 1200 either after block 1290 fully executes or, via the NO path emanating from decision block 1288 in the event that the value of the least significant bit of flag "tog" does not equal one.

J. Track Navigation Routine 1300

Figure 13A:
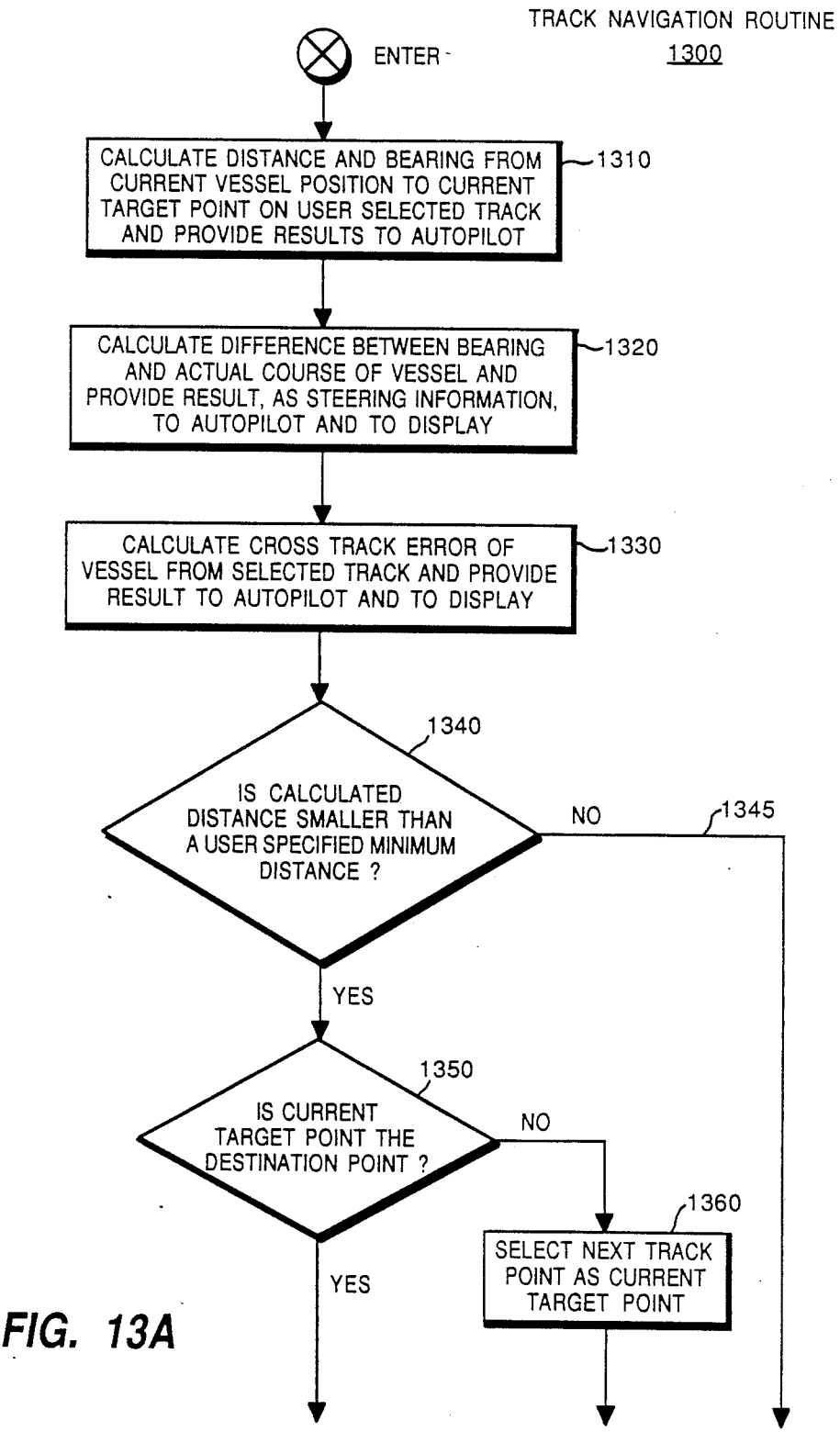
FIGS. 13A and 13B collectively depict a flowchart of Track Navigation Routine 1300 that is executed as part of Write Routine 500.
Figures 13, 13B:
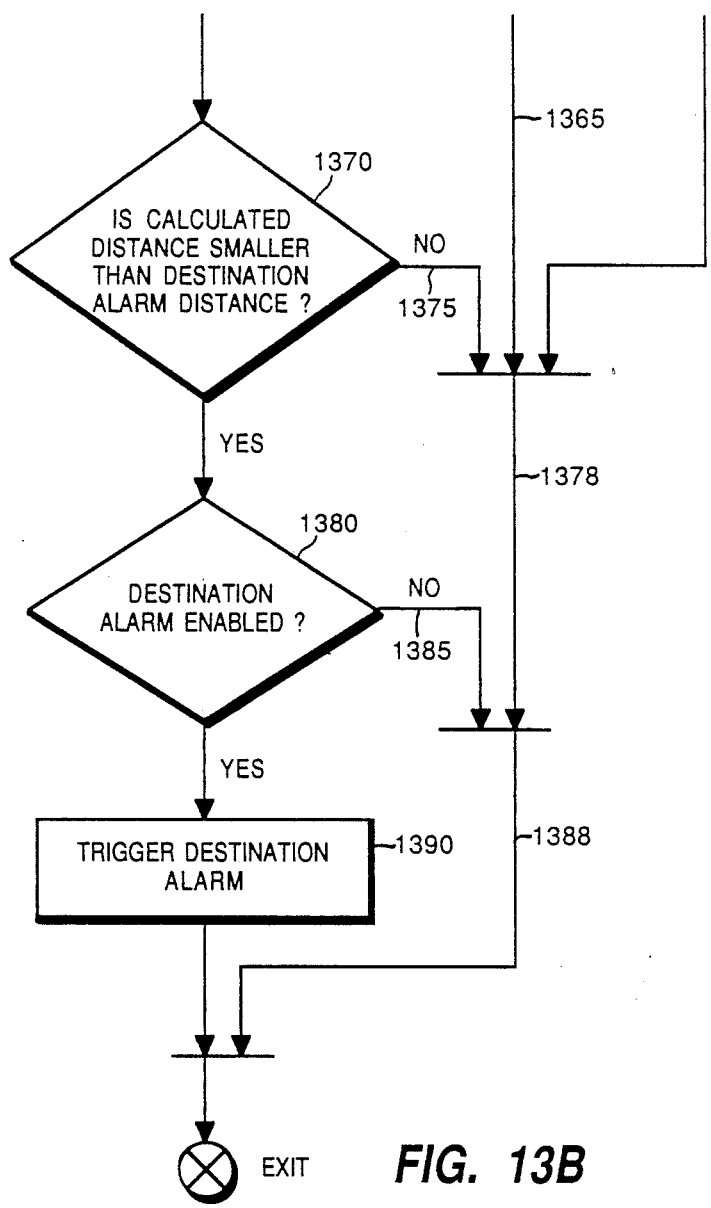
FIG. 13 shows the correct alignment of the drawing sheets for FIGS. 13A and 13B.
Figure 14A:
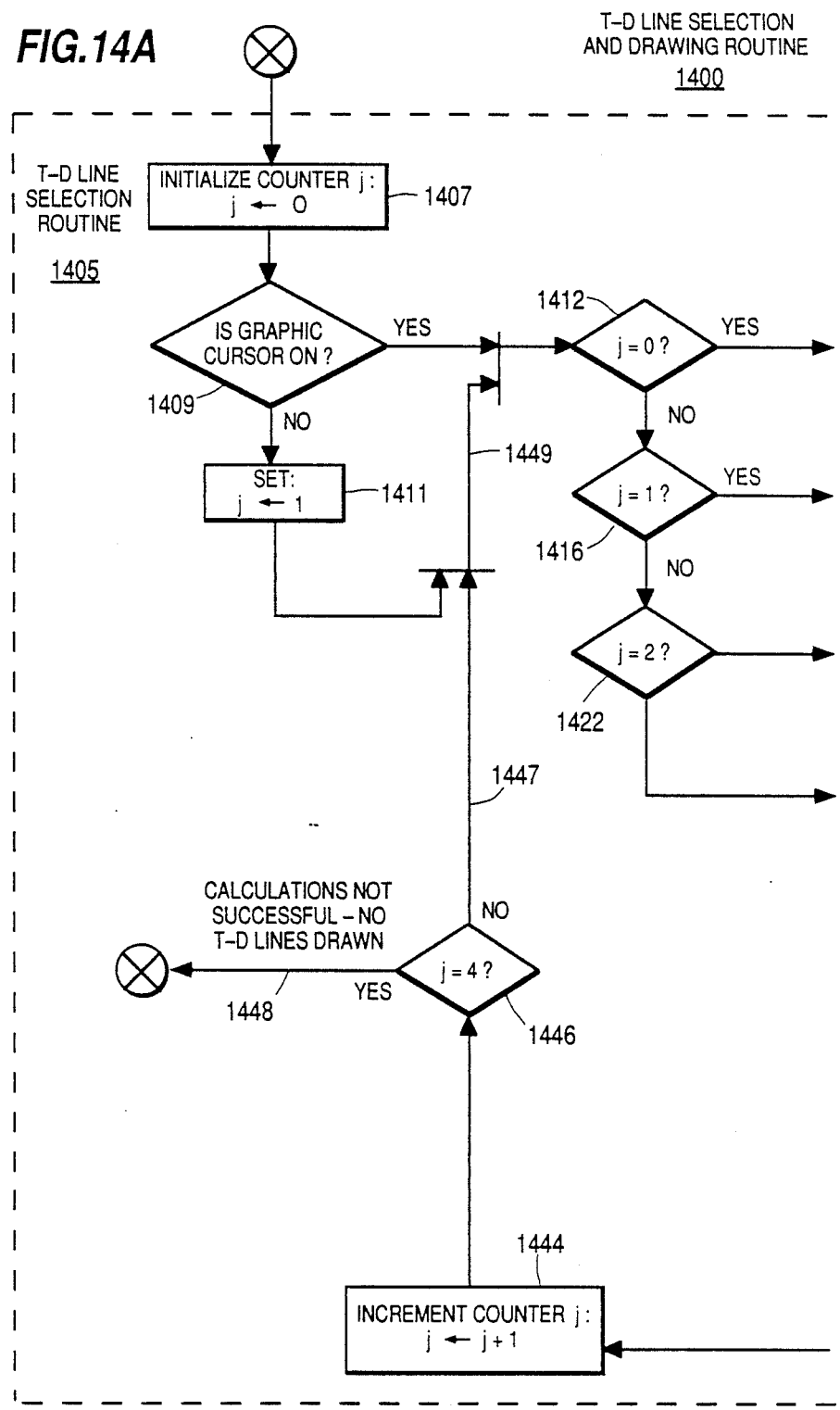
Figure 14B:
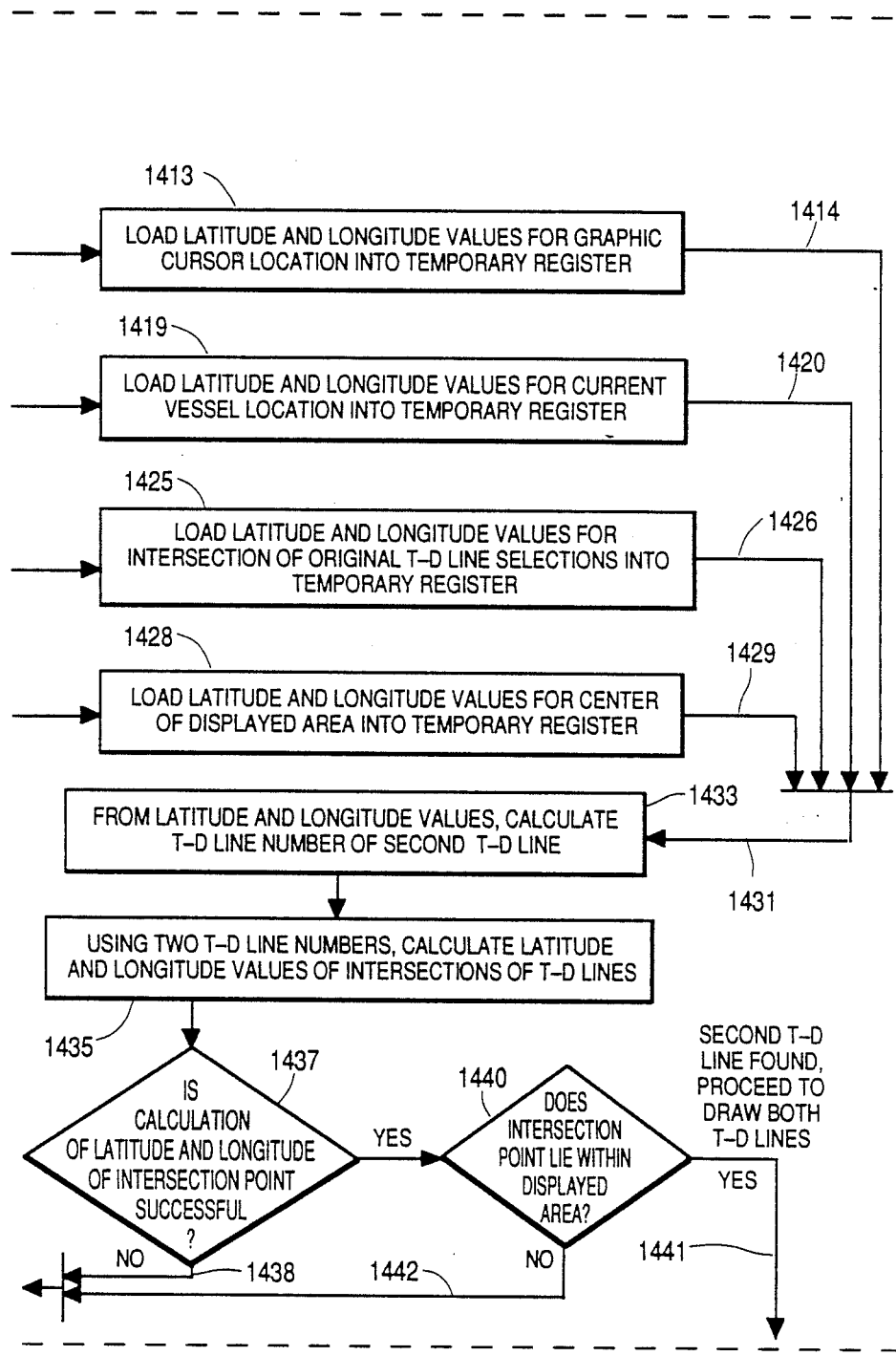
Figure 14C:
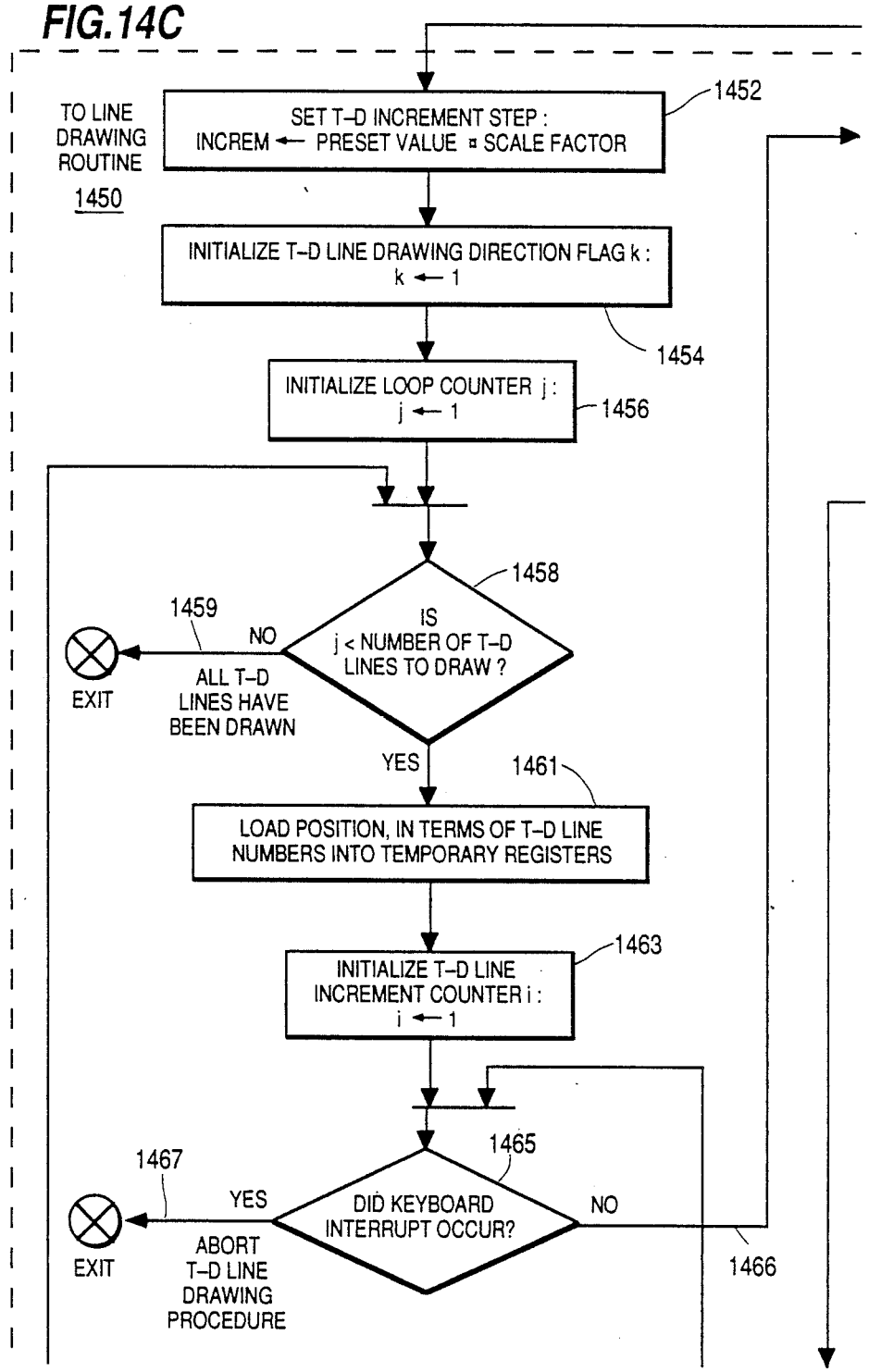
Figure 14D:
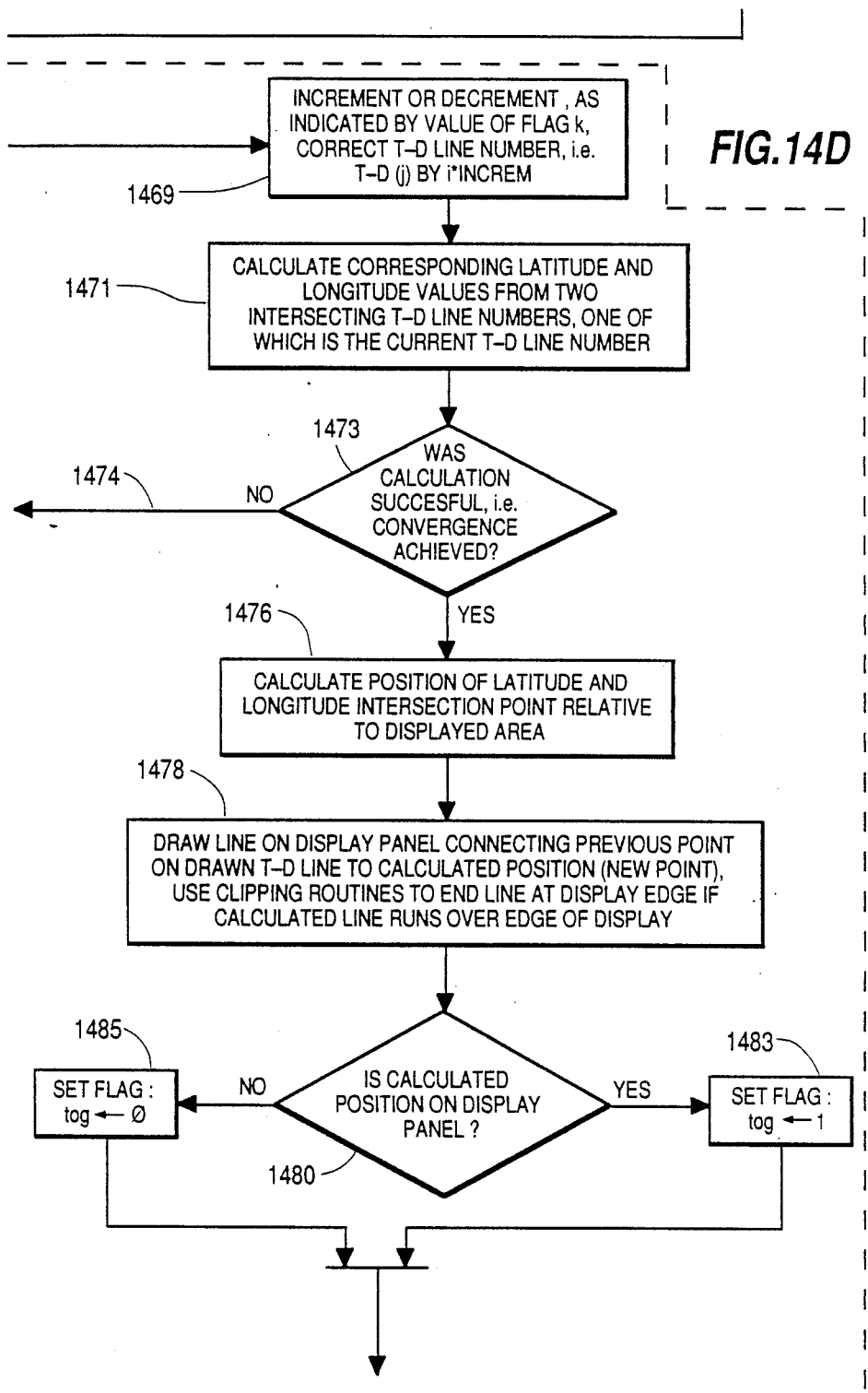
Figure 14E:
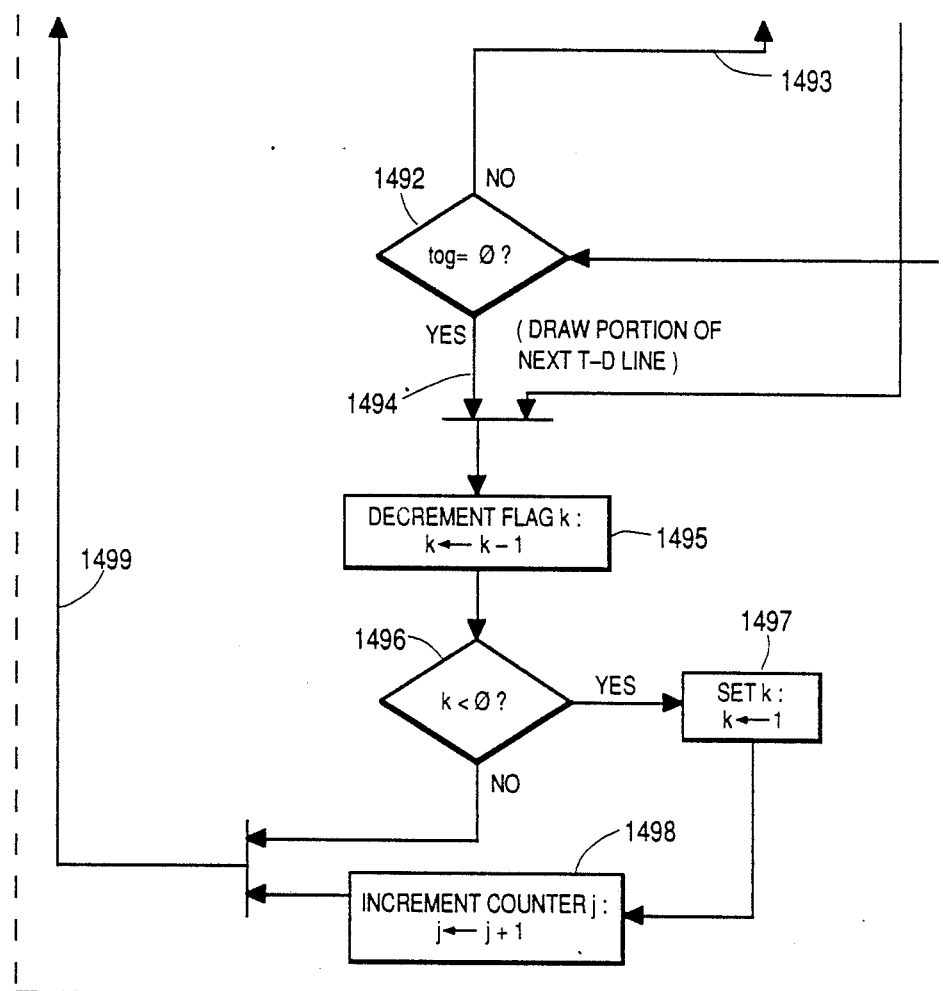

This routine, as noted above, calculates, inter alia, distance and bearing data to an appropriate target point of a current track. The target point and previous track point are used by this routine to calculate cross track error which can be displayed and provided to an autopilot for navigational purposes. In addition, as soon as the distance between the current position of the vessel and a target point decreases below a pre-defined minimum distance, this routine chooses the next successive point along a selected track as the target point. If the vessel reaches a pre-defined destination point along the current track, then this routine triggers the destination alarm, if this alarm has been previously enabled. A flowchart of Track Navigation Routine 1300 is collectively depicted in FIGS. 13A and 13B, for which the correct alignment of the drawing sheets for these figures is shown in FIG. 13.

As shown, upon entry into this routine, execution proceeds to block 1310 which, when executed, calculates distance and bearing from the current position of the vessel to a current target point located on a user selected track. The results are then provided through an output port, to an autopilot. Thereafter, execution proceeds to block 1320. This block, when executed, calculates the difference between the bearing and actual course of the vessel and provides the results again through the output port, as steering information, to the autopilot for navigation and, via display interface 80 (see FIG. 1), to the display panel. Thereafter, as shown in FIGS. 13A and 13B, execution proceeds to block 1330 which calculates the cross track error of the vessel from the selected track and provides the results to the autopilot and to the display interface for subsequent display on the display panel. Execution then proceeds to decision block 1340 which determines whether the calculated distance from the current vessel position to a selected target point is less than a user specified minimum distance. If this distance is less than the minimum distance, then execution exits from routine 1300, via NO path 1345 emanating from decision block 1340 and via paths 1378 and 1388. Alternatively, if the calculated distance is greater than the minimum distance, then decision block 1340 routes execution, via its YES path, to decision block 1350. This latter decision block determines whether the current target point is the destination point on the selected track. If the current target point is not the destination point, then decision block 1350 routes execution, via its NO path, to block 1360. This latter block selects the next point on the selected track as the current target point. Once this occurs, execution exits from routine 1360, via paths 1365, 1378 and 1388. If, however, the current target point is the destination point, then decision 1360 routes execution, via its YES path, to decision block 1370. This latter decision block determines whether the calculated distance, provided as a result of execution of block 1310, is less than the value of the user defined destination alarm distance. This value is stored within a corresponding table situated within RAM memory. In the event that the calculated distance is less than this alarm distance, then decision block 1370 routes execution, via its YES path, to decision block 1380 which determines, when executed using a table look up operation into the alarm list, whether the destination alarm has been enabled. In the event that this alarm has been enabled, decision block 1380 routes execution, via its YES path, to block 1390. This latter block, when executed, triggers the destination alarm. Thereafter, execution exits from routine 1300. Execution also exits from this routine, via paths 1388 and 1378 and via NO path 1375 emanating from decision block 1370, if the calculated distance is greater than the destination alarm distance, or via path 1388 and NO path 1385 emanating from decision block 1380, in the event that the destination alarm has not been enabled.

K. T-D Line Selection and Drawing Routine 1400

This routine, as noted above, determines the two T-D lines that will be drawn and then draws these T-D lines on the display panel. Graphically displaying the T-D lines allows the user to see the display of angles between these lines and to navigate along these lines, if desired. Through this routine, T-D lines will be displayed for two user selected stations that appear in a selected chain of Loran C stations. The first T-D line will be held constant at a user selected number while the second T-D line will be changed in order to find a line that intersects with the first T-D line within the limits of the present display and, if the graphic cursor is on, runs through the current position of the graphic cursor. If the graphic cursor is not on, then the second T-D line will be determined to be that line that intersects the current vessel position and intersects with the first T-D at a location lying within the present display limits.

A flowchart of T-D Line Selection and Drawing Routine 1400 is collectively depicted in FIGS. 14A-14F, for which the correct alignment of the drawing sheets for these figures is shown in FIG. 14. Specifically, as shown, this routine is formed of T—D Line Selection Routine 1405 which determines the two T—D lines that will be drawn and T—D Line Drawing Routine 1450 which visually draws the two T—D lines on the display panel.

Upon entry into routine 1400, execution first proceeds to T-D Line Selection Routine 1405. Within routine 1405, execution proceeds to block 1407 which, when executed, initializes the contents of counter "j" to zero. Thereafter, execution proceeds to decision block 1409 which, when executed, determines whether the graphic cursor is currently on. In the event that the graphic cursor is not on, decision block 1409 routes execution, via its NO path, to block 1411 which, when executed, sets the contents of counter "j" to the value one. Thereafter, execution proceeds, via path 1449, to decision block 1412. Execution also reaches this decision block, via the YES path emanating from decision block 1409, in the event that the graphic cursor is currently on. Decision block 1412 determines whether the current value of counter "j" equals zero. In the event that this value equals zero, then execution proceeds, via the YES path emanating from decision block 1412, to block 1413. This latter block, when executed, loads latitude and longitude values for the current location of the graphic cursor into a temporary register. Alternatively, if the current contents of counter "j" are not equal to zero, then execution proceeds to decision block 1416, via the NO path emanating from decision block 1412. Decision block 1416 determines whether the current value of counter "j" equals one. In the event that this value equals one, then execution proceeds, via the YES path emanating from decision block 1416, to block 1419. This latter block, when executed, loads latitude and longitude values for the current position of the vessel into a temporary register. Alternatively, if the current contents of counter "j" are not equal to one, then execution proceeds to decision block 1422, via the NO path emanating from decision block 1416. Decision block 1422 determines whether the current value of counter "j" equals two. In the event that this value equals two, then execution proceeds, via the YES path emanating from decision block 1422, to block 1425. This latter block, when executed, loads latitude and longitude values for the intersection of two user selected T-D lines into a temporary register. Alternatively, if the current contents of counter "j" are not equal to two, then execution proceeds to block 1428, via the NO path emanating from decision block 1422. Block 1428, when executed, loads latitude and longitude values for the center of the currently displayed area into a temporary register. After block 1413, 1419, 1425 or 1428 has fully executed, then execution proceeds along path 1414, 1420, 1426 or 1429 and path 1431 to block 1433.

Block 1433, when executed, calculates the T-D line number of the second T-D line from the latitude and longitude values provided through execution of block 1413, 1419, 1425 or 1428. Thereafter, execution proceeds to block 1435. Block 1435, when executed, calculates the latitude and longitude values of a point of intersection of the two selected T-D line numbers. Once this has occurred, execution proceeds to decision block 1437 which determines whether the calculations successfully yielded an intersection point. If these calculations were not successful, decision block 1437 routes execution, via NO path 1438, to block 1444 which, when executed, increments the contents of counter "j" by one in order to first select a different line as the second T-D line and then attempt to successfully determine a point of intersection with the first T-D line. If, however, the calculations successfully yielded a point of intersection, then decision block 1437 routes execution, via its YES path, to decision block 1440 which determines whether the intersection point lies within the displayed area. If this point does not lie within the displayed area, then decision block 1440 routes execution, via its NO path 1442, to block 1444 in an attempt to select another T-D line that has a point of intersection within the displayed area and so on. Alternatively, in the event that the point of intersection lies within the displayed area, then a suitable second T-D line has been selected and both T-D lines can now be drawn. In this case, execution proceeds, via YES path 1441 emanating from decision block 1440, to T-D Line Drawing Routine 1450.

A T-D line is basically drawn by successively incrementing one of two T-D numbers, then calculating corresponding orthogonal latitude and longitude coordinates that define a point of intersection for each set of numbers and displaying the T-D line as a sequence of points having the resulting sets of coordinates. Specifically, upon entry into routine 1450, execution first proceeds to block 1452 which, when executed, sets the value of T-D line increment step variable, INCREM, equal to a preset value multiplied by a scale factor. Inasmuch as the calculations of all the corresponding latitude and longitude values are numerically intensive, the preset value is appropriately chosen to be sufficiently large such that drawing routine 1450 does not consume an excessive amount of processing time but not excessively large which will disadvantageously distort the hyperbolic nature of these lines when they are drawn and displayed. Once block 1452 fully executes, execution proceeds to block 1454 which initializes the value of a T-D line drawing flag, "k", to one. Thereafter, block 1456 is executed, to initialize the value of loop counter "j" to one. Once this occurs, execution proceeds to decision block 1458. This decision block, when executed, determines whether the current contents of counter "j" are less than number of T-D lines that are to be drawn, i.e. the value two. Once the contents of this counter equal the value two, then all the T-D lines have been drawn. In this case, execution exits from routine 1400, via NO path 1459 emanating from decision block 1458. In the event that the current contents of counter "j" are less than the value two, then execution proceeds, via the YES path, emanating from decision block 1458, to block 1461. This latter block, when executed, loads the position of the point of intersection in terms of the T-D line numbers into appropriate temporary registers. Thereafter, execution proceeds to block 1463 which, when executed, initializes the contents of T-D line increment counter "i" to one. This counter counts the number of increments that have been added to a T-D line number measured from the intersection point. Once block 1463 executes, execution then proceeds to decision block 1465. This block tests whether a keyboard interrupt has occurred. If such an interrupt has occurred, then T-D line drawing is aborted and the interrupt is then serviced. Consequently, execution exits from routine 1400, via YES path 1467 emanating from decision block 1465. If, however, a keyboard interrupt has not occurred, then decision block 1465 routes execution, via NO path 1466, to block 1469.

Block 1469, when executed, increments or decrements, depending upon the value of flag "k", the value of a current T-D line number by the contents of counter "i" multiplied by the incremental value INCREM. Thereafter, execution proceeds to block 1471 which, when executed, calculates the corresponding latitude and longitude values for the intersection point of the incremented T-D line number currently being drawn and the fixed T-D line number. Once this occurs, execution proceeds to decision block 1473 which determines whether the calculations undertaken in block 1471 were successful, i.e. a convergence was achieved. If the calculations were successful, then decision block 1473 routes execution, via its YES path, to block 1476. This latter block, when executed, calculates the relative position within the displayed area of the calculated longitude and latitude values. Thereafter, execution proceeds to block 1478 which, when executed, instructs display interface 80 (see FIG. 1) to draw a line on the display panel that connects a previous point on a currently drawn T-D line with the calculated relative position. In the event the calculated relative position lies beyond an edge of the displayed area, then, as shown in FIGS. 14A–14F, the clipping routines are invoked to calculate, by interpolation, a suitable relative position located on the edge of the displayed area. Once block 1478 has fully executed, then execution proceeds to decision block 1480. This decision block, when executed, routes execution, depending upon whether the calculated position lies within or outside the currently displayed area on the display panel, to either block 1483 or 1485, respectively. Blocks 1483 and 1485 respectively set the value of flag "tog" to either one or zero. Thereafter, execution proceeds from either block 1483 or 1485 to decision block 1486. This decision block determines whether the line number for the current T-D line being drawn has already been displayed. If the line number has not yet been displayed, then decision block 1486 routes execution, via its NO path, to block 1490. This latter block, when executed, causes the line number to be displayed. Specifically, if the relative position of the new point of intersection determined within block 1476 lies within the currently displayed area appearing on the display panel, the T-D line number will be written near this point. If, however, the relative position is not within the currently displayed area, then the T-D line number will be displayed near the original intersection point of the two original (i.e. non-incremented) T-D lines and specifically in a position that does not cause cluttering with any T-D line numbers that are being presently displayed. Once this occurs, execution then proceeds, via paths 1491 and 1488, to decision block 1492. Execution also reaches this decision block, via YES path 1487 and via path 1488, in the event that the T-D line number is already displayed for the current T-D line presently being drawn.

Decision block 1492, when executed, determines whether the contents of flag "tog" equal zero. In the event the contents of this flag do not equal zero, then decision block 1492 routes execution, via NO path 1493, to decision block 1465 to determine whether a keyboard interrupt has occurred and so on. Alternatively, if the value of flag "tog" equals zero, then decision block 1492 routes execution, via YES path 1494, to block 1495 which, when executed, decrements the value of flag "k" by one to change the direction in which a T-D line will be drawn, i.e. to subsequently draw a remaining half portion of this line. Execution also reaches block 1495 via NO path 1474, emanating from decision block 1473, in the event that the calculations performed in block 1471 were not successful, i.e. a point of intersection between the current incremented and fixed T-D lines was not found (no convergence occurred). In any event, after block 1495 has fully executed, execution proceeds to decision block 1496 which determines whether the value of flag "k" is less than zero. In the event that the value of flag "k" is less than zero, then execution proceeds, via the YES path emanating from decision block 1496, to block 1497 which, when executed, sets the value of flag "k" to one. Execution then proceeds to block 1498 which increments the value of counter "j" by one in preparation for drawing another T-D line, i.e. the second of two T-D lines. Once block 1498 has executed, or in the event that the value of flag "k" is equal to or greater than zero, in which case execution was directed along the NO path emanating from decision block 1496, execution loops back, via path 1499, to decision block 1458 to determine whether all the T-D lines have been fully drawn, and so on.

L. Borderline Entry Routine 1500

Figure 15:
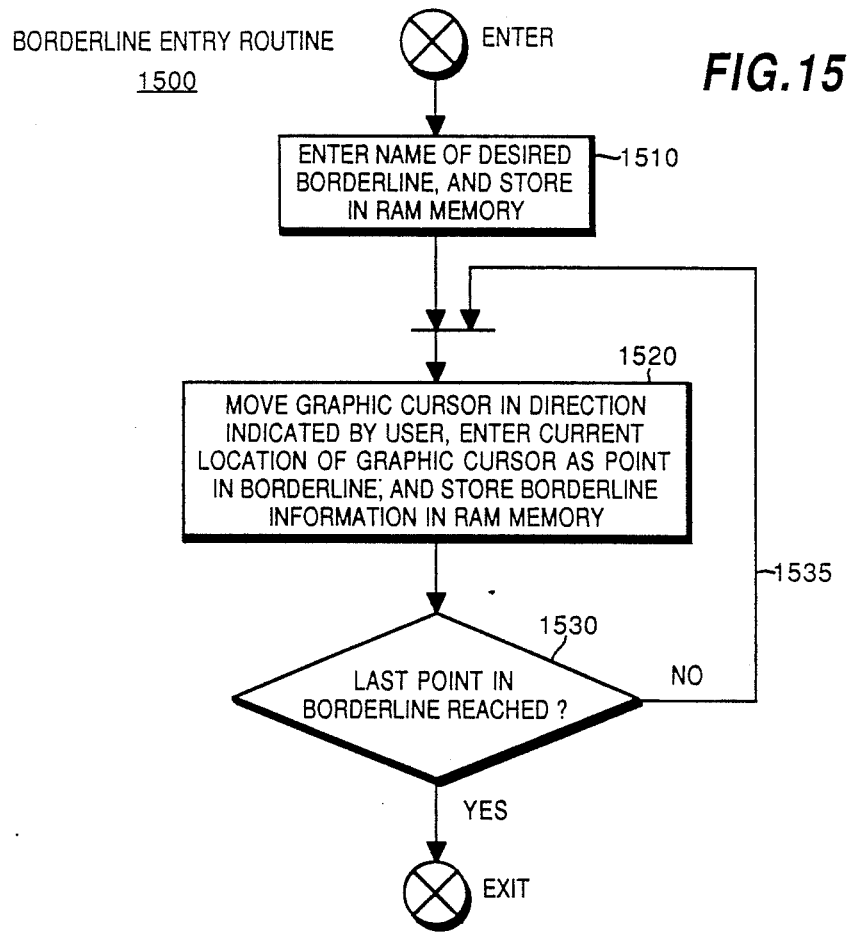
FIG. 15 depicts a flowchart of Borderline Entry Routine 1500 that is executed as part of Keyboard Sequence Routine 900 shown in FIGS. 9A and 9B.

This routine, as noted above, allows the user to create a new borderline. A flowchart of Borderline Entry Routine 1500 is depicted in FIG. 15.

As shown, upon entry into this routine, execution proceeds to block 1510 which obtains a name of the new borderline from the user and stores the resulting name in RAM memory. Thereafter, execution proceeds to block 1520 which, when executed, moves the graphic cursor in the direction(s) specified by the user through appropriate depression of desired direction keys (arrow keys labelled "NORTH", "WEST", "SOUTH" and/or "EAST") appearing on the keyboard shown in FIG. 24. As the cursor is moved, block 1520, as shown in FIG. 15, in response to each user depression of the "SELECT" key enters the position of the cursor at a successive selected pixel location and saves that position in RAM memory as borderline information. Once this position information is saved, execution proceeds to decision block 1530 to determine whether either the user has specified, by depression of the "ENTER" key, that the last location in the borderline has been entered. In the event that the last point in the borderline has not been reached, then decision block, 1530 routes execution, via NO path 1535, back to block 1520 to allow the user to move the graphic cursor to the next point to be selected that forms the borderline and then store the location of that point, and so on. Alternatively, if the last point in the borderline has been reached, then execution exits from routine 1500, via the YES path emanating from decision block 1530.

M. Borderline Selection Routine 1600

Figure 16:
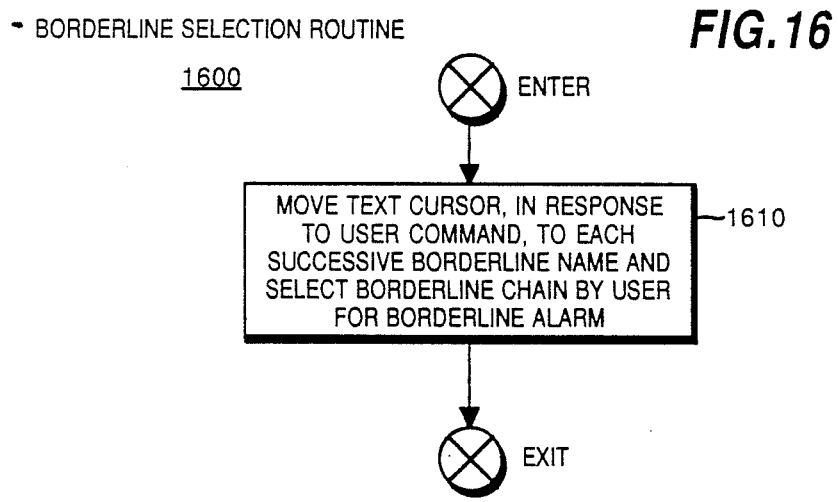
FIG. 16 depicts a flowchart of Borderline Selection Routine 1600 that is executed as part of Menu Routine 1000 shown in FIG. 10.

This routine, as noted above, permits the user to select one of the borderlines that have been previously defined by the user for use as a border alarm. FIG. 16 depicts a flowchart of Borderline Selection Routine 1600. This routine consists of block 1610 which, when executed, successively moves (scrolls) the text cursor, by successive depressions of the down arrow ("SOUTH") key, to each entry in the borderline list and then allows the user to select, by depression of the "SELECT" key, a borderline entry coincident with the current position of the text cursor for subsequent use as a borderline alarm. Once the user has selected a borderline, execution of block 1610 is completed and thus execution exits from this routine.

N. Border Alarm Selection Routine 1700

Figure 17:
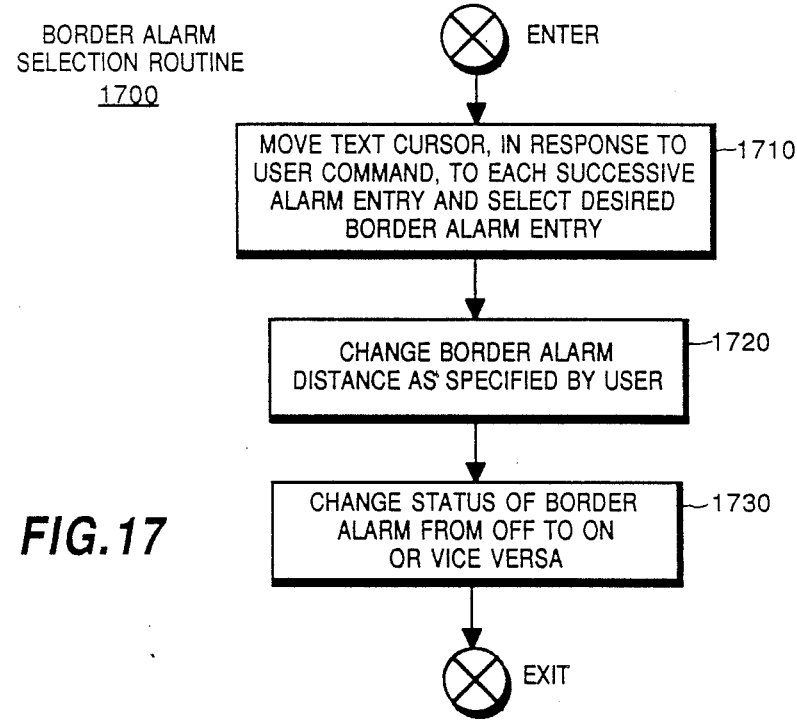
FIG. 17 depicts a flowchart of Border Alarm Selection Routine 1700 that is executed as part of Menu Routine 1000 shown in FIG. 10.

This routine, as noted above, permits the user to change the alarm distance and change the status of the border alarm. A flowchart of Borderline Selection Routine 1700 is depicted in FIG. 17.

As shown, upon entry into this routine, execution proceeds to block 1710 which, when executed, moves (scrolls) the text cursor, in response to successive user depressions of the down arrow key, to each successive alarm entry in the alarm list, and then allows the user to select a border alarm entry coincident with a current position of the text cursor. Thereafter execution proceeds to block 1720 which, when executed, displays the present value of the border alarm distance. If the user enters a new value for this distance, then block 1720 sets the alarm distance to the new value. Thereafter, block 1730 executes to change (toggle) the status of the border alarm from on to off or vice versa.

O. Border Alarm Trigger Routine 1800

Figure 18:
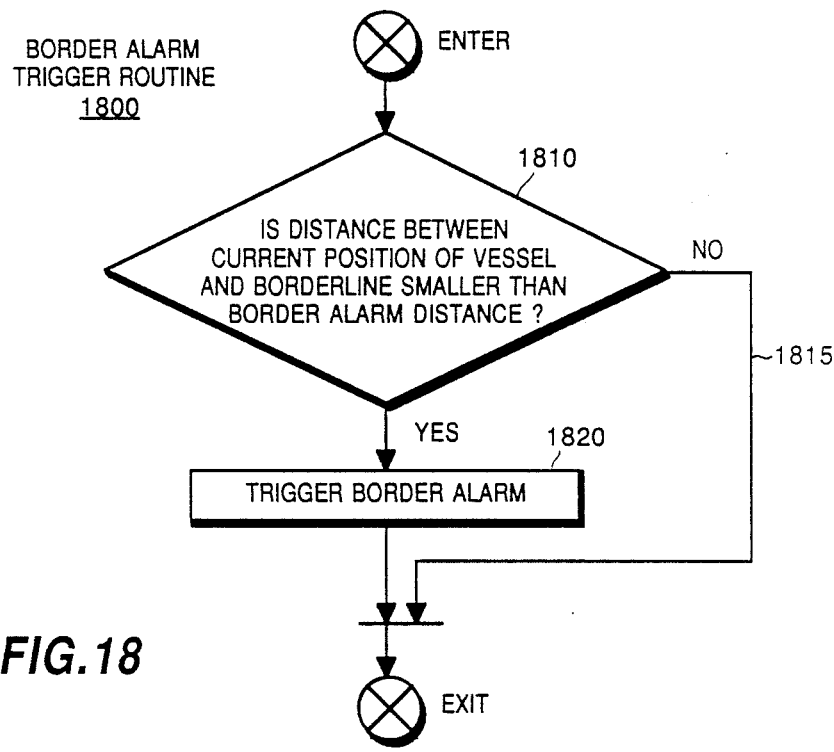
FIG. 18 depicts a flowchart of Border Alarm Trigger Routine 1800 that is executed as part of Write Routine 500.

This routine triggers a border alarm, if it is enabled for a corresponding borderline, whenever the current position of the vessel is situated within a region that surrounds a corresponding borderline and peripherally extends around and outward from the borderline by a distance defined by the associated border alarm distance. A flowchart of Border Alarm Trigger Routine 1800 is depicted in FIG. 18.

Upon entry into routine 1800, execution proceeds to decision block 1810 which determines if the distance between the current position of the vessel and any borderline associated with an enabled border alarm is less than the border alarm distance. In the event that the distance is less than the border alarm distance, then execution proceeds, via the YES path emanating from decision block 1810, to block 1820. This block triggers the appropriate border alarm. When triggered, the border alarm consists of an appropriately displayed warning on the display panel and activation of an external annunciator, such as a horn or the like, that is connected to an appropriate output port of communication ports 70 (see FIG. 1). Once this occurs, as shown in FIG. 18, execution exits from routine 1800. Execution also exits from this routine, via NO path 1815 emanating from decision block 1810, if the vessel is not currently located within a region defined by a border alarm distance associated with the enabled border alarm.

P. Offset Routine 1900

This routine, as noted, allows the user to create an offset into a course. Such an offset can be generated whenever the user desires to impart an offset to the vessel position, as indicated on the display screen, in order to bring the displayed position into conformity with the actual position of the vessel, e.g. at a known buoy, dock or other location. A discrepancy between these positions can arise from known error conditions, such as an additional secondary phase factor, that are associated with Loran C navigation or from other affects.

Figure 19:
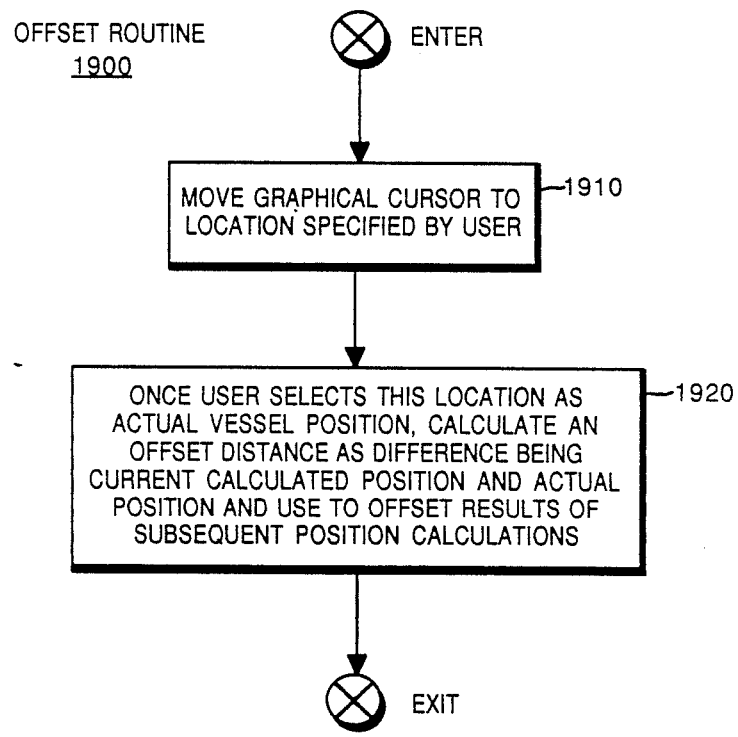
FIG. 19 depicts a flowchart of Offset Routine 1900 that is executed as part of Keyboard Sequence Routine 900 shown in FIGS. 9A and 9B.

A flowchart of Offset Routine 1900 is depicted in FIG. 19. Specifically, upon entry into this routine, execution proceeds to block 1910 which, when executed, moves the graphical cursor to a position defined by the user. Once the user selects this position, through depression of an appropriate key, execution proceeds to block 1920. This block, when executed, calculates the distance occurring between the current calculated vessel position, e.g. determined through Loran C data, and the actual position of the vessel indicated by the present position of the graphical cursor. This distance, being the offset distance, is stored in RAM memory and is subsequently used to offset the results of each ensuing calculation of the current position of the vessel.

Q. Track Navigation Select Routine 2000

This routine, as noted above, permits a user to select an appropriate track to be used for navigational purposes. From a list of stored tracks, a user can select a specific track for automatic navigation in either a forward or reverse direction. Whenever a new track is selected, the closest track point situated on that track is chosen as the first target point. If, however, this point lies in the reverse direction to the current direction of navigation, then the closest neighboring track point situated on the current track and located in the correct direction of navigation is chosen as the first track point.

Figure 20:
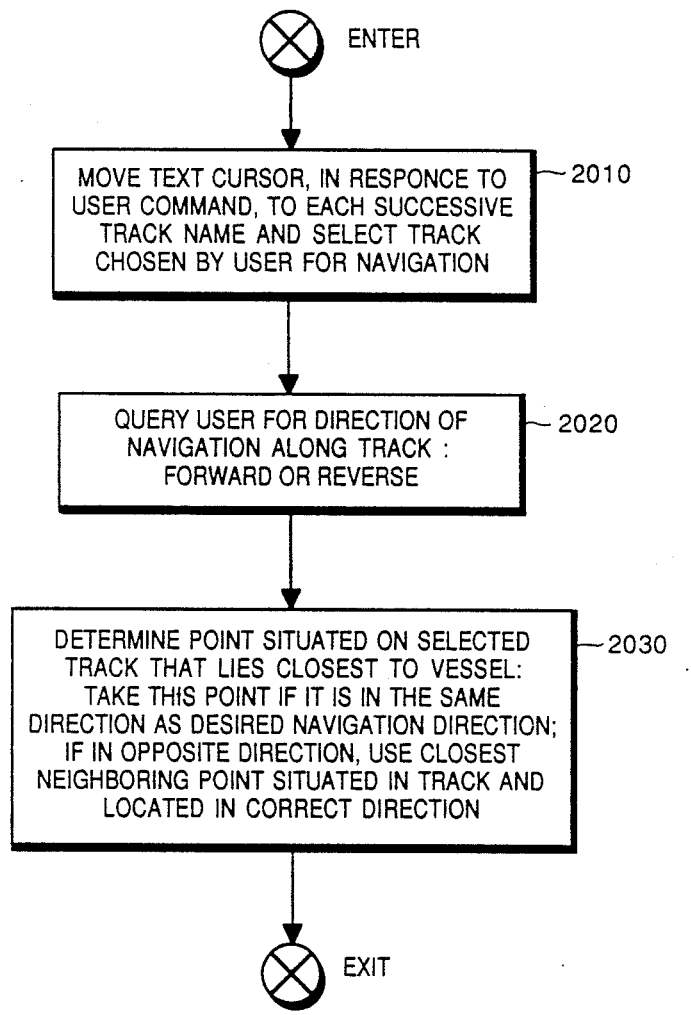
FIG. 20 depicts a flowchart of Track Navigation Select Routine 2000 that is executed as part of Menu Routine 1000 shown in FIG. 10.

A flowchart of Track Navigation Select Routine 2000 is depicted in FIG. 20. As shown, upon entry into this routine, execution proceeds to block 2010 which, when executed, successively moves the text cursor, by successive user depressions of the down arrow key, to each entry in the track list and then allows the user to select, by depression of the "SELECT" key, a track entry coincident with the current position of the text cursor for subsequent use in track navigation. Once this occurs, execution proceeds to block 2020 which queries the user for the direction of navigation along the track, i.e. either forward or reverse. Once the user has provided a suitable response, execution proceeds to block 2030 which determines the first track point. The point on the selected track that is closest to the current vessel position and lies in the selected direction of navigation is taken as the first track point. Otherwise, if this point lies along the track in the opposite direction to that selected, then the neighboring point on the current track that is closest to the current vessel position and lies along the correct direction is taken as the first track point. Once this point is obtained, then execution exits from routine 2000.

R. T-D Line Selection Routine 2100

Figure 21:
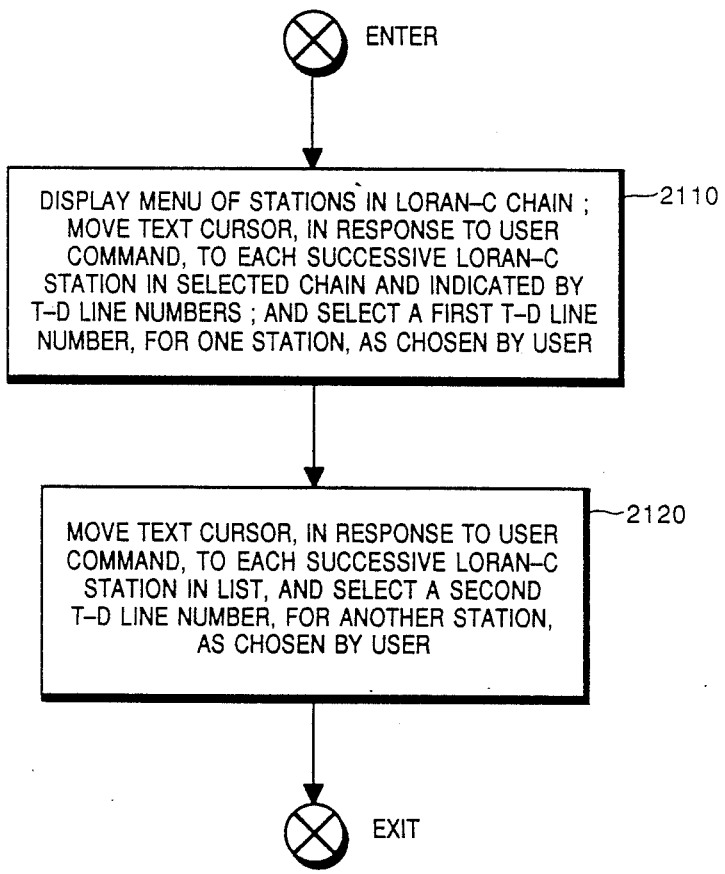
FIG. 21 depicts a flowchart of T-D Line Selection Routine 2100 that is executed as part of Menu Routine 1000 shown in FIG. 10.

This routine, as noted above, enables the user to select the desired two T-D lines that are to be drawn on the display panel. Through this routine, the user can then select two Loran C stations in a grain Loran C chain for subsequent use in drawing T-D lines. A flowchart of T-D Line Selection Routine 2100 is depicted in FIG. 21.

As shown, upon entry into this routine, execution proceeds to block 2110. This block, when executed, draws a new menu that lists the available Loran C stations in a given GRI chain, listed in terms of T-D line numbers, and then successively moves the text cursor, by successive user depressions of the down arrow key, to each Loran C station in this chain, and then allows the user to select, by depression of the "SELECT" key, a first station coincident with a current position of the text cursor. The particular chain of Loran C stations will have been chosen by the user by setting appropriate entries in the options list during Keyboard Sequence Routine 900 (see FIGS. 9A, 9B and 10 which have all been discussed above), or through a Loran C receiver that provides this information. Once this station has been selected, execution proceeds to block 2120 which, when executed, successively moves the text cursor, by successive user depressions of the down arrow key, to each Loran C station in this chain, and then allows the user to select, by depression of the "SELECT" key, a second station in this chain coincident with a current position of the text cursor for subsequent use in drawing T-D lines. Once this second station has been selected, execution exits from routine 2100.

S. Home Routine 2200

This routine, as noted above, causes the plotter, upon user request, to re-center, i.e. "home", the displayed area on any one of several different items: the current location of the graphic cursor, if it is on, or, if the graphics cursor is not on, the location of a selected waypoint, hang or other similar item stored in a corresponding user pre-defined list or the start of any selected track, borderline, route or other similar item stored in another corresponding user defined list. Specifically, the home function is invoked and the display is re-drawn centered around either a selected item in a list or the current location of the graphic cursor, by a user depression of the "HOME" key shown in FIG. 24.

Figure 22:
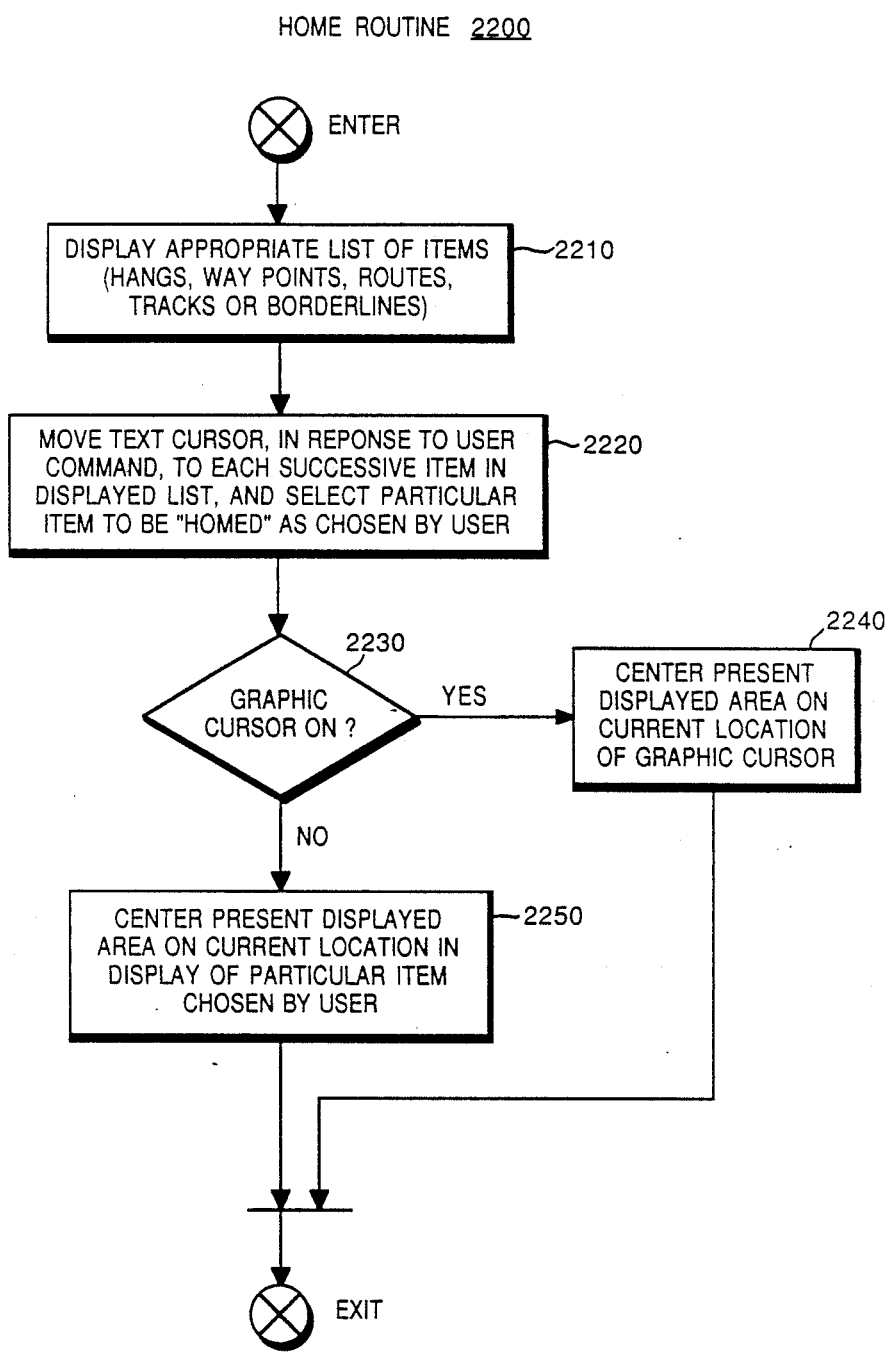
FIG. 22 depicts a flowchart of Home Routine 2200 that is executed as part of Menu Routine 1000 shown in FIG. 10.

A flowchart of Home Routine 2200 is depicted in FIG. 22. As shown, upon entry into this routine, execution proceeds to block 2210 which, when executed, displays an appropriate list of items as selected by the user. The particular list is determined by the user depressing the "ROUTE", "TRACK", "WAYPOINT" or "HANG" key followed by the "LIST" key to obtain a user defined list of routes, a combined user defined list of tracks and borderlines, a user defined list of waypoints or a user defined list of hangs. Once the appropriate list is selected and displayed, execution proceeds to block 2220 which, when executed, moves the text cursor, by successive user depressions of the down arrow key, to each particular item in the selected list, and then allows the user to select, by depression of the "HOME" key, the particular item coincident with a current position of the text cursor that is to be re-located to the center of the displayed area and around which the displayed area is to be re-drawn. Thereafter, execution proceeds to decision block 2230 which determines whether the graphic cursor is on. In the event that the graphic cursor is on, then decision block 2230 routes execution, via its YES path, to block 2240 which, when executed, appropriately re-draws the displayed area centered about the current graphic cursor location. Alternatively, if the graphic cursor is not on, the decision block 2230 routes execution, via its NO path, to block 2250 which, when executed, appropriately re-draws the displayed area centered about the location of the selected item: the starting point of a selected route, track or borderline, or the location of a hang or waypoint. After either block 2240 or 2250 has completely executed to fully re-draw the displayed area, execution then exits from routine 2200.

T. Hang/Waypoint Log Routine 2300

Figure 23:
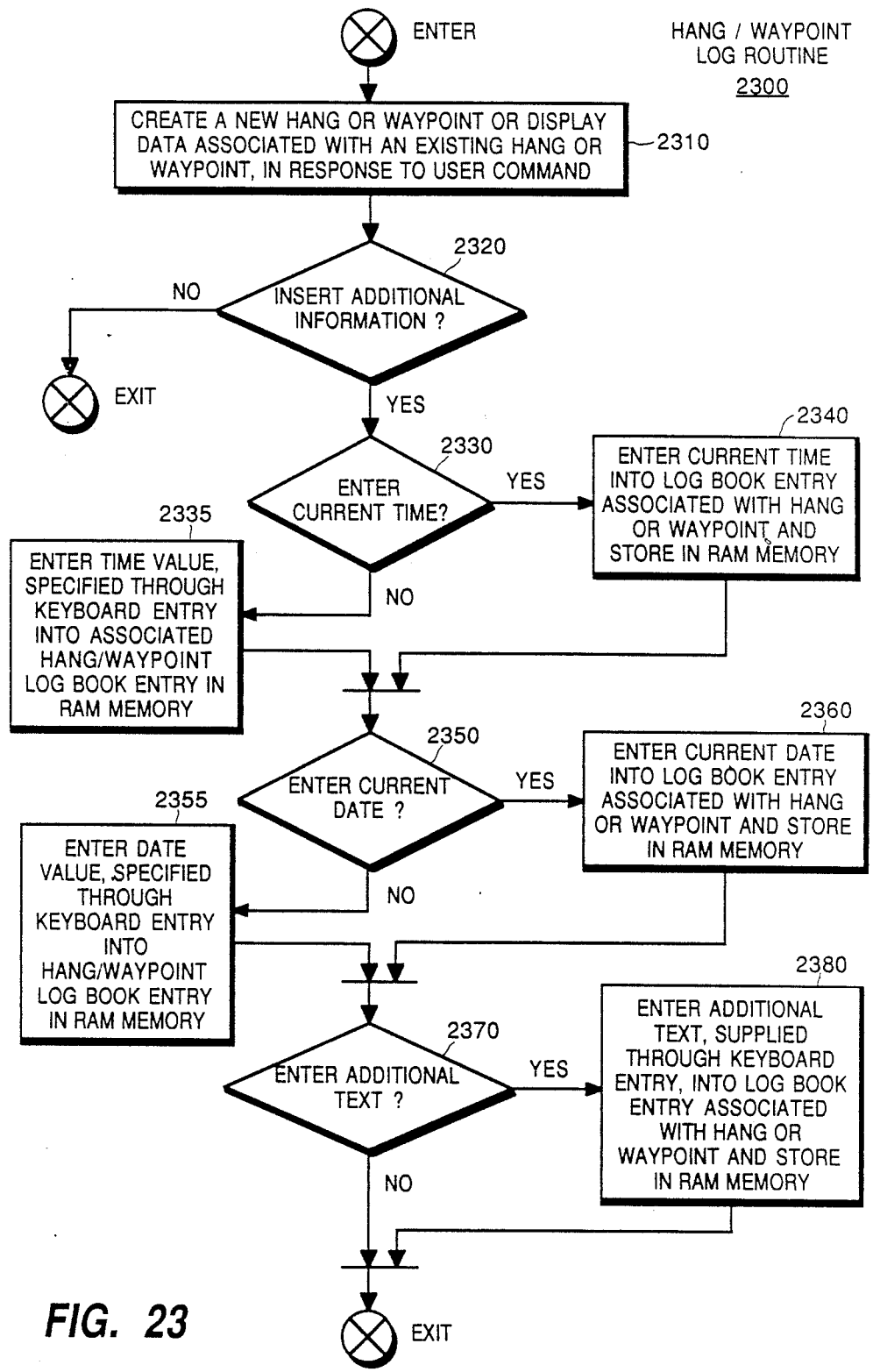
FIG. 23 depicts a flowchart of Hang/Waypoint Log Routine 2300 that is executed among other places as part of Keyboard Sequence Routine 900.

This routine, as noted above, allows the user to create or modify an accompanying electronic logbook entry for a hang or waypoint. Through such an electronic logbook entry, the user can specify the reason why the hang or waypoint was created and/or provide any desired additional information for future recall with that hang or waypoint. A flowchart of Hang/Waypoint Log Routine 2300 is depicted in FIG. 23.

As shown, upon entry into this routine, execution proceeds to block 2310. This block, when executed, creates a hang or waypoint entry in the hang or waypoint list or displays data that has already been stored by the user regarding a selected existing hang or waypoint entry. Once this occurs, execution proceeds to decision block 2320. This block determines, in response to an appropriate keyboard entry, e.g. pressing the "ENTER" key, whether the user will insert additional information into this logbook entry. If no additional information is to be entered, indicated by user depression of the "CANCEL" key, then execution exits from routine 2300 via the NO path emanating from decision block 2320. Alternatively, in the event that additional information is to be entered, then decision block 2320 routes execution to decision block 2330. This latter decision block determines, in response to a depression of an appropriate key by the user, whether the current time is to be stored within the entry. If the current time is to be stored, then decision block 2330 routes execution, via its YES path, to block 2340 which, when executed, enters the current time into the electronic logbook entry stored in RAM memory. Execution then proceeds to decision block 2350. Alternatively, in the event the user enters a specific time value followed by an appropriate key depression, then decision block 2330 routes execution, via its NO path, to block 2335 which, when executed, stores the user specified time value into this electronic logbook entry stored in RAM memory. Execution then proceeds to decision block 2350. Decision block 2350 determines, in response to a depression of an appropriate key by the user, whether the current date is to be stored within the entry. If the current date is to be stored, then decision block 2350 routes execution, via its YES path, to block 2360 which, when executed, enters the current date into the electronic logbook entry stored in RAM memory. Execution then proceeds to decision block 2370. Alternatively, in the event the user enters a specific date followed by an appropriate key depression, then decision block 2350 routes execution, via its NO path to block 2355 which, when executed, stores the user specified date into this electronic logbook entry stored in RAM memory. Execution then proceeds to decision block 2370. Decision block 2370 determines, in response to a depression of an appropriate key by the user, whether the user desires to enter additional textual data for storage within the logbook entry or edit existing textual data stored therein or do neither. If the text is to be changed, either by entry of new data or editing of existing data, then decision block 2370 routes execution, via its YES path, to block 2380 which, when executed, allows the user to enter new text and/or edit existing text by depressing appropriate keys on the keyboard. The resulting text is then stored within the logbook entry in RAM memory. Once block 2380 fully executes or in the event the stored textual data, if any, is not to be changed in which case decision block 2370 routes execution to its NO path, execution will then exit from routine 2300.

IV. Illustrative Displays

Various illustrative displays that are generated by the inventive plotter and which appear on the face of the display panel and demonstrate various capabilities of this plotter, as discussed above, are shown in FIGS. 25 and 26.

A. Scaled Coastline Charts

One such feature inherent in the inventive plotter, as discussed above, allows the user to zoom into a desired area on a stored nautical chart presently being displayed.

In this regard, FIG. 25 shows displays (A)–(D) that depict illustrative nautical charts at decreasing scale factors as actually displayed by inventive plotter 10. Specifically, display (A) is a portion of a low resolution chart displayed at a scale of 1:28,000,000 that encompasses the Florida, Gulf Coast and Caribbean region. The chart scale can range from 1:70,000,000 to 1:4,000. Displays show the resulting displayed charts as the user illustratively zooms into the region surrounding Biscayne Bay in Florida. Display (B) shows a region of chart (A) which encompasses the southern tip of Florida and the Florida Keys drawn at a scale of 1:4,000,000. By decreasing the scale to 1:1,000,000 the user can instruct the inventive plotter to zoom into the Biscayne Bay area in Southern Florida to generate the chart shown in display (C). This chart also contains two drawn T-D lines having line numbers of 43169 and 30762 and intersecting at the current location of the graphic cursor. By decreasing the scale even further to 1:50,000, the user can instruct the plotter to zoom into a portion of Biscayne Bay itself to generate the chart shown in display (D). A photograph of a section of a NOAA chart that corresponds to display (D) is shown in chart (E) of FIG. 25. Thus it can be seen that the inventive plotter provide charts that advantageously closely match NOAA charts in the amount of coastline detail that can be depicted. Each of the displays (A)–(D) also provides corresponding lines of latitude and longitude occurring within the displayed area.

B. Various Features Provided by the Inventive Plotter

Figure 26:
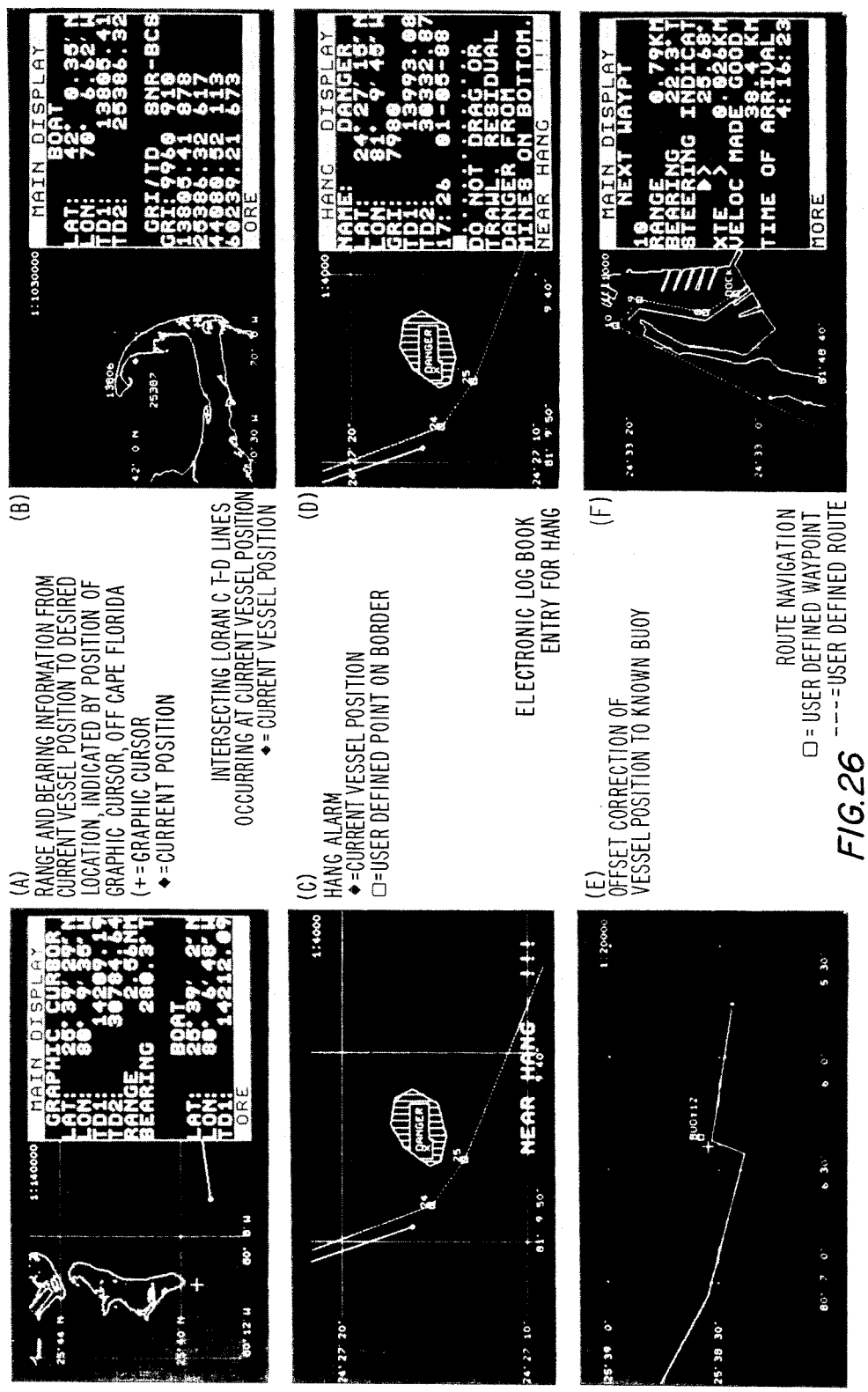
FIG. 26 shows various illustrative displays (A)–(F) that actually appeared on the display panel of inventive plotter 10 and which demonstrate various features provided by the inventive plotter.

FIG. 26 shows various illustrative displays (A)–(F) as actually displayed on the display panel of inventive plotter 10 and which demonstrate various features provided by the inventive plotter. Specifically, display (A) shows the use of the graphic cursor in generating nautical range and bearing information from a current position of a vessel, indicated by a solid diamond shaped symbol to the current graphic cursor position, indicated by a "+" on the display, all overlaid onto a section of coastline data displayed at a scale of 1:140,000. In addition, the graphic cursor location can be used to define the location of waypoints and hangs or the beginning of a track, route or border and various points occurring thereon. Display (B) shows the current position of the vessel, again marked by a solid diamond shaped symbol, with the two T-D lines that intersect at this position (line numbers 13806 and 25387), all overlaid onto a section of coastline data displayed at a scale of 1:1,030,000. Display (C) shows the display of a stored hang and a hang alarm, the latter indicated by connected dotted line segments that have separate points defined by the user and indicated by squares ("☐") situated thereon. The name of this hang is "DANGER". Also, the hang has been shaded using Borderline Entry Routine 1500 which enables the user to add graphical information to a stored chart and store this information for subsequent recall. The current track of the vessel and its current position, indicated by a solid diamond symbol, along that track are also indicated on this display. Since the current position of the vessel is approaching the hang and is within a user defined alarm distance, the hang alarm is triggered and produces a visual alarm shown in this display. Display (D) shows the area displayed in display (C) along with an accompanying stored electronic logbook entry for the hang. This entry provides name of the hang, latitude and longitude location of the hang and intersecting T-D lines thereat, as well as accompanying user defined textual information. Display (E) shows a positional offset. Here, the current track of the vessel is shown. Once the vessel has approached a buoy having a known location, the user can instruct the plotter to offset the current vessel position to the position of the buoy by first moving the graphic cursor to the position of the buoy and then instructing the plotter to offset the current vessel position to the location of the graphic cursor. This positional offset, indicated by an upward change in the current course, will be added to the results of all subsequent determinations of the current vessel position. Display (F) shows route navigation. Here, a selected user defined route is shown that consists of a series of line segments which join user defined waypoints with each waypoint indicated by a square symbol ("☐"), all overlaid onto a section of coastline data including separate piers displayed at a scale of 1:11,000. Each waypoint carries a user defined number. The display also shows navigational information from the current waypoint, labelled "9", to the next waypoint labelled "10" including range and bearing data, visual steering information, cross track error and expected time of arrival. Each of the displays (A)–(F) also provides corresponding lines of latitude and longitude occurring within the displayed area.

Clearly, those skilled in the art now recognize that the inventive method is not limited to just compressing and displaying terrain boundaries and specifically coastline data, but can be applied to use in substantially any navigational plotter for compressing and displaying any existing linear geographic features, such as highways or roadways, local or national boundaries, or pre-defined navigational data, such as aeronautical corridors, or similar linear data appearing on any chart. This linear data need not be just straight lines but can be defined either or both by curved lines as well. Through use of this inventive method, a substantial amount of such data can advantageously be stored in a relatively small memory. In addition, this data advantageously can be easily and quickly scaled to substantially any desired scale factor for display purposes.

Although one embodiment of the present invention has been shown and described in detail herein, many other varied embodiments that incorporate the teachings of the present invention may be easily constructed by those skilled in the art.

We claim:

1. In a video navigation plotter for displaying linear geographic data occurring within a pre-defined geographic region, a method of storing the geographic data in said plotter and displaying the geographic data on a display, said method comprising the steps of:

representing said linear geographic data occurring in said region as a sequence of data calls with each data cell carrying a different cell number, wherein each successive cell encompasses a different successive pre-defined area existing within the region;

storing each of said data cells as a memory cell within a memory, said memory cell containing a corresponding sequence of fields, said sequence defining a corresponding segment of said geographic data that occurs within the pre-defined area encompassed by said each data cell, wherein a first field in said sequence stores coordinates of a starting point of said segment and each successive field in said sequence stores a position offset value measured from a previous point in said segment to a next successive point in said segment, said segment point being defined by all offset values and said starting point that previously occur within said sequence;

maintaining a table of individual memory cell numbers that defines an order in which said memory cells should be accessed in order to generate the linear geographic data;

defining a numeric range of the memory cells, specified in said table, that collectively contain geographic data which forms a selected portion of the linear geographic data that is to be displayed on the display;

successively accessing from the memory each of the memory cells that lies within said range of memory cells; and incrementally drawing, in response to each accessed memory cell, a pattern in a portion of a display screen, wherein said portion corresponds to the location of the data cell in the region and associated with said accessed memory cell and said pattern depicts the segment stored within said accessed memory cell and wherein said pattern is drawn as a series of connected line segments that begin at the starting point occurring within the sequence stored within the accessed memory cell, continue to a point specified by a first offset value occurring within the sequence stored within the accessed memory cell and extend to each corresponding point specified by each successive offset value occurring within the sequence stored within the accessed memory cell.

2. The method in claim 1 wherein said storing step comprises the step of storing only those data cells which contain corresponding segments of said linear geographic data.

3. The method in claim 2 wherein said storing step further comprises the step of:

storing a plurality of corresponding sequences in said memory cell in the event the data cell associated therewith contains a portion of said linear geographic data; and storing a first delimiter field between successive sequences within said memory cell and a second delimiter field at the end of said memory cell to mark a termination of the memory cell.

4. The method in claim 3 wherein said representing step comprises the step of:

storing a field containing a value for a pre-defined step size for said linear geographic data; and said method further comprises the steps of:

determining a scaling factor by multiplying said step size by a user selectable scale value; and using the scaling factor to establish a minimal incremental offset distance between successively displayed pixels that depict the segments that form the selected portion of said linear geographic data.

5. The method in claim 4 wherein said incrementally drawing step comprises the step of: energizing the pixels that are encompassed by a data cell associated therewith if the associated data cell has a size that corresponds to less than a combined size of the pixels.

6. The method in claim 3 wherein the starting point and each offset value are each represented by a pair of orthogonal coordinate values.

7. The method in claim 3 wherein orthogonal coordinate values for the starting point have a greater resolution than orthogonal coordinate values for each offset value.

8. The method in claim 3 wherein said incrementally drawing step further comprises the step of determining an appropriate end point that is to be drawn for any one of said segments if said one segment intersects with an edge of the display.

9. The method of claim 3 further comprising the step of displaying a current position of a vessel with course or track data associated therewith overlaid onto the selected portion of said linear geographic data that appears on the display.

10. The method in claim 9 further comprising the step of:

delineating an area situated peripherally around and extending outward from a pre-defined border appearing on said display by a predetermined amount; and triggering an alarm condition when the current position of the vessel indicates that the vessel has moved into said delineated area.

11. The method in claim 9 further comprising the step displaying a current position of a vessel with two Loran T-D lines overlaid onto the selected portion of said linear geographic data that appears on the display.

12. The method in claim 11 further comprising the step of selecting various stations from a pre-defined list of stations in order to generate said Loran T-D lines.

13. The method in claim 9 further comprising the step of centering information appearing on the display on either the current vessel position or a user selected item.

14. The method in claim 3 wherein said linear geographic data comprises coastline data.

15. The method in claim 14 further comprising the steps of:

entering data for one of a plurality of tracks as a series of waypoints; and providing navigational data as an output value for connection to an autopilot at pre-defined intervals of time for movement in a selected forward or reverse direction along a selected one of said tracks wherein said navigational data represents navigational error between current vessel position and said selected track.

16. The method in claim 15 further comprising the step of offsetting the current position of the vessel along a selected track to a selected point appearing on said display.

17. The method of claim 15 further comprising the steps of:
- obtaining water temperature and depth data for the current vessel position from external sensors; and
- displaying the water temperature and depth data along with the current vessel position on the display.

18. Apparatus for a video navigation plotter for displaying linear geographic data occurring within a pre-defined geographic region, storing the geographic data in said plotter and displaying the geographic data on a display, said apparatus comprising:
- means having a sequence of data cells, with each data cell carrying a different cell number, for representing said linear geographic data occurring in said region, wherein each successive cell encompasses a different successive pre-defined area existing within the region;
- a memory for storing each of said data cells therein as a memory cell, said memory cell containing a corresponding sequence of fields, said sequence defining a corresponding segment of said geographic data that occurs within the pre-defined area encompassed by said each data cell, wherein a first field in said sequence stores coordinates of a starting point of said segment and each successive field in said sequence stores a position offset value measured from a previous point in said segment to a next successive point in said segment, said previous point being defined by all offset values and said starting point that previously occur within said sequence;
- table means of individual memory cell numbers for defining an order in which said memory cells should be accessed in order to generate the linear geographic data;
- means for defining a numeric range of the memory cells, specified in said table means, that collectively contain geographic data which forms a selected portion of the linear geographic data that is to be displayed on the display;
- means for successively accessing from the memory each of the memory cells that lies within said range of memory cells; and
- means for incrementally drawing, in response to each accessed memory cell, a pattern in a portion of a display screen, wherein said portion corresponds to the location of the data cell in the region and associated with said accessed memory cell and said pattern depicts the segment stored within said accessed memory cell and wherein said pattern is drawn as a series of connected line segments that begin at the starting point occurring within the sequence stored within the accessed memory cell, continue to a point specified by a first offset value occurring within the sequence stored within the accessed memory cell and extend to each corresponding point specified by each successive offset value occurring within the sequence stored within the accessed memory cell.

19. The apparatus in claim 18 wherein said memory stores only those data cells which contain corresponding segments of said linear geographic data.

20. The apparatus in claim 19 wherein said memory cell comprises:
- a plurality of corresponding sequences in said memory cell in the event the data cell associated therewith contains a portion of said linear geographic data; and
- a first delimiter field between successive sequences within said memory cell and a second delimiter field at the end of said memory cell to mark a termination of the memory cell.

21. The apparatus in claim 20 wherein said memory cell further comprises:
- a field containing a value for a pre-defined step size for said linear geographic data; and said apparatus further comprises:
- means for determining a scaling factor by multiplying said step size by a user selectable scale value; and
- means for using the scaling factor to establish a minimal incremental offset distance between successively displayed pixels that depict the segments that form the selected portion of said linear geographic data.

22. The apparatus in claim 20 wherein said incrementally drawing means comprises means for determining an appropriate end point that is to be drawn for any one of said segments if said one segment intersects with an edge of the display.

23. The apparatus of claim 20 further comprising means for displaying a current position of a vessel with course or track data associated therewith overlaid onto the selected portion of said linear geographic data that appears on the display.

24. The apparatus in claim 23 further comprising:
- means for delineating an area situated peripherally around and extending outward from a pre-defined border appearing on said display by a predetermined amount;
- means for triggering an alarm condition when the current position of the vessel indicates that the vessel has moved into said delineated area.

25. The apparatus in claim 23 further comprising means for displaying a current position of a vessel with two Loran T-D lines overlaid onto the selected portion of said linear geographic data that appears on the display.

26. The apparatus in claim 25 further comprising means for selecting various stations from a pre-defined list of stations in order to generate said Loran T-D lines.

27. The apparatus in claim 23 further comprising means for centering information appearing on the display on either the current vessel position or a user selected item.

28. The apparatus in claim 20 wherein said linear geographic data comprises coastline data.

29. The apparatus in claim 28 further comprising:
- means for entering data for one of a plurality of tracks as a series of waypoints; and
- means for providing navigational data as an output value for connection to an autopilot at pre-defined intervals of time for movement in a selected forward or reverse direction along a selected one of said tracks wherein said navigational data represents navigational error between current vessel position and said selected track.

30. The apparatus in claim 29 further comprising means for offsetting the current position of the vessel along a selected track to a selected point appearing on said display.

* * * * *